US012669877B2

(12) United States Patent
Hu et al.

(10) Patent No.: US 12,669,877 B2
(45) Date of Patent: Jun. 30, 2026

(54) DEVICE DISPLAY CONTROL METHOD, ELECTRONIC DEVICE, AND COMMUNICATION SYSTEM

(71) Applicant: HUAWEI TECHNOLOGIES CO., LTD., Shenzhen (CN)

(72) Inventors: Zhengyuan Hu, Xi'an (CN); Weiting Zhai, Xi'an (CN); Rongyou Jia, Xi'an (CN); Haowei Xu, Xi'an (CN); Shufeng Wang, Xi'an (CN); Yuxin Yang, Dongguan (CN); Meng Xue, Xi'an (CN); Xuewen Zhao, Xi'an (CN); Nanxue Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/823,617

(22) Filed: Sep. 3, 2024

(65) Prior Publication Data

US 2024/0427431 A1     Dec. 26, 2024

Related U.S. Application Data

(63) Continuation of application No. PCT/CN2023/143180, filed on Dec. 29, 2023.

(30) Foreign Application Priority Data

Jan. 18, 2023   (CN) .......................... 202310097484.5
Jul. 18, 2023   (CN) .......................... 202310884005.4

(Continued)

(51) Int. Cl.
G06F 3/0346     (2013.01)
G06F 3/038      (2013.01)
(Continued)

(52) U.S. Cl.
CPC ............ G06F 3/0346 (2013.01); G06F 3/038 (2013.01); G06F 3/1446 (2013.01);
(Continued)

(58) Field of Classification Search
CPC ...... G06F 3/0346; G06F 3/038; G06F 3/1446; G06F 2203/0384; G06F 3/1423;
(Continued)

(56) References Cited

U.S. PATENT DOCUMENTS 10,185,401 B2   1/2019   Bhalla
10,684,737 B1   6/2020   Wey et al.
(Continued)

FOREIGN PATENT DOCUMENTS

CN   103853476 A   6/2014
CN   107615206 A   1/2018
(Continued)

*Primary Examiner* — Jonathan A Boyd
(74) *Attorney, Agent, or Firm* — Leydig, Voit & Mayer, Ltd.

(57) ABSTRACT

This application discloses a device display control method, an electronic device, and a communication system, and relates to the field of wireless remote control technologies. This can accurately determine a presentation position of a displayed object (for example, a cursor) corresponding to a control device on a display device and provide better device control experience for a user. In this solution, the presentation position of the displayed object is determined based on a position that the control device points to on a display. Therefore, in both a single-display device scenario and a multi-display device scenario, convenient, immersive, and precise device control experience can be brought to the user.

30 Claims, 36 Drawing Sheets

(30) Foreign Application Priority Data

| Sep. 8, 2023 | (CN) | .......................... | 202311164310.2 |
| Nov. 27, 2023 | (WO) | ................ | PCT/CN2023/134243 |

(51) Int. Cl.

| *G06F 3/14* | (2006.01) |
| *H04N 21/422* | (2011.01) |

(52) U.S. Cl.

CPC ................. *G06F 2203/0384* (2013.01); *H04N 21/42221* (2013.01); *H04N 21/42222* (2013.01)

(58) Field of Classification Search

CPC ................ G06F 3/03; H04N 21/42221; H04N 21/42222; G01S 5/02

See application file for complete search history.

(56) References Cited

U.S. PATENT DOCUMENTS

| 2011/0169734 | A1* | 7/2011 | Cho | ....................... | G06F 3/0346 |
| | | | | | 345/157 |
| 2015/0054774 | A1 | 2/2015 | Fergusson et al. | | |
| 2022/0391158 | A1* | 12/2022 | Lemmens | ............. | G06F 3/1438 |
| 2023/0076323 | A1* | 3/2023 | Son | ....................... | H04B 7/0639 |

FOREIGN PATENT DOCUMENTS

| CN | 113163248 | A | 7/2021 |
| CN | 113192312 | A | 7/2021 |
| CN | 114501119 | A | 5/2022 |
| CN | 114579016 | A | 6/2022 |
| CN | 114760513 | A | 7/2022 |
| CN | 114764284 | A | 7/2022 |
| EP | 3401766 | A1 | 11/2018 |
| KR | 20110044040 | A | 4/2011 |
| WO | 2021017836 | A1 | 2/2021 |

* cited by examiner

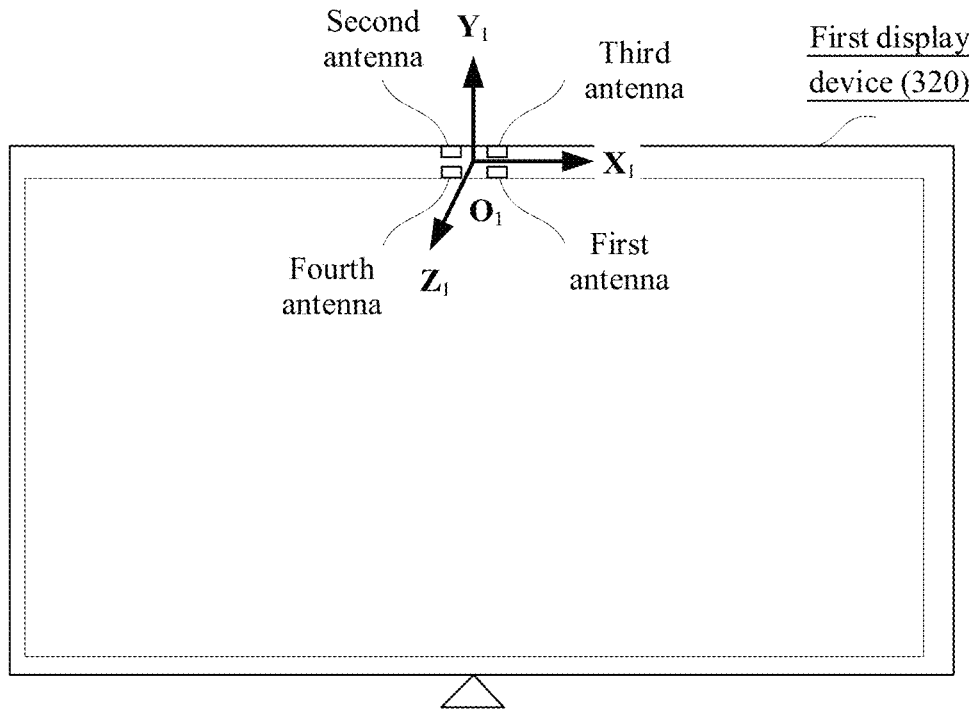
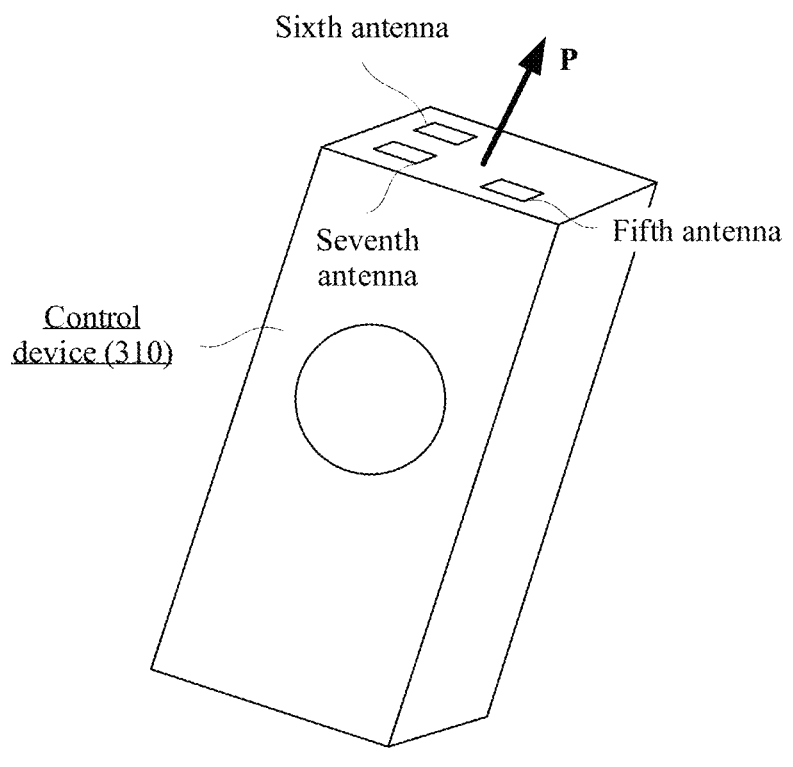
FIG. 8

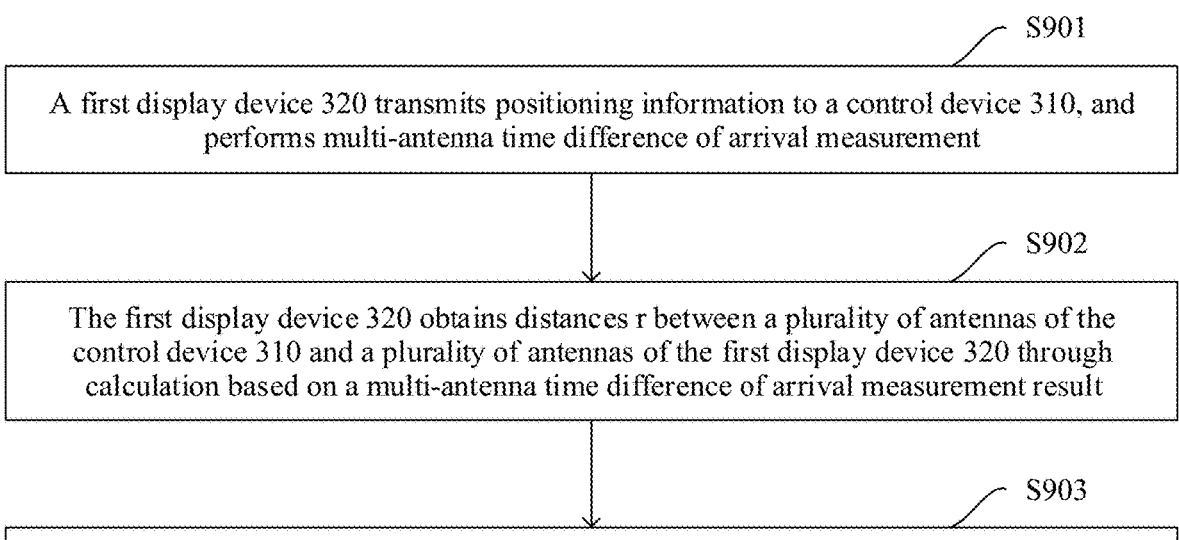

S901

A first display device 320 transmits positioning information to a control device 310, and performs multi-antenna time difference of arrival measurement

S902

The first display device 320 obtains distances r between a plurality of antennas of the control device 310 and a plurality of antennas of the first display device 320 through calculation based on a multi-antenna time difference of arrival measurement result

S903

The first display device 320 obtains horizontal deflection angles and vertical deflection angles between the plurality of antennas of the control device 310 and the plurality of antennas of the first display device 320 through calculation based on the multi-antenna time difference of arrival measurement result, and obtains positions of equivalent centers of the plurality of antennas of the first display device 320 through calculation in combination of the distances r, to construct a first coordinate system in which a first display is located

FIG. 9

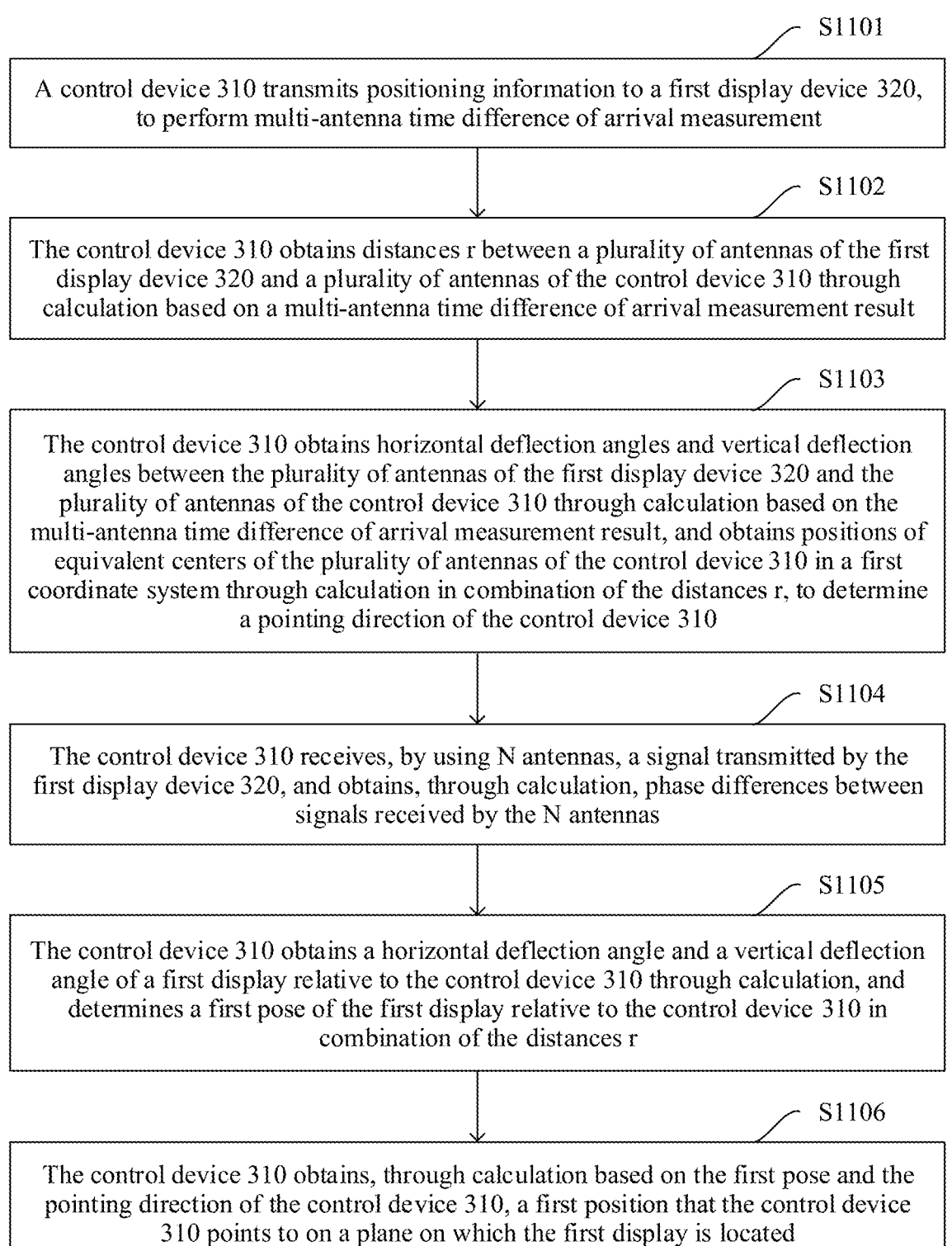

S1101

A control device 310 transmits positioning information to a first display device 320, to perform multi-antenna time difference of arrival measurement

S1102

The control device 310 obtains distances r between a plurality of antennas of the first display device 320 and a plurality of antennas of the control device 310 through calculation based on a multi-antenna time difference of arrival measurement result

S1103

The control device 310 obtains horizontal deflection angles and vertical deflection angles between the plurality of antennas of the first display device 320 and the plurality of antennas of the control device 310 through calculation based on the multi-antenna time difference of arrival measurement result, and obtains positions of equivalent centers of the plurality of antennas of the control device 310 in a first coordinate system through calculation in combination of the distances r, to determine a pointing direction of the control device 310

S1104

The control device 310 receives, by using N antennas, a signal transmitted by the first display device 320, and obtains, through calculation, phase differences between signals received by the N antennas

S1105

The control device 310 obtains a horizontal deflection angle and a vertical deflection angle of a first display relative to the control device 310 through calculation, and determines a first pose of the first display relative to the control device 310 in combination of the distances r

S1106

The control device 310 obtains, through calculation based on the first pose and the pointing direction of the control device 310, a first position that the control device 310 points to on a plane on which the first display is located

FIG. 11

○   Axial pointing direction of the control device 310 in a real pose
●   First position obtained through calculation

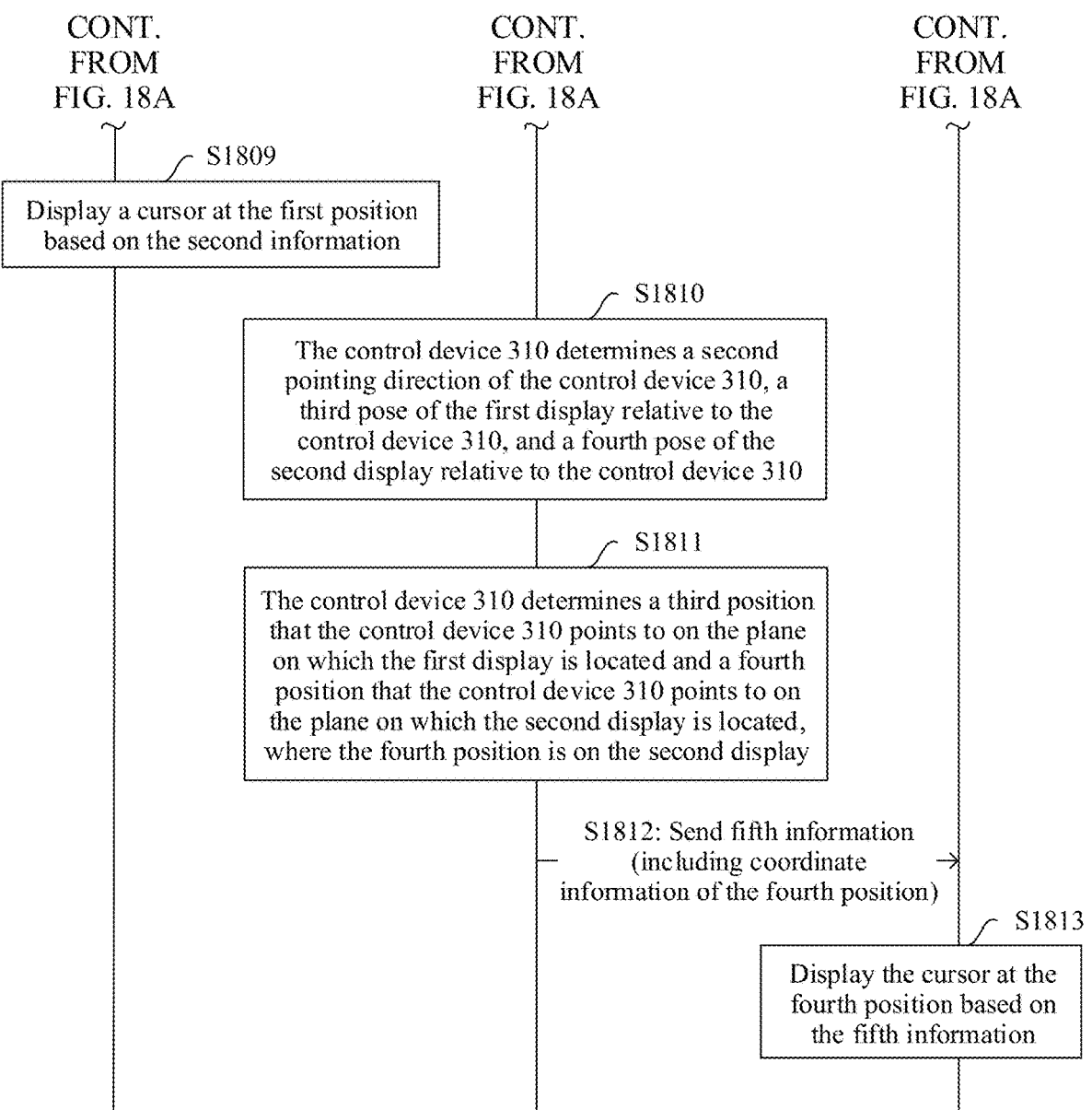

CONT.
FROM
FIG. 18A

CONT.
FROM
FIG. 18A

CONT.
FROM
FIG. 18A

S1809

Display a cursor at the first position
based on the second information

S1810

The control device 310 determines a second
pointing direction of the control device 310, a
third pose of the first display relative to the
control device 310, and a fourth pose of the
second display relative to the control device 310

S1811

The control device 310 determines a third position
that the control device 310 points to on the plane
on which the first display is located and a fourth
position that the control device 310 points to on
the plane on which the second display is located,
where the fourth position is on the second display S1812: Send fifth information
(including coordinate
information of the fourth position)

S1813

Display the cursor at the
fourth position based on
the fifth information

FIG. 18B

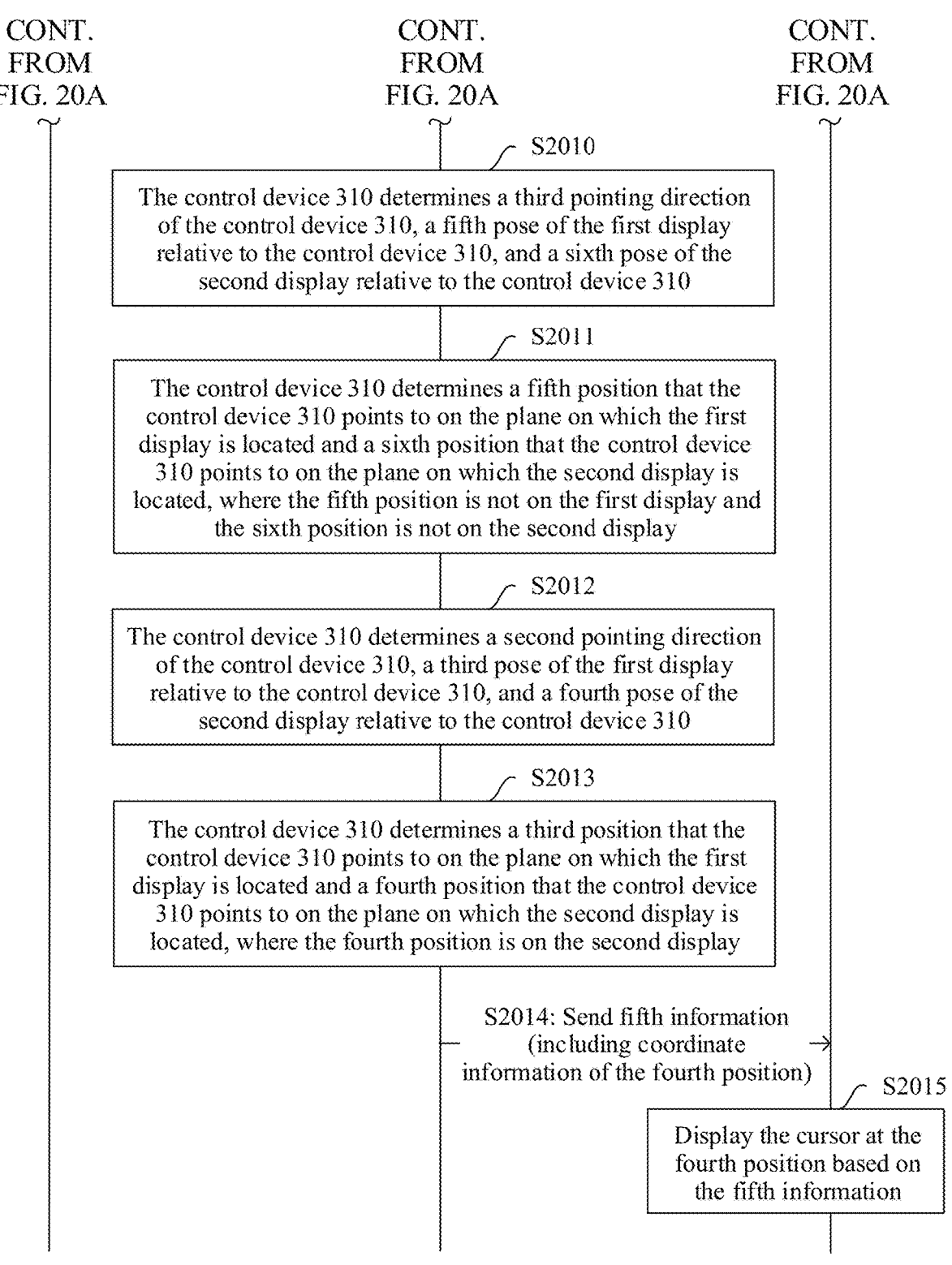

CONT.
FROM
FIG. 20A

CONT.
FROM
FIG. 20A

CONT.
FROM
FIG. 20A

S2010

The control device 310 determines a third pointing direction of the control device 310, a fifth pose of the first display relative to the control device 310, and a sixth pose of the second display relative to the control device 310

S2011

The control device 310 determines a fifth position that the control device 310 points to on the plane on which the first display is located and a sixth position that the control device 310 points to on the plane on which the second display is located, where the fifth position is not on the first display and the sixth position is not on the second display

S2012

The control device 310 determines a second pointing direction of the control device 310, a third pose of the first display relative to the control device 310, and a fourth pose of the second display relative to the control device 310

S2013

The control device 310 determines a third position that the control device 310 points to on the plane on which the first display is located and a fourth position that the control device 310 points to on the plane on which the second display is located, where the fourth position is on the second display S2014: Send fifth information (including coordinate information of the fourth position)

S2015

Display the cursor at the fourth position based on the fifth information

Determine, based on a first signal sent by a second antenna array and a second signal sent by a first antenna array, a position of a first cursor displayed on a first electronic device

S1

DEVICE DISPLAY CONTROL METHOD, ELECTRONIC DEVICE, AND COMMUNICATION SYSTEM

CROSS-REFERENCE TO RELATED APPLICATIONS

This application is a continuation of International Application No. PCT/CN2023/143180, filed on Dec. 29, 2023, which claims priority to Chinese Patent Application No. 202310097484.5, filed on Jan. 18, 2023, Chinese Patent Application No. 202310884005.4, filed on Jul. 18, 2023, Chinese Patent Application No. 202311164310.2, filed on Sep. 8, 2023, and International Application No. PCT/CN2023/134243, filed on Nov. 27, 2023. All of the aforementioned patent applications are hereby incorporated by reference in their entireties.

TECHNICAL FIELD

This application relates to the field of wireless remote control technologies, and in particular, to a device display control method, an electronic device, and a communication system.

BACKGROUND

During man-machine interaction, a control device such as a remote control, an air mouse, or a wearable device is usually used to send a control command to a display device in a wired or wireless manner, to control the display device. In a process of controlling the display device, determining a presentation position of a cursor corresponding to the control device on a display of the display device is an important step.

Currently, a relative position change of the cursor is usually determined based on a relative pose change of the control device, and then the position of the cursor is determined. As shown in FIG. 1, a change of the cursor relative to an initial presentation position of the cursor may be determined based on a pose change of the control device relative to an initial pose, and then the position of the cursor is determined. The initial presentation position of the cursor is usually a preset default position. Because the initial presentation position of the cursor is preset but not really pointed to by the control device, a subsequent presentation position of the cursor is not necessarily a real pointing position of the control device, that is, there is a deviation between the presentation position of the cursor on the display device and the real pointing position of the control device. As a result, a user has poor control experience in a use process.

SUMMARY

This application provides a device display control method, to provide a display solution that is of a remote control cursor and that is applicable to any scenario, accurately determine a presentation position of a cursor corresponding to a control device on a display device, and provide better device control experience for a user.

To achieve the foregoing objective, the following technical solutions are used in this application.

According to a first aspect, a device display control method is provided. The method is applied to at least one display device, the at least one display device includes a first display device, the first display device includes a first positioning module and a first display, and the method includes: The first positioning module receives first positioning information from a control device; the first display device follows a first movement track of the control device, and displays a corresponding object on the first display based on the first positioning information; and when a pointing position of the first movement track moves out of a first edge area of the first display, the first display device no longer displays the corresponding displayed object on the first display.

In an example, the first positioning module may be configured to send and receive positioning information (for example, the first positioning information) with another device, to determine a pointing position of the control device. For example, the first positioning module may include but is not limited to one or more of the following: an antenna ultra-wideband (UWB) radio positioning module, a multi-antenna millimeter-wave radar positioning module, a three-dimensional electromagnetic coil positioning module, a three-dimensional ultrasonic positioning module, and the like. The first positioning information may include one or more of the following information: a UWB signal, a millimeter-wave radar signal, an electromagnetic signal, and an ultrasonic signal.

In an example, the first edge area of the first display may be any edge area of the first display, for example, an upper edge area, a lower edge area, a left edge area, or a right edge area. In a case in which the first display is in a special shape (for example, a circle or an ellipse), the first edge area of the first display may be an edge area that is of the first display and that is close to a predefined boundary. For example, the first display is a circle. The first edge area of the first display may be a predefined edge area that is close to a first boundary. If a center point of the first display is used as a circle center, the first boundary is a boundary corresponding to a range of 315° to 45°, a boundary corresponding to a range of 45° to 135°, a boundary corresponding to a range of 1350 to 225°, or a boundary corresponding to a range of 225° to 315°.

In an example, the displayed object such as an icon, a cursor, a component, a virtual image, or an image may be determined based on a specific application scenario and a function of a device, and is not specifically limited.

In the foregoing solution provided in the first aspect, the display device (for example, the first display device) determines the movement track and the pointing position of the control device by sending and receiving the positioning information with the control device. In this way, after the pointing position of the control device enters the edge area of the display, the display device may follow the movement track of the control device and display a cursor on the display. When the pointing position of the control device moves out of any edge area (for example, the upper edge area, the lower edge area, the left edge area, or the right edge area) of the display, the display device no longer displays the cursor on the display. Therefore, convenient, immersive, and precise device control experience can be brought to the user. For example, compared with a conventional technology in which a presentation position of an image is determined based on a relative pose change of a control device, this solution can resolve a problem of a deviation between a presentation position of the displayed object and the pointing position of the control device, and also resolve a problem that the displayed object is stuck on a frame when moving out of an edge of the display.

In a possible implementation, the method further includes: After the pointing position of the first movement track moves out of the first edge area, the first positioning module receives second positioning information from the control device; when a pointing position of a second movement track is beyond the first edge area, the first display device skips displaying the corresponding displayed object on the first display; and when it is determined that a pointing position of a third movement track moves into the first edge area, the first display device follows the third movement track of the control device, and displays the corresponding displayed object on the first display based on the second positioning information. In this way, when the pointing position of the control device moves out of any edge area (for example, the upper edge area, the lower edge area, the left edge area, or the right edge area) of the display, the display device no longer displays the cursor on the display; and when the pointing position of the control device moves into any edge area of the display again, the display device may display the cursor on the display again. Based on this, convenience, immersive experience, and accuracy in a process in which the user performs device display control can be greatly enhanced.

In a possible implementation, that the first display device follows a first movement track of the control device, and displays a corresponding object on the first display based on the first positioning information includes: The first display device follows the first movement track of the control device, and displays, on the first display based on the first positioning information, a display track of the displayed object that matches the first movement track. For example, in scenarios such as a handwriting tablet scenario and a demonstration scenario, the display device may follow the movement track of the control device, and display a display track of a displayed object such as handwriting on the display based on the positioning information. The solution provided in this application has high adaptability. A specific display form of interface effect displayed by the display following the movement track of the control device is not limited and may be determined based on a specific application scenario and a function of a device.

In a possible implementation, the method further includes: The first display device determines a corresponding pointing position on the first display based on the first positioning information; and when the pointing position is in a preset control hot area, the first display device displays corresponding interface effect when the displayed object is displayed. For example, in a game scenario, when the pointing position of the control device is in the preset control hot area, the display device may display preset special effect at the pointing position and/or in a display area (for example, the preset control hot area) corresponding to the pointing position, for example, a game hero image, or game special effect (for example, bubble special effect, firework special effect, targeting special effect, or hit special effect). The solution provided in this application has high adaptability. A specific display form of interface effect displayed by the display following the movement track of the control device is not limited and may be determined based on a specific application scenario and a function of a device.

In a possible implementation, the at least one display device further includes a second display device, an orientation relationship between the second display device and the first display device is a first relationship, the second display device includes a second positioning module and a second display, and the method further includes: After the pointing position of the first movement track moves out of the first edge area of the first display, the second positioning module receives third positioning information from the control device; when the pointing position of the second movement track is beyond the first edge area, the first display device skips displaying the corresponding displayed object on the first display; and when it is determined that a pointing position of a fourth movement track moves into a second edge area of the second display, the second display device follows the fourth movement track of the control device, and displays the corresponding displayed object on the second display based on the third positioning information. In this way, when the first display is far away from the second display, the displayed object can also be accurately displayed. This brings immersive and precise cursor control and device control experience to the user. In addition, compared with the conventional technology in which the presentation position of the image is determined based on the relative pose change of the control device, in this solution, a problem that the displayed object does not smoothly traverse when the displayed object traverses does not occur.

In a possible implementation, the at least one display device further includes a second display device, the second display device includes a second positioning module and a second display, and the method further includes: After the pointing position of the first movement track moves out of the first edge area of the first display, the second positioning module receives third positioning information from the control device; and when it is determined that the pointing position of the second movement track moves into a second edge area of the second display, the second display device follows a fourth movement track of the control device, and displays the corresponding displayed object on the second display based on the third positioning information. In this way, when the first display is close to the second display, the displayed object can also be accurately displayed. This brings immersive and precise cursor control and device control experience to the user. In addition, compared with the conventional technology in which a displayed object is displayed at a default position, in this solution, a problem that the displayed object does not smoothly traverse when the displayed object traverses does not occur.

In a possible implementation, the orientation relationship between the second display device and the first display device changes from the first relationship to a second relationship, and the method further includes: When the pointing position of the fourth movement track moves out of a third edge area of the second display, the second display device no longer displays the corresponding displayed object on the second display; when a pointing position of a fifth movement track is beyond the third edge area, the corresponding displayed object is not displayed on the second display; the first positioning module receives fourth positioning information from the control device; and when it is determined that a pointing position of a sixth movement track moves into a fourth edge area of the first display, the first display device follows the sixth movement track of the control device, and displays the corresponding displayed object on the first display based on the fourth positioning information. For example, the orientation relationship between the second display device and the first display device changes from the first relationship to the second relationship, for example, positions of the second display device and the first display device are exchanged. In this way, after a position relationship between the first display and the second display changes, with no need to perform a related configuration operation by the user, the display device may sense the change of the orientation relationship by sending and receiving the positioning information to and from the control device, and obtain a latest pointing direction of the control device, to continue to accurately display the displayed object.

In a possible implementation, the second display device is an integrated display device, and the method further includes: When a screen resolution of the second display changes, the second positioning module receives fifth positioning information from the control device; and when the pointing position of the fourth movement track is on the second display, the second display device follows the fourth movement track of the control device, and displays the corresponding displayed object on the second display based on the fifth positioning information. In this way, for the integrated display device, after the screen resolution of the display changes, with no need to perform a related configuration operation by the user, the display device may determine a latest pointing direction of the control device based on a latest screen resolution, to continue to accurately display the displayed object.

In a possible implementation, the second display device is a split display device, and the method further includes: When a screen resolution and/or a focal length corresponding to the second display changes, the second positioning module receives fifth positioning information from the control device; and when the pointing position of the fourth movement track is on the second display, the second display device follows the fourth movement track of the control device, and displays the corresponding displayed object on the second display based on the fifth positioning information. In this way, for the split display device, after the screen resolution or the focal length of the display device changes, with no need to perform a related configuration operation by the user, the display device may determine a latest pointing direction of the control device based on a latest screen resolution or a latest focal length, to continue to accurately display the displayed object.

In a possible implementation, the method further includes: in a process of following the first movement track of the control device, and displaying the corresponding displayed object on the first display based on the first positioning information, when an orientation relationship between the control device and the first display device changes, the first display device receives sixth positioning information from the control device; and the first display device follows the first movement track of the control device, and displays the corresponding displayed object on the first display based on the sixth positioning information. In this way, after a distance between the user and the display changes, with no need to perform a related configuration operation by the user, the display device may sense the change by sending and receiving the positioning information to and from the control device, and adaptively adjust display effect, to continue to accurately display the displayed object.

In a possible implementation, the method further includes: The first positioning module determines the pointing position of the first movement track based on first information, where the first information includes: the first movement track, the first positioning information, and a size of the first display. Based on this, it may be ensured that the first positioning module can obtain an actual pointing position of the control device, thereby providing a necessary basis for subsequent accurate presentation of an image.

In a possible implementation, the first information further includes: a historical pointing position of the first movement track and a historical presentation position of the displayed object. In this way, on the basis of the conventional technology in which the presentation position of the image is determined based on the relative pose change of the control device, the presentation position of the displayed object may be calibrated based on the pointing position of the control device. For example, when the presentation position of the image determined based on the relative pose change of the control device deviates from the pointing direction of the control device beyond a preset range, or after a preset time period elapses, the presentation position of the displayed object may be calibrated based on the pointing position of the control device. Based on this, continuous presentation of the displayed object can be ensured.

In a possible implementation, the first positioning module of the first display device includes a first antenna array, the first antenna array includes a plurality of first antenna elements, at least two of the plurality of first antenna elements are respectively distributed in a first direction and a second direction, and the first direction is perpendicular to the second direction; the control device includes a second antenna array, and the second antenna array includes a plurality of second antenna elements; and that the first positioning module receives first positioning information from a control device includes: The first antenna array receives the first positioning information from the second antenna array of the control device.

In a possible implementation, displaying the corresponding displayed object on the first display based on the first positioning information includes: determining, based on the first positioning information received from the second antenna array and the second positioning information sent by the first antenna array, a position of the displayed object displayed on the first display device.

In a possible implementation, at least three first antenna elements are disposed, and at least two second antenna elements are disposed.

In a possible implementation, the plurality of first antenna elements are a first antenna, a second antenna, and a third antenna, the first antenna is located at an intersection point of the first direction and the second direction, the second antenna is located on a side that is of the first antenna and that is in the first direction, and the third antenna is located on a side that is of the first antenna and that is in the second direction.

In a possible implementation, a distance between any two first antenna elements that are in the plurality of first antenna elements and that have functions of receiving a first signal is less than or equal to a wavelength of a first signal; and/or a distance between any two second antenna elements that are in the plurality of second antenna elements and that have functions of receiving a second signal is less than or equal to a wavelength of the second signal.

In a possible implementation, the first antenna is an antenna integrated with sending and receiving, or the first antenna includes a receive antenna and a transmit antenna.

As a possible implementation, the plurality of first antenna elements are distributed in an L shape, a triangle, or a rectangular array.

In a possible implementation, a plane including the first direction and the second direction is parallel to a display interface of the first electronic device.

In a possible implementation, the first antenna array is located on an upper side of the display device.

According to a second aspect, this application provides a positioning method. The positioning method is applied to a system including a first electronic device and a second electronic device, where a first antenna array is disposed on the first electronic device, the first antenna array includes a plurality of first antenna elements, at least two of the plurality of first antenna elements are respectively distributed in a first direction and a second direction, and the first direction is perpendicular to the second direction; a second antenna array is disposed on the second electronic device, and the second antenna array includes a plurality of second antenna elements; and the method includes: determining, based on a first signal sent by the second antenna array and a second signal sent by the first antenna array, a position of a first cursor displayed on the first electronic device.

In this application, positions of the first antenna array and the second antenna array relative to each other may be determined, so that the position of the first cursor can be accurately displayed on the first electronic device. Positioning of the second antenna array is more precise, and operation experience in a spatial pointing operation is improved.

In a possible implementation, the determining, based on a first signal sent by the second antenna array and a second signal sent by the first antenna array, a position of a first cursor displayed on the first electronic device specifically includes:

measuring, based on the first signal, first coordinates of the second antenna array in a three-dimensional coordinate system in which the first antenna array is located;

measuring deflection angles of the second antenna array relative to the first direction and the second direction based on the second signal;

obtaining second coordinates based on the first coordinates and the deflection angles; and determining the position of the first cursor based on the second coordinates.

Relative coordinates, that is, the first coordinates, of the second antenna array relative to the first antenna array may be obtained by the first antenna array based on the first signal sent by the second antenna array. The first coordinates may be used to determine a spatial position of the second antenna array. The second antenna array may obtain, through positioning, deflection angles of the second antenna array relative to a first direction X and a second direction Y based on the second signal sent by the first antenna array. Finally, final second coordinates may be obtained based on the first coordinates and the deflection angles. Therefore, the positions of the first antenna array and the second antenna array relative to each other may be determined, to obtain absolute coordinates of the second antenna array relative to the first electronic device, and the absolute coordinates can be displayed on the first electronic device in a form of a cursor.

If a radiating surface of the first antenna array is parallel to a display interface of the first electronic device, the second coordinates are the position of the cursor that is capable of being displayed on the first electronic device through an operation on the second electronic device. In addition, if a radiating surface of the first antenna array is not parallel to a display interface of the first electronic device, the second coordinates need to be further converted based on a physical position relationship between the first antenna array and the display interface, to obtain, after the conversion, the position of the cursor displayed on the display interface.

In a possible implementation, the determining the position of the first cursor based on the second coordinates specifically includes:

determining, based on the second coordinates and a size of the first electronic device, the position of the first cursor that is capable of being displayed on the first electronic device.

The second coordinates may be associated with the size of the first electronic device. If a coordinate value corresponding to the second coordinates in the first direction or the second direction is within a size range corresponding to the first electronic device, the first cursor can be displayed on the first electronic device based on the second coordinates, and the first cursor can move in the display interface of the first electronic device based on movement of the second electronic device. This has good directivity and can improve operation experience.

In a possible implementation, third coordinates are obtained based on the first coordinates and the deflection angles, and a position of a second cursor that is not capable of being displayed on the first electronic device is determined based on the third coordinates and the size of the first electronic device.

The third coordinates may be associated with the size of the first electronic device. If a coordinate value of the third coordinates in the first direction X or the second direction Y exceeds a size range corresponding to the first electronic device, it is indicated that a position that is obtained based on the third coordinates and that is used to display a cursor cannot be within the range of the first electronic device. In this case, the obtained position of the cursor is the position of the second cursor that is not capable of being displayed on the first electronic device. Therefore, in a case in which the third coordinates exceed the range of the first electronic device, even if the second electronic device moves, the cursor is not displayed on the first electronic device, so that a problem of inaccurate pointing can be avoided.

In a possible implementation, at least three first antenna elements are disposed, and at least two second antenna elements are disposed. At least a part of the at least three of the first antenna elements have a signal receiving function and/or a signal transmitting function. There is a specified arrangement form among the at least three of the first antenna elements, to facilitate calculation of the first coordinates. The at least two of the second antenna elements may also have signal receiving functions and/or signal transmitting functions. There is also a specified arrangement form between the at least two of the second antenna elements, to facilitate calculation of the deflection angles.

In a possible implementation, the plurality of first antenna elements are a first antenna, a second antenna, and a third antenna, the first antenna is located at an intersection point of the first direction and the second direction, the second antenna is located on a side that is of the first antenna and that is in the first direction, and the third antenna is located on a side that is of the first antenna and that is in the second direction.

The first antenna is located at the intersection point of the first direction and the second direction, so that a coordinate system can be established, and the first antenna is used as an origin of the coordinate system. In addition, the second antenna and the third antenna are respectively located in the first direction and the second direction of the first antenna, so that phases in the first direction and the second direction can be separately obtained, to facilitate the calculation of the first coordinates.

In a possible implementation, a distance between any two first antenna elements that are in the plurality of first antenna elements and that have functions of receiving the first signal is less than or equal to a wavelength of the first signal; and/or a distance between any two second antenna elements that are in the plurality of second antenna elements and that have functions of receiving the second signal is less than or equal to a wavelength of the second signal. Therefore, the first antenna elements that are configured to receive signals can receive the first signal almost simultaneously, the second antenna elements can receive the second signal almost simultaneously, each first antenna element can obtain a phase parameter based on the first signal, and each second antenna element can obtain a deflection angle based on the second signal.

In a possible implementation, one second antenna is disposed or a plurality of second antennas are disposed at intervals in the first direction, and one third antenna is disposed or a plurality of third antennas are disposed at intervals in the second direction. If one second antenna and one third antenna are disposed, it is convenient for arrangement of each antenna, and it is also convenient for the calculation of the first coordinates. If the plurality of second antennas and the plurality of third antennas are disposed, the first antenna array may have better radiation performance. Certainly, one second antenna and a plurality of third antennas may alternatively be disposed. A plurality of second antennas and one third antenna may alternatively be disposed. In this way, flexible arrangement of each antenna can be implemented.

In a possible implementation, the first signal includes a time parameter and a first phase parameter; and the measuring, based on the first signal, first coordinates of the second antenna array in a three-dimensional coordinate system in which the first antenna array is located specifically includes:

obtaining a distance between the first antenna array and the second antenna array based on the time parameter; and obtaining the first coordinates based on the distance and the first phase parameter.

The distance between the first antenna array and the second antenna array may be accurately obtained based on the time parameter. In addition, in combination of the first phase parameter in the first signal, accuracy of the calculation of the first coordinates may be improved.

In a possible implementation, the first antenna may have a function of transmitting the second signal, and the foregoing distance between the first antenna array and the second antenna array may be specifically a first distance between the first antenna and the second antenna array, and the obtaining the first coordinates based on the distance and the first phase parameter specifically includes:

obtaining, based on the first phase parameter, a first phase difference between the second antenna and the first antenna and a second phase difference between the third antenna and the first antenna; and obtaining an x-axis coordinate value and a z-axis coordinate value in the first coordinates based on the first distance, a distance between the second antenna and the first antenna, and the first phase difference; and obtaining a y-axis coordinate value in the first coordinates based on the first distance, a distance between the third antenna and the first antenna, and the second phase difference.

First phase parameters obtained by the second antenna and the third antenna are both within a same signal cycle. The first coordinates may be obtained through accurate calculation based on the first distance, and the first phase difference and the second phase difference that are obtained based on the first phase parameter.

In a possible implementation, the second antenna array includes a fourth antenna, a fifth antenna, and a sixth antenna, the fifth antenna is located on a side that is of the fourth antenna and that is in a third direction, the sixth antenna is located on a side that is of the fourth antenna and that is in a fourth direction, and the third direction is perpendicular to the fourth direction.

The fourth antenna may be located at an intersection point of the third direction and the fourth direction. The fifth antenna and the sixth antenna are respectively located in the third direction and the fourth direction of the fourth antenna, so that the deflection angles of the second antenna array relative to the first direction and the second direction can be obtained.

In a possible implementation, the second signal includes a second phase parameter; and the measuring deflection angles of the second antenna array relative to the first direction and the second direction based on the second signal specifically includes:

obtaining the deflection angles based on the second phase parameter, so that accuracy of the calculation of the deflection angles can be improved.

In a possible implementation, the obtaining the deflection angles based on the second phase parameter specifically includes:

obtaining, based on the second phase parameter, a third phase difference between the fifth antenna and the fourth antenna and a fourth phase difference between the sixth antenna and the fourth antenna; and obtaining, based on the third phase difference, a first deflection angle that is of the second antenna array and that is in the first direction, and obtaining, based on the fourth phase difference, a second deflection angle that is of the second antenna array and that is in the second direction.

Second phase parameters obtained by the fifth antenna and the sixth antenna are both within a same signal cycle. The deflection angles may be obtained through accurate calculation based on the third phase difference and the fourth phase difference that are obtained based on the second phase parameter.

In a possible implementation, the second antenna array includes a fourth antenna, a fifth antenna, and an acceleration sensor, the fifth antenna is located on a side that is of the fourth antenna and that is in a third direction, the acceleration sensor is located on a side that is of the fourth antenna and that is in a fourth direction, and the third direction is perpendicular to the fourth direction;

the second signal includes a second phase parameter; and the measuring deflection angles of the second antenna array relative to the first direction and the second direction based on the second signal specifically includes:

obtaining a third phase difference between the fifth antenna and the fourth antenna based on the second phase parameter; and obtaining, based on the third phase difference, a first deflection angle that is of the second antenna array and that is in the first direction, and obtaining, by the acceleration sensor based on the second phase parameter, a second deflection angle that is of the second antenna array and that is in the second direction.

The acceleration sensor may replace the sixth antenna to implement a function, so that one antenna may be reduced, that is, only two antennas, namely, the fourth antenna and the fifth antenna, are disposed on the second electronic device. The acceleration sensor can cooperate with the fifth antenna to obtain the deflection angles of the second antenna array.

In a possible implementation, the obtaining a distance between the first antenna array and the second antenna array based on the time parameter specifically includes:

detecting a first time point at which the second antenna array sends the first signal;

detecting a second time point at which the first antenna array receives the first signal; and obtaining the distance based on the first time point, the second time point, and a preset speed value.

The distance measurement method is a unidirectional ranging method. A prerequisite for using the method is that a clock of the first antenna array is accurately synchronized with a clock of the second antenna array. The signal is sent and received once, so that distance measurement can be implemented, and an operation is facilitated. For ease of calculation, the preset speed value may be a speed of light. Certainly, if there is speed interference and an error, another speed value may alternatively be used. In addition, if the first antenna array includes the foregoing first antenna having the signal transmitting function, the distance between the first antenna array and the second antenna array may be specifically a distance between the first antenna and the second antenna array.

In a possible implementation, the obtaining a distance between the first antenna array and the second antenna array based on the time parameter specifically includes:

detecting a first time point at which the second antenna array sends the first signal;

detecting a second time point at which the first antenna array receives the first signal;

detecting duration of delay for the first antenna array to process the first signal;

detecting a third time point at which the first antenna array sends the second signal;

detecting a fourth time point at which the second antenna array receives the second signal; and obtaining the distance based on the first time point, the second time point, the duration of delay, the third time point, the fourth time point, and a preset speed value.

The distance measurement method is a bidirectional ranging method. If a clock of the second antenna array is not synchronized with a clock of the first antenna array, the method may be used. In the method, a delay factor of signal processing may be considered, so that distance measurement is more accurate. For ease of calculation, the preset speed value may be a speed of light, or may be another speed. Details are not described herein again.

In a possible implementation, the first antenna is an antenna integrated with sending and receiving, to be specific, the first antenna may have a function of receiving and transmitting a signal. Function switching can be implemented by using a switching switch, thereby reducing a quantity of antennas, saving space, and facilitating antenna arrangement.

In a possible implementation, the first antenna includes a receive antenna and a transmit antenna, that is, the first antenna includes two antennas. The transmit antenna is configured to transmit a signal, and the receive antenna is configured to receive a signal. The first antenna does not need a switching switch, and a corresponding receiving or sending function may be implemented by using each antenna.

In a possible implementation, the plurality of first antenna elements are distributed in an L shape, a triangle, or a rectangular array. This facilitates flexible arrangement of each first antenna element.

In a possible implementation, a plane including the first direction and the second direction is parallel to a display interface of the first electronic device. This can facilitate geometric calculation of each coordinate point value in the first coordinates, and accuracy of the first coordinates can be improved.

According to a third aspect, this application further provides a positioning system, configured to implement the positioning method provided in the first aspect of this application. The positioning system includes a first electronic device and a second electronic device;

a first antenna array and a first modular circuit are disposed on the first electronic device, the first antenna array is configured to send a second signal, and is configured to receive a first signal sent by a second antenna array in the second electronic device, and the first modular circuit is electrically connected to the first antenna array;

the second antenna array and a second modular circuit are disposed on the second electronic device, the second antenna array is configured to send the first signal and receive the second signal, and the second modular circuit is electrically connected to the second antenna array; and the first modular circuit or the second modular circuit is configured to determine, based on the first signal and the second signal, a position of a first cursor displayed on the first electronic device.

In the positioning system, positions of the first antenna array and the second antenna array relative to each other may be determined, so that the position of the first cursor can be accurately displayed on the first electronic device. Positioning of the second antenna array is more precise, and operation experience in a spatial pointing operation is improved.

In a possible implementation, the first modular circuit includes a control unit, a computing unit, a transmitter, and a receiver;

the transmitter is connected to the first antenna array, and is configured to control the first antenna array to send the second signal;

the receiver is connected to the first antenna array, and is configured to control the first antenna array to receive the first signal;

the computing unit is configured to calculate a phase parameter in the first signal; and the control unit is configured to control the receiver and the transmitter to work, and is further configured to obtain first coordinates of the second antenna array through calculation based on a calculation result of the computing unit.

In a possible implementation, the first antenna array includes a first antenna, a second antenna, and a third antenna, the first antenna is located at an intersection point of a first direction and a second direction, the second antenna is located on a side that is of the first antenna and that is in the first direction, the third antenna is located on a side that is of the first antenna and that is in the second direction, and the second antenna and the third antenna are separately electrically connected to the receiver; and the first antenna is an antenna integrated with sending and receiving, the first modular circuit further includes a switching switch, the switching switch is separately electrically connected to the first antenna, the transmitter, and the receiver, and the switching switch is configured to switch between an electrical connection of the first antenna to the transmitter and an electrical connection of the first antenna to the receiver.

The first antenna may have a function of receiving and transmitting a signal. Function switching can be implemented by using the switching switch, thereby reducing a quantity of antennas, saving space, and facilitating antenna arrangement.

In a possible implementation, the first antenna array includes a first antenna, a second antenna, and a third antenna, the first antenna is located at an intersection point of a first direction and a second direction, the second antenna is located on a side that is of the first antenna and that is in the first direction, the third antenna is located on a side that is of the first antenna and that is in the second direction, and the second antenna and the third antenna are separately electrically connected to the receiver; and the first antenna includes a transmit antenna and a receive antenna, the transmit antenna is electrically connected to the transmitter, and the receive antenna is electrically connected to the receiver.

The first antenna includes two antennas. The transmit antenna is configured to transmit a signal, and the receive antenna is configured to receive a signal. The first antenna does not need a switching switch, and a corresponding receiving or sending function may be implemented by using each antenna.

In a possible implementation, one receiver is disposed, and the receiver is electrically connected to a first antenna element that is in the first antenna array and that has a signal receiving function. Therefore, signal receiving functions of a plurality of first antenna elements can be implement by using one receiver, so that the plurality of first antenna elements can receive a signal almost simultaneously, and the first coordinates can be calculated based on a phase difference between the first antenna elements. In a possible implementation, a plurality of receivers are disposed, and each of the receivers is electrically connected to one first antenna element that is in the first antenna array and that has a signal receiving function.

Synchronization may be performed between the receivers by using a synchronization signal, to obtain a phase difference between first antenna elements.

In a possible implementation, the second modular circuit includes a control unit, a computing unit, a transmitter, and a receiver;

the transmitter is connected to the second antenna array, and is configured to control the second antenna array to send the first signal;

the receiver is connected to the second antenna array, and is configured to control the second antenna array to receive the second signal;

the computing unit is configured to calculate a phase parameter in the second signal; and the control unit is configured to control the receiver and the transmitter to work, and is further configured to obtain deflection angles of the second antenna array through calculation based on a calculation result of the computing unit.

According to a fourth aspect, this application further provides an electronic device. The electronic device is a first electronic device. A first antenna array is disposed on the first electronic device, the first antenna array includes a plurality of first antenna elements, at least two of the plurality of first antenna elements are respectively distributed in a first direction and a second direction, and the first direction is perpendicular to the second direction; and the first antenna array is configured to: receive a signal sent by a second antenna array on a second electronic device, and determine, based on the signal, a position of a first cursor displayed on the first electronic device.

In the first electronic device provided in this application, the signal sent by the second antenna array can be received by the first antenna array, and a signal can be further sent to the second antenna array by the first antenna array. The second antenna array can process signals received by the second antenna array, so that positions of the antenna arrays relative to each other can be determined by using signals transmitted between the first antenna array and the second antenna array. In this way, absolute coordinates of the second antenna array relative to the first electronic device can be obtained. The second antenna array can accurately point to a position specified by the first electronic device.

In a possible implementation, the plurality of first antenna elements are a first antenna, a second antenna, and a third antenna, the first antenna is located at an intersection point of the first direction and the second direction, the second antenna is located on a side that is of the first antenna and that is in the first direction, and the third antenna is located on a side that is of the first antenna and that is in the second direction.

In a possible implementation, a distance between any two first antenna elements that are in the plurality of first antenna elements and that have functions of receiving a first signal is less than or equal to a wavelength of the first signal. In this way, the first antenna elements that are configured to receive signals can receive the first signal almost simultaneously, and each first antenna element can obtain a phase parameter based on the first signal.

According to a fifth aspect, a display device is provided. The display device includes a positioning module and a display, the positioning module is configured to send and receive positioning information to and from a control device, the display is configured to display interface effect, and the positioning module and the display are configured to support the display device in implementing the method according to any one of the first aspect or the second aspect.

According to a sixth aspect, a computer-readable storage medium is provided. The computer-readable storage medium stores computer program instructions. When the computer program instructions are executed by a processor, the method according to any one of the possible implementations of the first aspect or the second aspect is implemented.

According to a seventh aspect, a computer program product including instructions is provided. When the computer program product runs on a computer, the computer is enabled to perform the method according to any one of the possible implementations of the first aspect or the second aspect.

According to an eighth aspect, a chip system is provided. The chip system includes a processing circuit and a storage medium. The storage medium stores computer program instructions. When the computer program instructions are executed by the processor, the method according to any one of the possible implementations of the first aspect or the second aspect is implemented. The chip system may include a chip, or may include a chip and another discrete component.

BRIEF DESCRIPTION OF DRAWINGS

FIG. 8 is a schematic diagram of a method for determining, based on a multi-antenna UWB positioning method, a coordinate system in which a display is located according to an embodiment of this application;

FIG. 9 is a flowchart of determining, based on a multi-antenna UWB positioning method, a coordinate system in which a display is located according to an embodiment of this application;

FIG. 11 is a schematic diagram of a process of determining a pointing position of a control device according to an embodiment of this application;

FIG. 18A and FIG. 18B are a flowchart 1 of a traversal process of a cursor in a multi-device scenario according to an embodiment of this application;

FIG. 20A and FIG. 20B are a flowchart 2 of a traversal process of a cursor in a multi-device scenario according to an embodiment of this application;

REFERENCE NUMERALS

Figure 1:
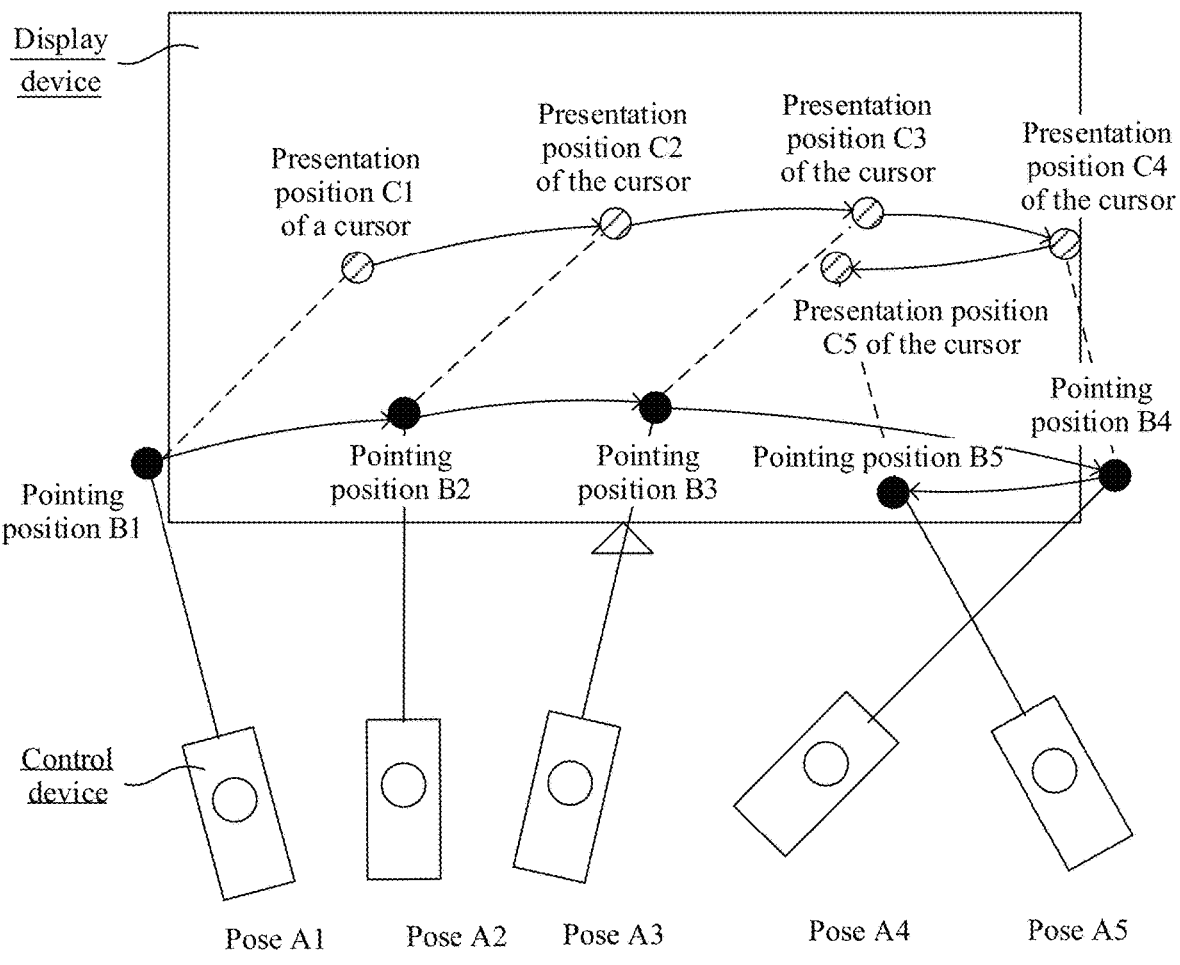
FIG. 1 is a schematic diagram of a presentation process of a remote control cursor in a conventional single-display device scenario.

100: first electronic device;
110: power supply module;
120: first antenna array;
120a: first antenna element;
121: first antenna;
121a: transmit antenna;
122: second antenna;
123: third antenna;
130: first modular circuit;
131: control unit;
132: computing unit;
133: transmitter;
134: receiver;
135: switching switch;
140: processor;
150: transmission interface;
160: display interface;
200: second electronic device;
210: power supply module;
220: second antenna array;

221: fourth antenna;

221a: transmit antenna;

222: fifth antenna;

223: sixth antenna;

230: second modular circuit;

231: control unit;

232: computing unit;

233: transmitter;

234: receiver;

235: switching switch;

240: processor;

250: transmission interface.

DESCRIPTION OF EMBODIMENTS

The following describes technical solutions in embodiments of this application with reference to accompanying drawings in embodiments of this application. In the descriptions in embodiments of this application, "/" means "or" unless otherwise specified. For example, A/B may indicate A or B. In this specification, "and/or" describes only an association relationship for describing associated objects and indicates that three relationships may exist. For example, A and/or B may indicate the following three cases: Only A exists, both A and B exist, and only B exists. In addition, in the descriptions of embodiments of this application, "a plurality of" means two or more.

In the following, terms "first", "second", and the like are merely used to distinguish between different described objects, and have no limitation on positions, a sequence, priorities, quantities, content, or the like of the described objects. For example, if the described object is a "field", ordinal numbers before "fields" in a "first field" and a "second field" do not limit positions or a sequence of the "fields", and "first" and "second" do not limit whether the "fields" modified by "first" and "second" are in a same message, and do not limit a sequence of the "first field" and the "second field". For another example, if the described object is "level", ordinal numbers before "levels" in a "first level" and a "second level" do not limit priorities between the "levels". For another example, a quantity of the described objects is not limited by an ordinal number, and may be one or more. A "first display device" is used as an example. There may be one or more "devices". In addition, objects modified by different prefix words may be the same or different. For example, if the described object is a "device", a "first display device" and a "second display device" may be a same type of devices or different types of devices. For another example, if the described object is "information", "first information" and "second information" may be information with same content or information with different content. In conclusion, in embodiments of this application, use of a prefix word such as an ordinal number used to distinguish a described object does not constitute a limitation on the described object. For a description of the described object, refer to the descriptions in the context in the claims or embodiments. Use of such a prefix word should not constitute an unnecessary limitation.

In addition, in embodiments of this application, "connection" may indicate a direct connection or an indirect connection, or may indicate an electrical connection or a communication connection. For example, a connection between two electrical elements A and B may mean that A is directly connected to B, or A is indirectly connected to B by using another electrical element or a connection medium, or A is indirectly connected to B by using another communication device or a communication medium, provided that A and B can communicate with each other.

As described above, currently, when a presentation position of a displayed object such as a cursor is determined, displacement of the cursor is usually determined based on a relative pose change of a control device, and then the presentation position of the cursor is determined. For example, displacement of the cursor relative to a historical presentation position of the cursor may be determined based on a pose change of the control device relative to a historical pose. The historical pose is an initial pose, a last determined pose, or the like. The historical presentation position of the cursor is an initial presentation position of the cursor, a last presentation position of the cursor, or the like.

In the foregoing solution in which the presentation position of the cursor is determined based on the relative pose change of the control device, the initial presentation position of the cursor corresponding to the initial pose of the control device is usually a preset default position, and is not related to a real pose of the control device. Therefore, the presentation position of the cursor is not necessarily a real pointing position of the control device, that is, there is a deviation between the presentation position of the cursor on a display device and the real pointing position of the control device. As a result, a user has poor control experience in a use process. For example, when the control device actually points beyond a display, the cursor is still displayed on the display. As shown in FIG. 1, when a control device with a pose A1 actually points to a position B1 beyond a display, a cursor is displayed at a presentation position C1 of the cursor on the display shown in FIG. 1. For another example, when the control device actually points to a first position on the display, the cursor is displayed at a second position on the display, and the first position is different from the second position. As shown in FIG. 1, when the control device with a pose A2 actually points to a position B2, the cursor is displayed at a position C2 on the display. As shown in FIG. 1, when the control device with a pose A3 actually points to a position B3, the cursor is displayed at a position C3 on the display.

In addition, when the solution in which the presentation position of the cursor is determined based on the relative pose change of the control device is applied to a single-display device scenario, and the real pointing position of the control device moves out of the display, the cursor usually stays at an edge of the display (which is briefly referred to as stuck-on-frame). For example, when the control device with a pose A4 actually points to a position B4 beyond the display shown in FIG. 1, the cursor is stuck at an edge position C4 of the display shown in FIG. 1. In addition, when a pose of the control device changes from the pose A4 shown in FIG. 1 to a pose A5 shown in FIG. 1, although the real pointing position of the control device changes from B4 shown in FIG. 1 to B5 shown in FIG. 1, a presentation position C5 of the cursor is determined based on a stuck-on-frame position shown in FIG. 1, that is, the presentation position C4 of the cursor. In this case, the deviation between the presentation position of the cursor and the real pointing position of the control device is increased. This brings poorer control experience to the user.

Figure 2:
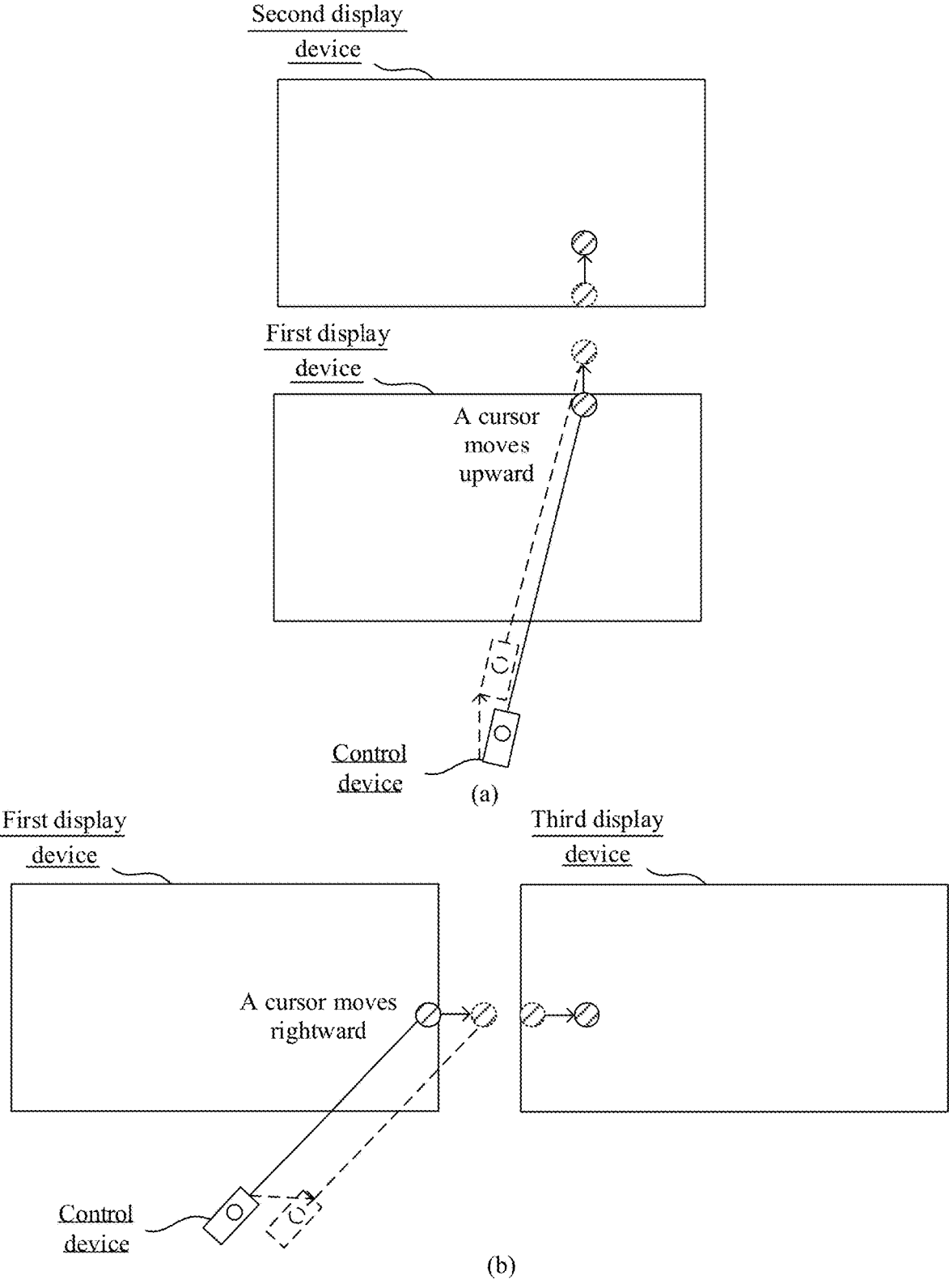
FIG. 2 is a schematic diagram of a presentation process of a remote control cursor in a conventional multi-display device scenario.

Alternatively, when the solution in which the presentation position of the cursor is determined based on the relative pose change of the control device is applied to a multi-display device scenario, and the cursor leaves a device (for example, a first display device) in which the cursor is currently located, and moves to a display device (for example, a second display device) in a corresponding orientation, the second display device follows the first display device to continue to display the cursor. Because the device in which the cursor is currently located does not sense other surrounding display devices, an orientation relationship between a plurality of display devices usually needs to be preset. As shown in FIG. 2, after an orientation relationship among a first display device, a second display device, and a third display device is preset, when the cursor moves from the first display device to the second display device above the first display device, the second display device follows the first display device to continue to display the cursor; or when the cursor moves from the first display device to the third device on a right side of the first display device, the third device follows the first display device to continue to display the cursor. However, a prerequisite for implementing this solution is that the orientation relationship between the plurality of display devices needs to be predetermined and set. If the orientation relationship between the plurality of display devices shown in FIG. 2 changes and the setting is not updated in a timely manner, cursor presentation logic is not automatically adjusted with a change of orientations between the display devices. This may cause mismatch between cursor presentation and a real scenario, and affect user experience. In addition, in this solution, only the orientation relationship between the plurality of display devices is considered. If types, sizes of displays, resolutions of displays, and the like of the plurality of display devices are different, adaptive cursor presentation adjustment is not performed, and adaptive cursor presentation adjustment is not performed based on a specific distance between displays of the plurality of display devices. For example, when the cursor traverses between two display devices that are far away from each other shown in FIG. 2, after the cursor moves out of an edge area of a display of one device, the cursor directly enters a display of the other device, and a jump point in a visual distance causes the cursor to traverse unsmoothly. This affects the control experience of the user. For another example, when the cursor traverses between two display devices with different resolutions of displays, presentation positions corresponding to real coordinates of the cursor may be inconsistent on two displays due to the different resolutions of displays. As a result, a jump point in a visual distance exists when the cursor traverses, and causes the cursor to traverse unsmoothly. This affects the control experience of the user.

In addition, in the solution in which the presentation position of the cursor is determined based on the relative pose change of the control device, regardless of how far the control device is from a display, displacement of the cursor is in a fixed proportion to an angle change of the control device. As a result, the user controls the cursor at different distances, and movement distances of the cursor corresponding to a same deflection angle are consistent. Therefore, the user has greatly different control experience when controlling the cursor at different distances.

To resolve a problem existing in the foregoing conventional solution for determining the presentation position of the cursor, an embodiment of this application provides a device display control method. In the method, a presentation position of a cursor may be determined based on a pointing direction of a control device, to resolve problems such as a problem of a deviation between the presentation position of the cursor and a real pointing position of the control device, a problem that the cursor is stuck on a frame when moving out of an edge of a display, and a problem that cursor presentation logic cannot automatically sense an orientation relationship between displays of a plurality of display devices, types of a plurality of display devices, sizes of displays of a plurality of display devices, resolutions of displays of a plurality of display devices, or a distance between displays of a plurality of display devices.

It should be noted that the cursor in this embodiment of this application is a cursor in a broad sense. The cursor may be displayed in various forms, for example, may include but is not limited to icons such as an arrow, a dot, and an editable character. In some embodiments, a display form of the cursor may be adaptively displayed based on different interfaces. For example, the display form of the cursor may be in a form of an editable character in an editable file, or may be in a form of an arrow on a folder interface. This is not specifically limited in this embodiment of this application. In the following embodiments, a "cursor" is used as an example.

In this embodiment of this application, the control device and the display device each include a wireless positioning unit. Positions of the wireless positioning unit of the control device and the wireless positioning unit of the display device relative to each other may be determined through receiving and sending of positioning information. For example, the wireless positioning unit of the control device and the wireless positioning unit of the display device may determine, by receiving and sending the positioning information, a position of an intersection point of the pointing direction of the control device and a plane on which the display of the display device is located, that is, a pointing position of the control device. When the pointing position of the control device is on the display, the display device may follow a movement track of the control device and display corresponding interface effect on the display. When the pointing position of the control device is not on the display, the display device does not display corresponding interface effect on the display.

In an example, the interface effect displayed on the display may include but is not limited to displaying a displayed object (such as an icon, a cursor, a component, a virtual image, or an image) at the pointing position of the control device, displaying corresponding view angle effect based on the pointing position of the control device, displaying preset special effect in a corresponding display area (such as a preset control hot area) based on the pointing position of the display control device, and the like. In the following embodiments, an example in which the displayed object is a cursor is used to specifically describe the solutions provided in embodiments of this application. For a displayed object in another display form, refer to a specific implementation process of cursor presentation.

For example, in a demonstration scenario, the interface effect displayed on the display is, for example, displaying the cursor at the pointing position of the control device.

For another example, in a game scenario, the interface effect displayed on the display is, for example, displaying a game hero image at the pointing position of the control device, displaying a game hero image at a preset view angle at the pointing position of the control device, displaying game equipment at the pointing position of the control device, displaying game special effect (such as bubble special effect or firework special effect) at the pointing position of the control device, or displaying game special effect (such as targeting special effect or hit special effect) in a corresponding display area based on the pointing position of the display control device.

For another example, in a handwriting tablet scenario, the interface effect displayed on the display is, for example, displaying a stylus image and handwriting in the pointing position of the control device, or displaying handwriting in a corresponding display area (for example, a historical track that a stylus image passes through) based on the pointing position of the display control device.

It should be noted that, the interface effect displayed on the display by the display device following the movement track of the control device is merely used as an example. During actual application, the interface effect may be determined based on a specific application scenario, a function of a device, and the like. For example, in some embodiments, the display device may follow the movement track of the control device and display an icon on the display, and also display a virtual image, special effect, and the like at a preset view angle. For example, when the pointing position of the control device is in the preset control hot area, the display device may display corresponding interface effect such as a virtual image and special effect at a preset view angle when displaying an icon.

In an example, when positions of the control device and the display device relative to each other are determined through receiving and sending of positioning information, the control device or the display device may determine, by sending and receiving the positioning information, the pointing direction of the control device, a coordinate system in which the display of the display device is located, and a pose of the display of the display device relative to the control device, and then determine the position of the intersection point of the pointing direction of the control device and the plane on which the display of the display device is located, that is, the pointing position of the control device. Finally, the pointing position of the control device is used as the presentation position of the cursor.

In some implementations, the display device may determine the coordinate system in which the display of the display device is located and send the coordinate system to the control device. The control device determines the pointing direction of the control device and the pose of the display of the display device relative to the control device, determines the pointing position of the control device based on the foregoing information, and then sends the pointing position to the display device, so that the display device displays a cursor at a corresponding position.

In some other implementations, the control device may determine the pointing direction of the control device and send the pointing direction to the display device. The display device determines the coordinate system in which the display of the display device is located and the pose of the display of the display device relative to the control device, determines the pointing position of the control device based on the foregoing information, and displays a cursor at a corresponding position.

An execution body for calculating the pointing position of the control device is not specifically limited in this embodiment of this application, and may be determined based on an actual function of a device or an application scenario.

In some examples, the control device in this embodiment of this application may include but is not limited to a remote control, an air mouse, a portable device, or the like. For example, the portable device may include but is not limited to a smartphone, a smartwatch, a smart band, a telephone watch, a smart ring, smart glasses, an augmented reality (AR)/virtual reality (VR) gamepad, and the like. Alternatively, the control device may be a wearable device, a handheld device, a head mounted device, or the like that has a remote control function and that is of another type or structure. This is not limited in this embodiment of this application.

In some examples, the display device in this embodiment of this application may include but is not limited to a netbook, a tablet computer, a handwriting tablet, a vehicle-mounted computer, a personal computer (PC), a smart television, a laser television, an AR/VR device (such as VR glasses), a projection device (such as a projector), a somatosensory game console, and the like. Alternatively, the display device may be an electronic device that has a display function and that is of another type or structure. This is not limited in this embodiment of this application.

Figure 3:
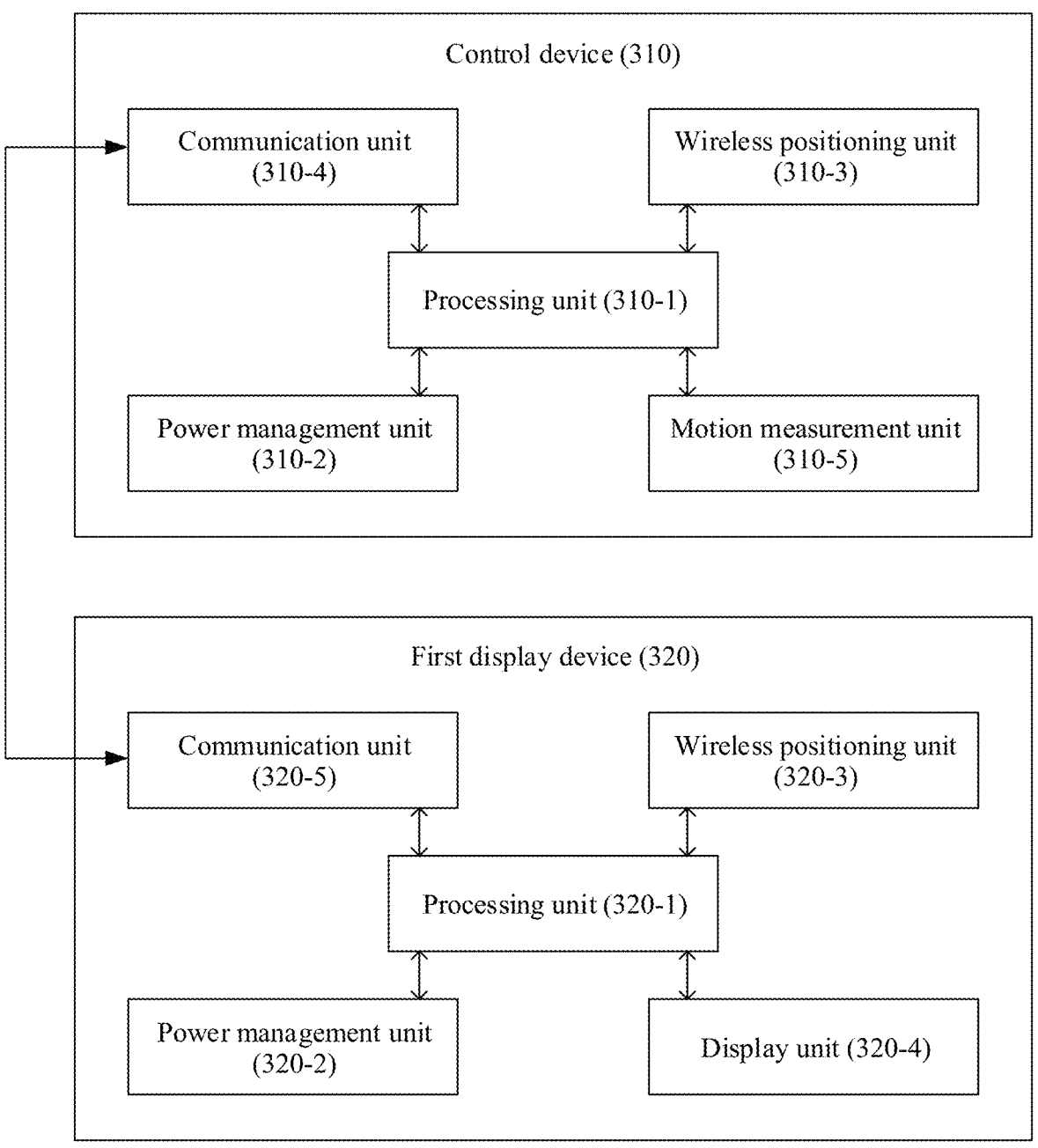
FIG. 3 is a schematic diagram of an architecture of a device remote control system in a single-display device scenario according to an embodiment of this application.

For example, refer to FIG. 3. FIG. 3 is a schematic diagram of an architecture of a device remote control system in a single-display device scenario according to an embodiment of this application. The device remote control system includes a control device 310 and a first display device 320. The first display device 320 is configured to perform interface display, and the control device 310 is configured to perform display control, operation control, and/or the like on the first display device 320.

As shown in FIG. 3, the control device 310 includes a processing unit 310-1, a power management unit (PMU) 310-2, a wireless positioning unit 310-3, and a communication unit 310-4.

The processing unit 310-1 is, for example, a central processing unit (CPU). In some embodiments, the processing unit 310-1 may include one or more interfaces. The interface may include but is not limited to an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, and the like.

A storage unit may be further disposed in the processing unit 310-1, and is configured to store instructions and data. In some embodiments, the storage unit in the processing unit 310-1 is a cache. The storage unit may store instructions or data that are/is recently used or cyclically used by the processing unit 310-1. If the processing unit 310-1 needs to use the instructions or the data again, the instructions or the data may be directly invoked from the storage unit. This avoids repeated access and reduces waiting time of the processing unit 310-1, and therefore improves efficiency of the system.

The power management unit 310-2 is configured to connect a battery and the processing unit 310-1. The power management unit 310-2 receives an input from the battery, and supplies power to the processing unit 310-1, the wireless positioning unit 310-3, the communication unit 310-4, and the like. For example, the power management unit 310-2 may convert, based on a feature of each of the processing unit 310-1, the wireless positioning unit 310-3, the communication unit 310-4, and another module, a level to a level that adapts to each module to supply power to the module. The power management module 310-2 may be further configured to monitor parameters such as a battery capacity, a battery cycle count, and a battery health status (electric leakage or impedance). In some other embodiments, the power management unit 310-2 may alternatively be disposed in the processing unit 310-1.

The wireless positioning unit 310-3 is configured to determine a pointing direction of the control device 310.

In some embodiments of this application, the wireless positioning unit 310-3 may be further configured to: determine a pose of a display (denoted as a first display) of the first display device 320 relative to the control device 320, and determine a position of an intersection point of the pointing direction of the control device 310 and a plane on which the first display is located, that is, a pointing position of the control device 310.

For example, the wireless positioning unit 310-3 may include but is not limited to one or more of the following: a multi-antenna ultra-wideband (UWB) radio positioning module, a multi-antenna millimeter-wave radar positioning module, a three-dimensional electromagnetic coil positioning module, a three-dimensional ultrasonic positioning module, and the like. The wireless positioning unit 310-3 may send and receive positioning information to and from the wireless positioning unit 320-3 of the first display device 320 by using one or more of the foregoing modules, to determine the pointing direction of the control device 310 and the pose of the first display relative to the control device 320. The positioning information may include one or more of the following information: a UWB signal, a millimeter-wave radar signal, an electromagnetic signal, and an ultrasonic signal.

The communication unit 310-4 is configured to process a communication event between the control device and another device, for example, the first display device 320. For example, the communication unit 310-4 may include but is not limited to one or more of the following: a communication interface, an antenna, a mobile communication module, a wireless communication module, a modem processor, a baseband processor, and the like.

The communication interface may include but is not limited to a wired communication interface such as a universal serial bus (USB) port.

The antenna is configured to transmit and receive an electromagnetic wave signal.

The mobile communication module may provide a wireless communication solution that is applied to the control device 310 and that includes 2G/3G/4G/5G or the like. The mobile communication module may include at least one filter, a switch, a power amplifier, a low noise amplifier (LNA), and the like. The mobile communication module may receive an electromagnetic wave through the antenna, perform processing such as filtering or amplification on the received electromagnetic wave, and then transmit the electromagnetic wave to the modem processor for demodulation. The mobile communication module may further amplify a signal modulated by the modem processor, and convert the signal into an electromagnetic wave for radiation through the antenna. In some embodiments, at least some functional modules of the mobile communication module may be disposed in the processing unit 310-1. In some embodiments, at least some functional modules in the mobile communication module may be disposed in a same component as at least some modules in the processing unit 310-1.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. In some embodiments, the modem processor may be an independent component. In some other embodiments, the modem processor may be independent of the processing unit 310-1, and is disposed in a same component as the mobile communication module or another functional module.

The wireless communication module may provide a wireless communication solution that is applied to the control device 310 and that includes a wireless local area network (WLAN) (for example, a Wi-Fi network), Bluetooth (BT), UWB, a global navigation satellite system (GNSS), a near field wireless communication (NFC) technology, an infrared (IR) technology, and the like. The wireless communication module may be one or more components that integrate at least one communication processing module. The wireless communication module receives an electromagnetic wave through the antenna, performs frequency modulation and filtering on an electromagnetic wave signal, and sends a processed signal to the processing unit 310-1. The wireless communication module may further receive a to-be-sent signal from the processing unit 310-1, perform frequency modulation and amplification on the signal, and convert the signal into an electromagnetic wave for radiation through the antenna.

In some other embodiments of this application, by using the wired communication interface or the wireless communication module, the control device 310 may receive, from the first display device 320, a first coordinate system in which the first display is located, and send the pointing position of the control device 310 and the like to the first display device 320.

In some embodiments of this application, the control device 310 may send the pointing direction of the control device 310 to the first display device 320 by using the wired communication interface or the wireless communication module, so that the first display device 320 determines the pointing position of the control device 310 based on this.

In some embodiments of this application, the control device 310 may send a display control instruction, for example, opening a file, drawing a line, or returning, to the first display device 320 by using the wired communication interface or the wireless communication module.

In some embodiments, as shown in FIG. 3, the control device 310 may further include a motion measurement unit 310-5, for example, an inertia measurement unit (IMU). The motion attitude detection unit 310-5 may include but is not limited to one or more of the following: an acceleration sensor, a gyroscope sensor, an angular acceleration sensor, a magnetic sensor, and the like, to measure a motion attitude of the control device 310.

In this embodiment of this application, the control device 310 may obtain a change of a position and an attitude of the control device 310 by using the motion measurement unit 310-5, to determine, based on a relative pose change of the control device, displacement of a cursor relative to a historical presentation position of the cursor, to further determine a presentation position of the cursor.

As shown in FIG. 3, the first display device 320 includes a processing unit 320-1, a power management unit 320-2, the wireless positioning unit 320-3, a display unit 320-4, and a communication unit 320-5.

The processing unit 320-1 is, for example, a CPU. In some embodiments, the processing unit 320-1 may include one or more interfaces. The interface may include but is not limited to an I2C interface, an I2S interface, a PCM interface, a UART interface, an MIPI, a GPIO interface, and the like.

A storage unit may be further disposed in the processing unit 320-1, and is configured to store instructions and data. In some embodiments, the storage unit in the processing unit 320-1 is a cache. The storage unit may store instructions or data that are/is recently used or cyclically used by the processing unit 320-1. If the processing unit 320-1 needs to use the instructions or the data again, the instructions or the data may be directly invoked from the storage unit. This avoids repeated access and reduces waiting time of the processing unit 320-1, and therefore improves efficiency of the system.

The power management unit 320-2 is configured to connect a battery and the processing unit 320-1. The power management unit 320-2 receives an input from the battery, and supplies power to the processing unit 320-1, the wireless positioning unit 320-3, the communication unit 310-4, and the like. For example, the power management unit 310-2 may convert, based on a feature of each of the processing unit 310-1, the wireless positioning unit 310-3, the display unit 320-4, the communication unit 320-5, and another module, a level to a level that adapts to each module to supply power to the module. The power management module 320-2 may be further configured to monitor parameters such as a battery capacity, a battery cycle count, and a battery health status (electric leakage or impedance). In some other embodiments, the power management unit 320-2 may alternatively be disposed in the processing unit 320-1.

The wireless positioning unit 320-3 may be configured to determine the first coordinate system in which the first display is located.

In some embodiments of this application, the wireless positioning unit 320-3 may be further configured to: determine the pose of the first display relative to the control device 320, and determine the position of the intersection point of the pointing direction of the control device 310 and the plane on which the first display is located, that is, the pointing position of the control device 310.

For example, the wireless positioning unit 320-3 may include but is not limited to one or more of the following: a UWB positioning module, a multi-antenna millimeter-wave radar positioning module, a three-dimensional electromagnetic coil positioning module, a three-dimensional ultrasonic positioning module, and the like. The wireless positioning unit 320-3 may send and receive positioning information to and from the wireless positioning unit 310-3 of the remote control device 310 by using one or more of the foregoing modules, to determine the first coordinate system in which the first display is located or the pose of the first display relative to the control device 320.

The display unit 320-4 is configured to display an image, a video, and the like. For example, the display unit 320-4 may include a display.

In this embodiment of this application, the display unit 320-4 may be configured to display content. In some embodiments, the display unit 320-4 may be further configured to display the cursor at the pointing position of the control device 310.

It should be noted that, in this embodiment of this application, the display unit 320-4 may be integrated with other modules such as the processing unit 320-1, the power management unit 320-2, the wireless positioning unit 320-3, and the communication unit 320-5 (that is, an integrated display device), or may be independent of other modules such as the processing unit 320-1, the power management unit 320-2, the wireless positioning unit 320-3, and the communication unit 320-5 (that is, a split display device). This is not specifically limited in this embodiment of this application.

The display in this embodiment of this application is a concept in a broad sense. The display is a display carrier. For example, if the first display device 320 is an integrated display device such as a television or a PC, the display carrier may be a display panel or the like. If the first display device 320 is a split display device such as a projector, the display carrier may be a curtain, a wall, a ceiling, or the like. In addition, the display in this embodiment of this application may be a plane or a curved surface. This is not limited.

The communication unit 320-5 is configured to process a communication event between the first display device 320 and another device, for example, the control device 320. For example, the communication unit 320-5 may include but is not limited to one or more of the following: a communication interface, an antenna, a mobile communication module, a wireless communication module, a modem processor, a baseband processor, and the like.

The communication interface may include but is not limited to a wired communication interface such as a USB port.

The antenna is configured to transmit and receive an electromagnetic wave signal.

The mobile communication module may provide a wireless communication solution that is applied to the first display device 320 and that includes 2G/3G/4G/5G or the like. The mobile communication module may include at least one filter, a switch, a power amplifier, a low noise amplifier (LNA), and the like. The mobile communication module may receive an electromagnetic wave through the antenna, perform processing such as filtering or amplification on the received electromagnetic wave, and then transmit the electromagnetic wave to the modem processor for demodulation. The mobile communication module may further amplify a signal modulated by the modem processor, and convert the signal into an electromagnetic wave for radiation through the antenna. In some embodiments, at least some functional modules of the mobile communication module may be disposed in the processing unit 320-1. In some embodiments, at least some functional modules in the mobile communication module may be disposed in a same component as at least some modules in the processing unit 320-1.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transmits the low-frequency baseband signal obtained through demodulation to the baseband processor for processing. In some embodiments, the modem processor may be an independent component. In some other embodiments, the modem processor may be independent of the processing unit 320-1, and is disposed in a same component as the mobile communication module or another functional module.

The wireless communication module may provide a wireless communication solution that is applied to the first display device 320 and that includes a WLAN (for example, a Wi-Fi network), BT, UWB, a GNSS, NFC, IR, and the like. The wireless communication module may be one or more components that integrate at least one communication processing module. The wireless communication module receives an electromagnetic wave through the antenna, performs frequency modulation and filtering on an electromagnetic wave signal, and sends a processed signal to the processing unit 320-1. The wireless communication module may further receive a to-be-sent signal from the processing unit 320-1, perform frequency modulation and amplification on the signal, and convert the signal into an electromagnetic wave for radiation through the antenna.

In some embodiments of this application, by using the wired communication interface or the wireless communication module, the first display device 320 may send, to the control device 310, the first coordinate system in which the first display is located, and receive the pointing position of the control device 310 and the like from the control device 310.

In some other embodiments of this application, the first display device 320 may receive the pointing direction of the control device 310 from the control device 310 by using the wired communication interface or the wireless communication module.

In some embodiments of this application, the first display device 320 may receive the control instruction, for example, opening a file, drawing a line, or returning, from the control device 310 by using the wired communication interface or the wireless communication module.

In the device display control method provided in this embodiment of this application, the presentation position of the cursor is determined based on the pointing position of the control device. Therefore, when the pointing position of the control device is not on the display of the display device, the display device does not display the cursor. The display device displays the cursor at the pointing position of the control device only when the pointing position of the control device enters an edge area of the display of the display device. Therefore, in the single-display device scenario, this solution can bring convenient, immersive, and precise cursor control and device control experience to a user.

Figure 4:
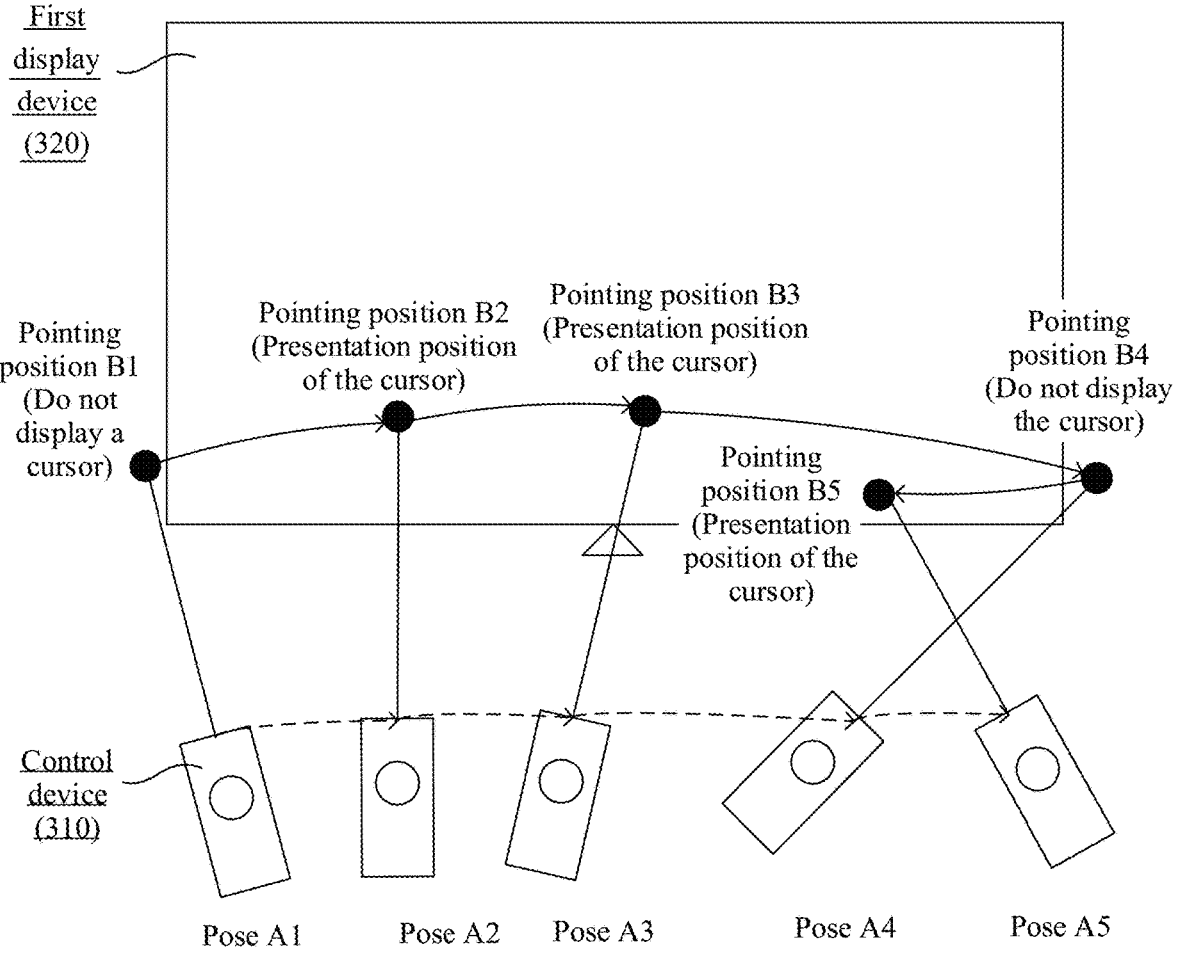
FIG. 4 is a schematic diagram of a presentation process of a remote control cursor in a single-display device scenario according to an embodiment of this application.

For example, refer to FIG. 4. FIG. 4 is a schematic diagram of a presentation process of a remote control cursor in a single-display device scenario according to an embodiment of this application. The single-display device scenario shown in FIG. 4 includes the control device 310 and the first display device 320. The first display device 320 is configured to perform interface display, and the control device 310 is configured to perform display control, operation control, and/or the like on the first display device 320.

As shown in FIG. 4, when the control device 310 with a pose A1 points to a position B1 beyond the display, because the position B1 is not on the first display, the first display device 320 does not display the cursor. When the control device 310 with a pose A2 points to a position B2, because the position B2 is on the first display, the first display device 320 displays the cursor at the pointing position B2 of the control device 310. Similarly, when the control device 310 with a pose A3 points to a position B3, the first display device 320 displays the cursor at the pointing position B3 of the control device 310. When the control device 310 with a pose A4 points to a position B4 beyond the display, because the position B4 is not on the first display, the first display device 320 does not display the cursor. When a pose of the control device 310 changes from the pose A4 to A5, because a position B5 returns to the first display, the first display device 320 displays the cursor at the pointing position B5 of the control device 310.

It can be learned that, compared with a presentation process of the remote control cursor in the single-display device scenario shown in FIG. 1, in the presentation process of the remote control cursor in the single-display device scenario shown in FIG. 4, for each presentation position of the cursor on the first display device 320 (that is, the pointing position of the control device 310), reference is made to the pointing position of the control device 310. Therefore, when the pointing position of the control device 310 is not on the first display, the first display device 320 does not display the cursor. The first display device 320 displays the cursor at the pointing position of the control device 310 only when the pointing position of the control device 310 enters the edge area of the first display. In addition, when the pointing position of the control device 310 moves out of the first display, the cursor is not stuck on a frame. In this way, after the pointing position of the control device 310 enters the edge area of the first display, the first display device 320 may follow a movement track of the control device 310 and display corresponding interface effect (for example, display the cursor) on the first display. When the pointing position of the control device 310 moves out of any edge area (for example, an upper edge area, a lower edge area, a left edge area, or a right edge area) of the first display, the first display device 320 no longer displays corresponding interface effect (for example, does not display the cursor) on the first display. Therefore, in the single-display device scenario, this solution can bring convenient, immersive, and precise cursor presentation, cursor control and device control experience to the user.

Figure 5:
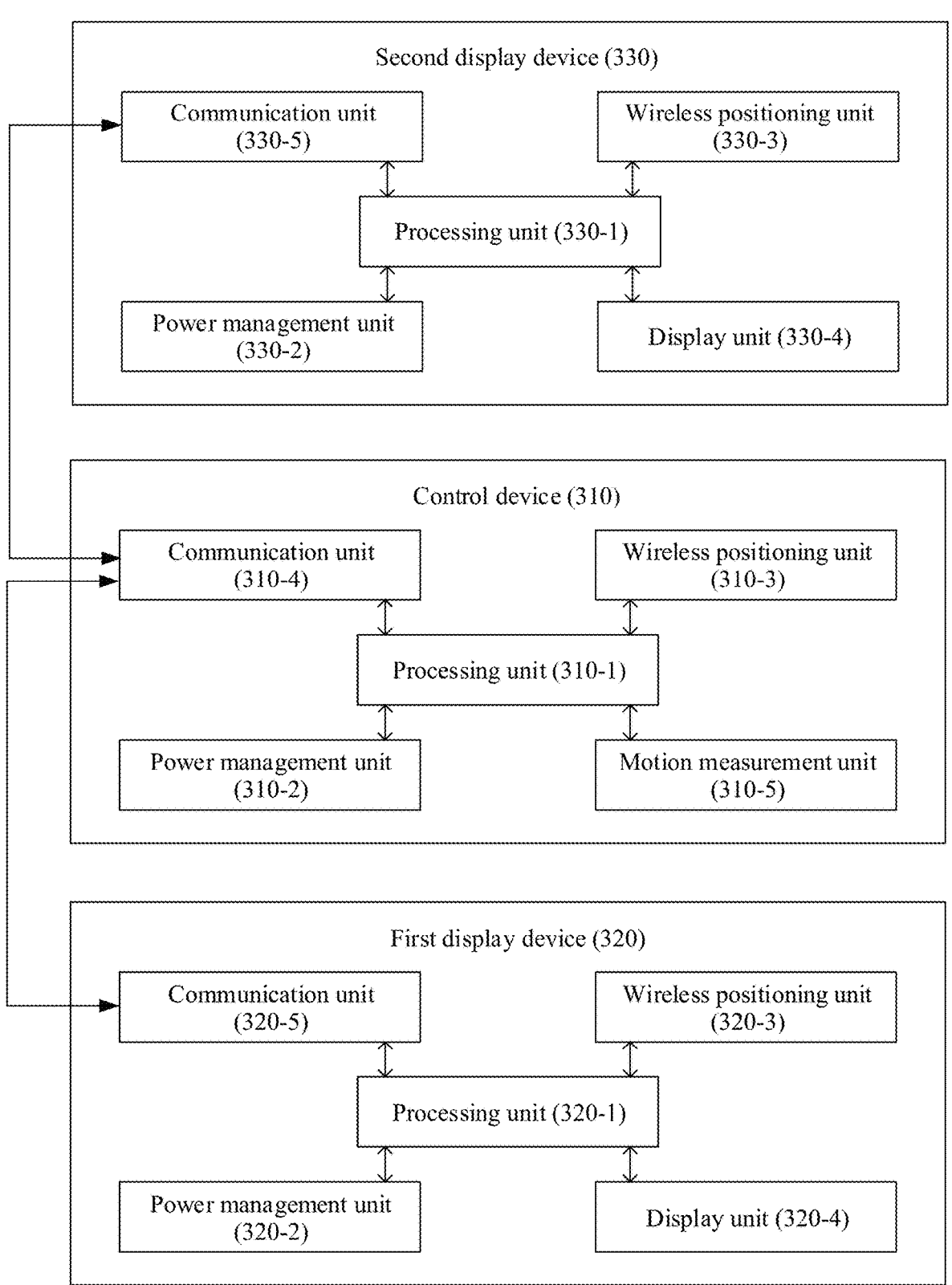
FIG. 5 is a schematic diagram of an architecture of a device remote control system in a multi-display device scenario according to an embodiment of this application.

For another example, refer to FIG. 5. FIG. 5 is a schematic diagram of an architecture of a device remote control system in a multi-display device scenario according to an embodiment of this application. The device remote control system includes a control device 310, a first display device 320, and a second display device 330. The first display device 320 and the second display device 330 are configured to perform interface display, and the control device 310 is configured to perform display control, operation control, and/or the like on the first display device 320 or the second display device 330.

As shown in FIG. 5, the control device 310 includes a processing unit 310-1, a power management unit 310-2, a wireless positioning unit 310-3, and a communication unit 310-4.

The wireless positioning unit 310-3 is configured to determine a pointing direction of the control device 310.

In some embodiments of this application, the wireless positioning unit 310-3 may be further configured to: determine poses of a display (that is, a first display) of the first display device 320 and a display (denoted as a second display) of the second display device 330 relative to the control device 320, and determine, based on the foregoing information, a position of an intersection point of the pointing direction of the control device 310 and a plane on which the first display is located, that is, a pointing position of the control device 310.

For example, the wireless positioning unit 310-3 may send and receive positioning information to and from a wireless positioning unit 320-3 of the first display device 320 and a wireless positioning unit 330-3 of the second display device 330 by using one or more of the following: a UWB positioning module, a multi-antenna millimeter-wave radar positioning module, a three-dimensional electromagnetic coil positioning module, a three-dimensional ultrasonic positioning module, and the like, to determine the pointing direction of the control device 310, the pose of the first display relative to the control device 320, and the pose of the second display relative to the control device 320.

The communication unit 310-4 is configured to process a communication event between the control device and another device, for example, the first display device 320 or the second display device 330.

In some other embodiments of this application, by using a wired communication interface or a wireless communication module, the control device 310 may receive, from the first display device 320, a first coordinate system in which the first display is located, receive, from the second display device 330, a second coordinate system in which the second display is located, and send the pointing position of the control device 310 and the like to the first display device 320 or the second display device 330.

In some embodiments of this application, the control device 310 may send the pointing direction of the control device 310 to the first display device 320 or the second display device 330 by using a wired communication interface or a wireless communication module, so that the first display device 320 determines the pointing position of the control device 310 based on this.

In some embodiments of this application, the control device 310 may send a display control instruction, for example, opening a file, drawing a line, or returning, to the first display device 320 or the second display device 330 by using a wired communication interface or a wireless communication module.

In some embodiments, as shown in FIG. 5, the control device 310 may further include a motion measurement unit 310-5, for example, an IMU. The motion attitude detection unit 310-5 may include but is not limited to one or more of the following: an acceleration sensor, a gyroscope sensor, an angular acceleration sensor, a magnetic sensor, and the like, to measure a motion attitude of the control device 310.

For specific descriptions of the processing unit 310-1, the power management unit 310-2, the wireless positioning unit 310-3, the communication unit 310-4, and the motion attitude detection unit 310-5, refer to the foregoing description of FIG. 3. Details are not described herein again.

As shown in FIG. 3, the first display device 320 includes a processing unit 320-1, a power management unit 320-2, the wireless positioning unit 320-3, a display unit 320-4, and a communication unit 320-5. The second display device 330 includes a processing unit 330-1, a power management unit 330-2, the wireless positioning unit 330-3, a display unit 330-4, and a communication unit 330-5.

For specific descriptions of the processing unit 320-1, the power management unit 320-2, the wireless positioning unit 320-3, the display unit 320-4, and the communication unit 320-5, refer to the foregoing description of FIG. 3. Details are not described herein again. In addition, for the processing unit 330-1, the power management unit 330-2, the wireless positioning unit 330-3, the display unit 330-4, and the communication unit 330-5, refer to the foregoing specific descriptions of the processing unit 320-1, the power management unit 320-2, the wireless positioning unit 320-3, the display unit 320-4, and the communication unit 320-5 respectively. Details are not described herein again.

The first display device 320 and the second display device 330 may be display devices of a same type, a same size of a display, or a same resolution of a display. For example, the first display device 320 may be a television 1, the second display device 330 may be a television 2, and sizes of displays and/or resolutions of displays of the television 1 and the television 2 are the same. Alternatively, the first display device 320 and the second display device 330 may be display devices of different types, different sizes of displays, or different resolutions of displays. For example, the first display device 320 may be a projector, and the second display device 330 may be a television. Types, sizes of displays, and resolutions of displays of the projector and the television are different. In the multi-display device scenario, specific types, sizes of displays, resolutions of displays, and the like of a plurality of display devices are not limited in this embodiment of this application.

In the device display control method provided in this embodiment of this application, a presentation position of a cursor is determined based on the pointing position of the control device. Therefore, when the pointing position of the control device is not on the display of the display device, the display device does not display the cursor. The display device displays the cursor at the pointing position of the control device only when the pointing position of the control device enters an edge area of the display of the display device. In addition, in this solution, an orientation relationship between the plurality of display devices does not need to be preset. When the cursor continues between the plurality of display devices, whether the pointing position of the control device is located on the display of a specific display device can be automatically sensed. Therefore, the cursor can always traverse accurately without being affected by a change of the orientation relationship between the plurality of display devices. In addition, this solution is not affected by different types, different sizes of displays, different resolutions of displays, different distances between a plurality of displays, and the like of the plurality of display devices. Therefore, in the multi-display device scenario, this solution can also bring convenient, immersive, and precise cursor control and device control experience to a user.

Figure 6:
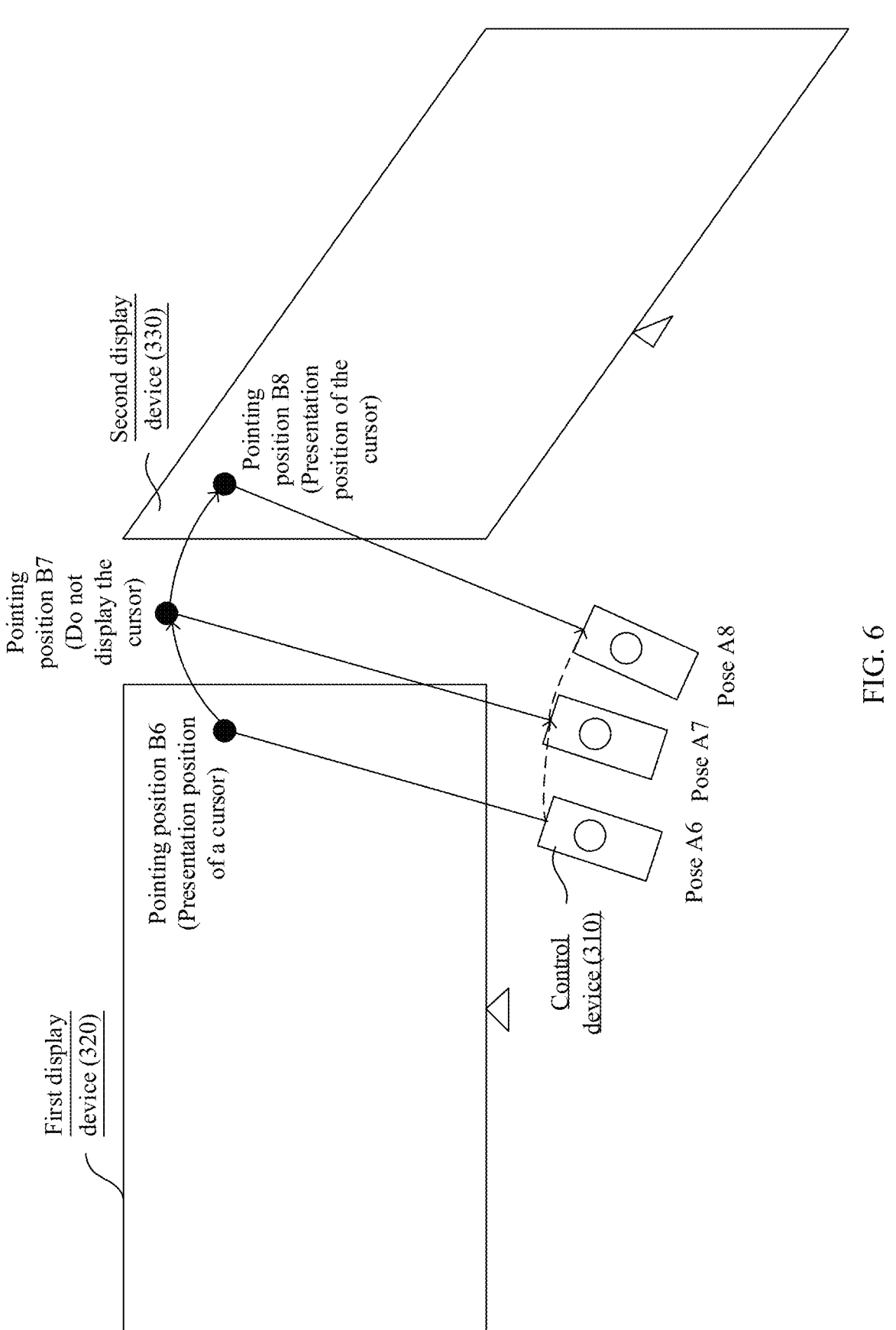
FIG. 6 is a schematic diagram of a presentation process of a remote control cursor in a multi-display device scenario according to an embodiment of this application.

For example, refer to FIG. 6. FIG. 6 is a schematic diagram of a presentation process of a remote control cursor in a multi-display device scenario according to an embodiment of this application. The multi-display device scenario shown in FIG. 6 includes the control device 310, the first display device 320, and the second display device 330. The first display device 320 and the second display device 330 are configured to perform interface display, and the control device 310 is configured to perform display control, operation control, and/or the like on the first display device 320 or the second display device 330.

As shown in FIG. 6, when the control device 310 with a pose A6 points to a position B6 on the first display, the first display device 320 displays the cursor at the pointing position B6 of the control device 310. When a pointing position B7 of the control device 310 with a pose A7 moves out of the first display and is not on the second display, neither the first display device 320 nor the second display device 330 displays the cursor. When a pointing position B8 of the control device 310 with a pose A8 enters the second display, the second display device 330 displays the cursor at the pointing position B8 of the control device 310.

It can be learned that, compared with the presentation process of the remote control cursor in the conventional multi-display device scenario shown in FIG. 2, in the presentation process of the remote control cursor in the multi-display device scenario shown in FIG. 6, the first display device 320 displays the position of the cursor (that is, the pointing position of the control device 310) with reference to the pointing position of the control device 310. Therefore, when the pointing position of the control device 310 is not on the display of any display device, the plurality of display devices do not display the cursor. A display device displays the cursor at the pointing position of the control device 310 only when the pointing position of the control device 310 enters an edge area of a display of the display device (for example, the first display device 320 or the second display device 330). In this way, after the pointing position of the control device 310 enters an edge area of the first display, the first display device 320 may follow a movement track of the control device 310 and display corresponding interface effect (for example, display the cursor) on the first display. In a process in which the pointing position of the control device 310 traverses from the first display device 320 to the second display device 330, when the pointing position of the control device 310 moves out of any edge area (for example, an upper edge area, a lower edge area, a left edge area, or a right edge area) of the first display and does not enter an edge area of the second display, the first display device 320 no longer displays corresponding interface effect (for example, does not display the cursor) on the first display. After the pointing position of the control device 310 enters the edge area of the second display, the second display device 330 may follow the movement track of the control device 310 and display corresponding interface effect (for example, display the cursor) on the second display. When the cursor is displayed, the display device (for example, the first display device 320 or the second display device 330) may follow the movement track of the control device 310 and display, on the display, a cursor presentation track that matches the movement track.

In this embodiment of this application, that the pointing position of the control device enters the edge area of the display means that the pointing position of the control device moves from outside of the display into the edge area of the display. That the pointing position of the control device moves out of any edge area of the display means that the pointing position of the control device moves out of the display from any edge area of the display.

In addition, when an orientation relationship between the first display device 320 and the second display device 330 shown in FIG. 6 changes, accurate traversal of the cursor when the cursor continues is still not affected. In addition, regardless of whether the first display device 320 and the second display device 330 shown in FIG. 6 have a same type, a same size of a display, and a same resolution of a display, and the like, and how long a distance between the displays of the first display device 320 and the second display device 330 is, accurate display of the cursor is not affected. For example, it is assumed that the orientation relationship between the first display device 320 and the second display device 330 changes from a first relationship to a second relationship, and when the pointing position of the control device 310 is determined, the pointing position of the control device 310 may be determined based on the latest second relationship. When the pointing position of the control device 310 does not enter an edge area of any display, neither the first display device 320 nor the second display device 330 displays a corresponding displayed object. Only when the pointing position of the control device 310 enters the edge area of the first display or the second display, the cursor is displayed on a corresponding display following the movement track of the control device.

In addition, when an orientation relationship between the first display device 320 or the second display device 330 and the remote control device 310 shown in FIG. 6 changes, or when a screen resolution and/or a focal length corresponding to the first display device 320 or the second display device 330 changes, accurate traversal of the cursor when the cursor continues is still not affected. For example, when the screen resolution and/or the focal length corresponding to the display device (for example, the first display device 320 or the second display device 330) changes, and the pointing position of the control device 310 is determined, the pointing position of the control device 310 may be determined based on a latest screen resolution and/or a latest focal length. When the pointing position of the control device 310 does not enter an edge area of any display, neither the first display device 320 nor the second display device 330 displays a corresponding displayed object. Only when the pointing position of the control device 310 enters the edge area of the first display or the second display, the cursor is displayed on a corresponding display following the movement track of the control device. For another example, when the orientation relationship between the display device (for example, the first display device 320 or the second display device 330) and the remote control device 310 changes, and the pointing position of the control device 310 is determined, the pointing position of the control device 310 may be determined based on a latest orientation relationship. When the pointing position of the control device 310 does not enter an edge area of any display, neither the first display device 320 nor the second display device 330 displays a corresponding displayed object. Only when the pointing position of the control device 310 enters the edge area of the first display or the second display, the cursor is displayed on a corresponding display following the movement track of the control device.

In conclusion, in the multi-display device scenario, the solution provided in this embodiment of this application can also bring convenient, immersive, and precise cursor control and device control experience to the user.

It may be understood that the structure shown in FIG. 3 in this application does not constitute specific limitations on the control device 310 and the first display device 320, and the structure shown in FIG. 5 does not constitute specific limitations on the control device 310, the first display device 320, and the second display device 330. In some other embodiments of this application, the control device 310, the first display device 320, or the second display device 330 may include more or fewer components than those shown in the figure, or combine some components, or split some components, or have different component arrangements. The components shown in the figure may be implemented by hardware, software, or a combination of software and hardware.

For example, the control device 310, the first display device 320, or the second display device 330 may further include one or more of the following: a memory (including an external memory interface and an internal memory), a charging management unit, an audio module, a loudspeaker, a receiver, a microphone, a headset jack, a button, a camera, and the like. For another example, the control device 310, the first display device 320, or the second display device 330 may further include one or more sensors such as a touch sensor, a pressure sensor, a barometric pressure sensor, a distance sensor, an optical proximity sensor, a fingerprint sensor, a temperature sensor, an ambient light sensor, and a bone conduction sensor.

It should be noted that a quantity of displays included in a display device (for example, the first display device or the second display device) is not limited in this embodiment of this application. In some embodiments, the display device may include a plurality of displays and one wireless positioning unit. The wireless positioning unit may be configured to determine coordinates of the plurality of displays. Alternatively, in some embodiments, the display device may include a plurality of displays and a plurality of wireless positioning units, and the plurality of wireless positioning units are respectively configured to determine coordinates of the plurality of displays.

With reference to a scenario 1 and a scenario 2, the following specifically describes the device display control method provided in this embodiment of this application.
Scenario 1: A Single-Display Device Scenario The single-display device scenario includes a control device 310 and a first display device 320. The first display device 320 is configured to perform interface display, and the control device 310 is configured to perform display control, operation control, and/or the like on the first display device 320.

In some examples, in a process in which the first display device 320 displays a cursor based on a pointing direction of the control device 310, the first display device 320 may send and receive positioning information to and from the control device 310 to determine a first coordinate system in which a display (for example, a first display) of the first display device 320 is located, and send the first coordinate system to the control device 310. The control device 310 may send and receive the positioning information to and from the first display device 320 to determine the pointing direction of the control device 310 and a first pose of the first display relative to the control device 320, determine a position of an intersection point of the pointing direction of the control device 310 and a plane on which the first display is located (that is, a pointing position of the control device 310), and when the pointing position of the control device 310 is on the first display, send the pointing position of the control device 310 to the first display device 320, so that the first display device 320 displays the cursor at the pointing position of the control device 310. The positioning information may be sent and received between the first display device 320 and the control device 310 by using respective wireless positioning units.

Figure 7:
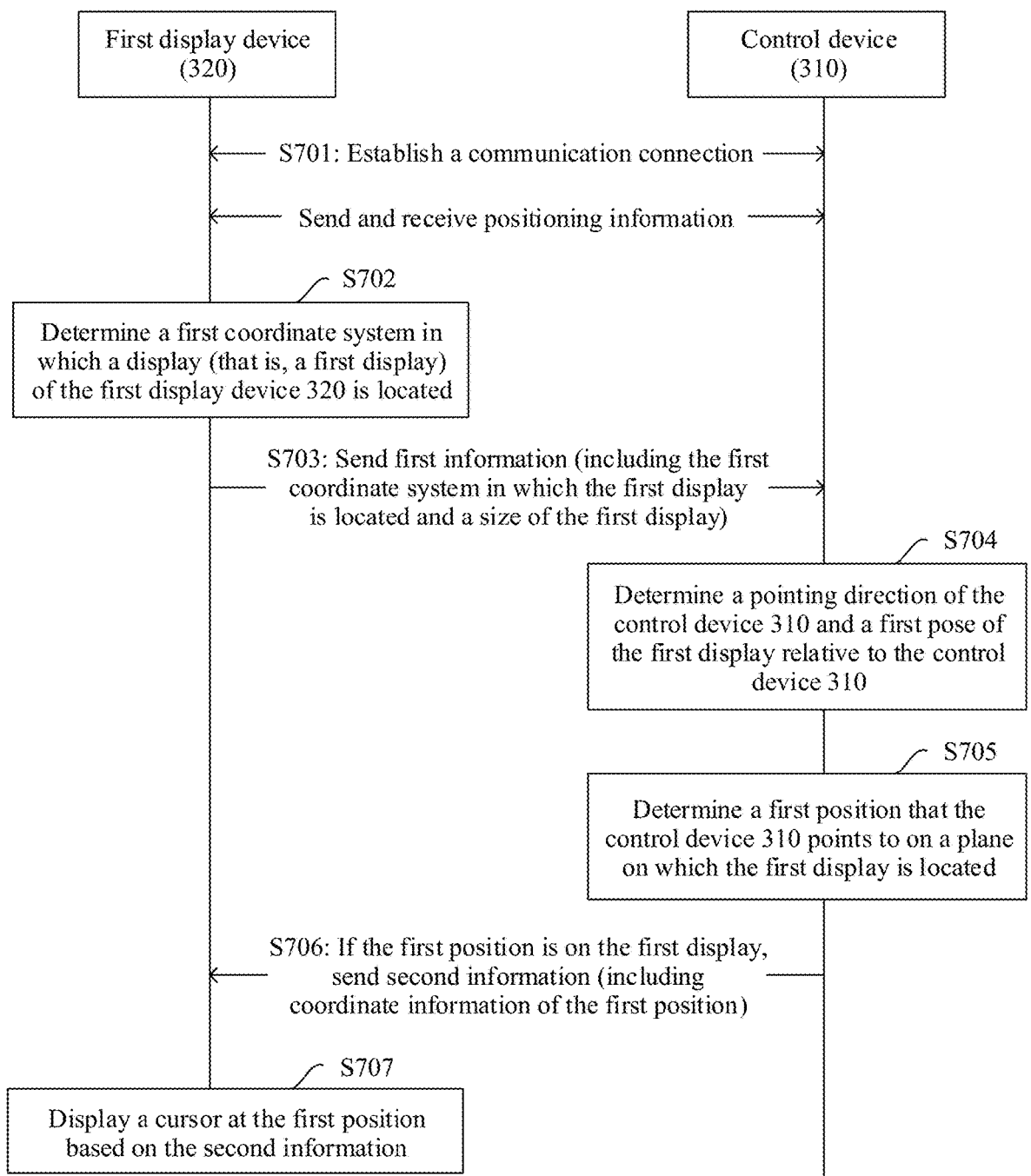
FIG. 7 is a flowchart 1 of a device display control method in a single-device scenario according to an embodiment of this application.

For example, refer to FIG. 7. FIG. 7 is a flowchart of a device display control method according to an embodiment of this application. As shown in FIG. 7, the device display control method provided in this embodiment of this application may include the following S701 to S707.

S701: The control device 310 establishes a communication connection to the first display device 320.

The communication connection established between the control device 310 and the first display device 320 may include but is not limited to a wired communication connection and a wireless communication connection. The wireless communication connection may include but is not limited to a Bluetooth connection, a Wi-Fi P2P connection, and the like.

S702: The first display device 320 determines the first coordinate system in which the display (that is, the first display) of the first display device 320 is located.

In a possible implementation, as shown in FIG. 7, the first display device 320 may send and receive the positioning information to and from the control device 310 to determine the first coordinate system in which the first display is located.

In a possible implementation, the first display device 320 may determine the first coordinate system in which the first display is located, based on one or more of the following methods: a multi-antenna UWB positioning method, a multi-antenna millimeter-wave radar positioning method, a three-dimensional electromagnetic coil positioning method, and a three-dimensional ultrasonic positioning method. The multi-antenna UWB positioning method is, for example, a multi-antenna time difference of arrival (TDOA) positioning method, a multi-antenna time of flight (TOF) ranging method, or a multi-antenna angle of arrival (AOA) positioning method. For example, the positioning information may include one or more of the following information: a UWB signal, a millimeter-wave radar signal, an electromagnetic signal, and an ultrasonic signal. A specific method used by the first display device 320 to determine the first coordinate system is not limited in this embodiment of this application, and may be determined based on an actual structure and an actual function of a device, an application scenario, and the like.

In some embodiments, if the first display device 320 includes M antennas (M≥3), and a plane including equivalent centers of the M antennas coincides with or is parallel to the display, the first coordinate system in which the first display is located may be determined by using the multi-antenna UWB positioning method. Refer to FIG. 8. FIG. 8 is a schematic diagram of a method for determining, based on a multi-antenna UWB positioning method, a coordinate system in which a display is located according to an embodiment of this application, where an example in which the first display device 320 is an integrated display device is used.

As shown in FIG. 8, a first antenna (such as a transmit antenna), a second antenna (such as a receive antenna), a third antenna (such as a horizontal antenna), and a fourth antenna (such as a vertical antenna) are disposed on the first display. The first display device 320 may construct, based on the multi-antenna UWB positioning method by using steps S901 to S903 shown in FIG. 9, the first coordinate system in which the first display is located. S901 is: The first display device 320 transmits positioning information to the control device 310, and performs multi-antenna time difference of arrival measurement. S902 is: The first display device 320 obtains distances r between a plurality of antennas of the control device 310 and the plurality of antennas of the first display device 320 through calculation based on a multi-antenna time difference of arrival measurement result. S903 is: The first display device 320 obtains horizontal deflection angles and vertical pitch angles between the plurality of antennas of the control device 310 and the plurality of antennas of the first display device 320 through calculation based on the multi-antenna time difference of arrival measurement result, and obtains positions of the equivalent centers of the plurality of antennas of the first display device 320 through calculation in combination of the distances r, to construct the first coordinate system in which the first display is located. In addition, the first display device 320 may determine, based on the positions of the plurality of equivalent centers, a plane on which the M antennas are located. Because the distances between the first display and the M antennas are known, the first display device 320 may further determine a position relationship of the first display relative to the plane on which the M antennas are located, and further determine, based on this, a first plane on which the first display is located.

For example, if distances between the plurality of equivalent centers and the first display are 0, the first plane on which the first display is located is the plane on which the plurality of equivalent centers are located. If distances between the plurality of equivalent centers and the first display are not 0 (for example, the distances are d, where d is a vector value), the first plane on which the first display is located is a plane that is parallel to the plane on which the plurality of equivalent centers are located and that is at a distance d from the plane on which the plurality of equivalent centers are located. In FIG. 8, that the distances between the positions of the plurality of equivalent centers and the first display are 0 is merely used as an example.

It may be understood that, after the first coordinate system in which the first display is located is determined, because size information of the first display and a position relationship between the first display and the M antennas are known, the first display device 320 may construct, based on this, the first coordinate system in which the first display is located.

As shown in FIG. 8, the first coordinate system may be a first coordinate system in which a coordinate origin O1 is located in a geometric center of the M antennas, an X1O1Y1 plane coincides with the first plane on which the first display is located, and a Z1 axis, an X1 axis, and a Y1 axis satisfy a right-hand spiral criterion. Certainly, the first coordinate system shown in FIG. 8 is merely used as an example, and a construction principle of the first coordinate system is not specifically limited in this application. For example, the coordinate origin O1 may alternatively be disposed at an edge center (for example, a left edge center) of the first display or at another position on the first plane.

Figure 10:
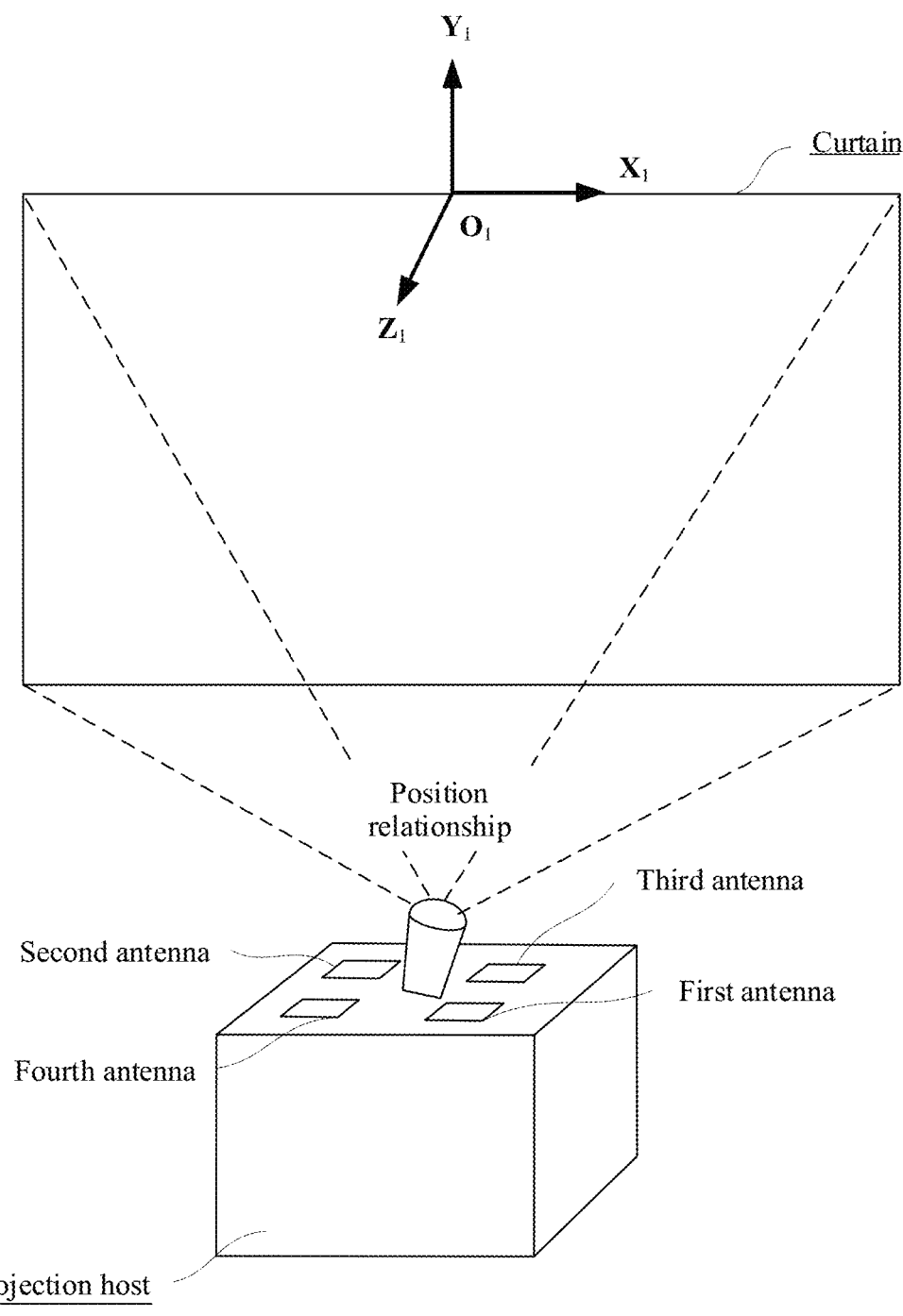
FIG. 10 is a schematic diagram of another method for determining, based on a multi-antenna UWB positioning method, a coordinate system in which a display is located according to an embodiment of this application.

It should be noted that, in FIG. 8, that the first display device 320 is the integrated display device is merely used as an example to describe a specific process of determining coordinates of the display based on the multi-antenna UWB positioning method. In a case in which the first display device 320 is a split display device, for example, the first display device 320 is a projector shown in FIG. 10, and the first display is a curtain shown in FIG. 10, a principle of determining coordinates of the display is the same as the example shown in FIG. 8. For example, M antennas are disposed on a projection host of the projector (that is, the first display device 320), and the projector may also determine, based on the multi-antenna UWB positioning method, positions of equivalent centers of the M antennas by using steps S901 to S903 shown in FIG. 9. In addition, the projector may determine, based on the positions of the plurality of equivalent centers, a plane on which the M antennas are located. Further, because size information of the curtain (that is, the first display) and a position relationship between the curtain and the M antennas are known, the projector may further determine a position relationship of the first display relative to a plane on which the M antennas are located, to construct, based on this, a first coordinate system in which the curtain is located.

In a case in which the first display device 320 is the projector and the first display is the curtain, the first display device 320 may determine the position relationship between the curtain and the M antennas and the size information of the curtain based on one or more of the following data: a focal length parameter of the projection host, a projection distance of the projection host, and a projection skew angle of the projection host. For example, the focal length parameter of the projection host may be set manually, or may be set by default. The projection distance of the projection host or the projection skew angle of the projection host may be obtained through measurement based on a method such as a multi-point TOF ranging method.

S703: The first display device 320 sends first information to the control device 310, where the first information includes the first coordinate system in which the display (that is, the first display) of the first display device 320 is located and a size of the first display.

S704: The control device 310 determines the pointing direction of the control device 310 and the first pose of the first display relative to the control device 310.

In a possible implementation, the first display device 320 may send and receive the positioning information to and from the control device 310 to determine the pointing direction of the control device 310 and the first pose of the first display relative to the control device 310.

In a possible implementation, the control device 310 may determine the pointing direction of the control device 310 and the first pose of the first display relative to the control device 310 based on one or more of the following methods: a multi-antenna UWB positioning method, a multi-antenna millimeter-wave radar positioning method, a three-dimensional electromagnetic coil positioning method, and a three-dimensional ultrasonic positioning method. For example, the positioning information may include one or more of the following information: a UWB signal, a millimeter-wave radar signal, an electromagnetic signal, and an ultrasonic signal. The multi-antenna UWB positioning method is, for example, a TDOA positioning method, a TOF ranging method, or an AOA positioning method. A specific method used by the control device 310 is not limited in this embodiment of this application, and may be determined based on an actual structure and an actual function of a device, an application scenario, and the like.

In some embodiments, if the control device 310 includes N antennas (N≥3), and a plane including equivalent centers of the N antennas is perpendicular to an axial direction of the control device 310, the pointing direction of the control device 310 may be determined by using the multi-antenna UWB positioning method.

As shown in FIG. 8, a fifth antenna (such as an origin antenna), a sixth antenna (such as a horizontal antenna), and a seventh antenna (such as a vertical antenna) are disposed on the control device 310. The control device 310 may determine, based on the multi-antenna UWB positioning method, positions of the equivalent centers of the N antennas by using steps S1101 to S1103 shown in FIG. 11. In addition, the control device 310 may determine, based on the positions of the plurality of equivalent centers, a plane on which the N antennas are located. S1101 shown in FIG. 11 is: The control device 310 transmits the positioning information to the first display device 320, to perform multi-antenna time difference of arrival measurement. S1102 is: The control device 310 obtains distances r between the plurality of antennas of the first display device 320 and the plurality of antennas of the control device 310 through calculation based on a multi-antenna time difference of arrival measurement result. S1103 is: The control device 310 obtains horizontal deflection angles and vertical pitch angles between the plurality of antennas of the first display device 320 and the plurality of antennas of the control device 310 through calculation based on the multi-antenna time difference of arrival measurement result, and obtains positions of the equivalent centers of the plurality of antennas of the control device 310 in the first coordinate system through calculation in combination of the distances r, to determine the pointing direction of the control device 310. For example, because the plane including the equivalent centers of the N antennas is perpendicular to the axial direction of the control device 310, a pointing direction P of the control device 310 shown in FIG. 8 may be determined based on the equivalent centers of the N antennas.

Further, as shown in FIG. 11, after the positions of the equivalent centers of the plurality of antennas of the control device 310 are obtained through calculation, the control device 310 may further determine the first pose of the first display relative to the control device 310 by using steps S1104 and S1105 shown in FIG. 11. S1104 shown in FIG. 11 is: The control device 310 receives, by using the N antennas, a signal transmitted by the first display device 320, and obtains, through calculation, phase differences between signals received by the N antennas. S1105 is: The control device 310 obtains a horizontal deflection angle and a vertical pitch angle of the first display relative to the control device 310 through calculation, and determines the first pose of the first display relative to the control device 310 in combination of the distances r.

S705: The control device 310 determines a first position that the control device 310 points to on the plane on which the first display is located.

For example, as shown in S1106 in FIG. 11, the control device 310 may obtain, through calculation based on the first pose and the pointing direction of the control device 310 that are obtained through calculation, the first position that the control device 310 points to on the plane on which the first display is located.

It should be noted that, in the foregoing embodiment, the multi-antenna UWB positioning method is merely used as an example to describe a specific process of determining the pointing position of the control device 310. However, a specific method and process of determining the pointing direction of the control device 310, determining the pose of the first display device 320 relative to the control device 310, and determining the pointing position of the control device 310 are not limited in this embodiment of this application. For example, in some embodiments, if the first display device 320 and the control device 330 include a three-axis magnetic field transmit coil (for example, a magnetic sensor including the three-axis magnetic field transmit coil), a pose of the control device 310 may be determined by using a three-dimensional electromagnetic coil positioning method, to further determine the pointing position of the control device 310 based on this.

Figure 12:
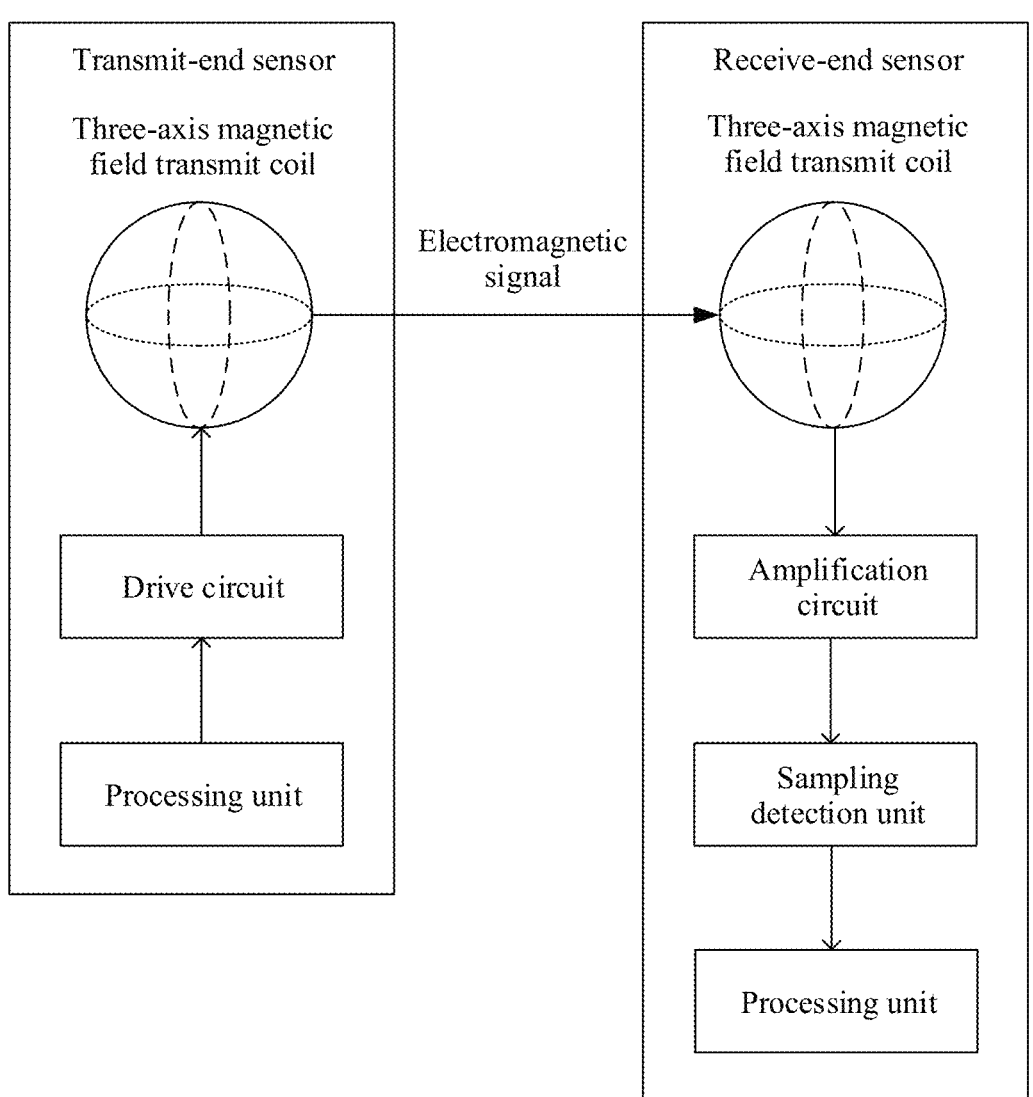
FIG. 12 is a diagram of an architecture of a three-dimensional electromagnetic coil positioning system according to an embodiment of this application.

A three-dimensional electromagnetic coil is provided with, in each of three dimensions, a coil formed by winding a wire. When a current passes through the coil, a magnetic field is generated. The principle of the three-dimensional electromagnetic coil positioning method is to use effect of the magnetic field and an electromagnetic induction principle of a magnetic coil to implement positioning. As shown in FIG. 12, a transmit-end sensor includes a three-axis magnetic field transmit coil, a drive circuit (that is, an excitation source), and a processing unit. A receive-end sensor includes a three-axis magnetic field transmit coil, an amplification circuit, a sampling detection unit, and a processing unit. The three-axis magnetic field transmit coil of the transmit-end sensor may transmit an electromagnetic signal based on driving of the drive circuit, and the drive circuit is controlled by the processing unit. The receive-end sensor may sense the electromagnetic signal from the transmit-end sensor by using the three-axis magnetic field transmit coil, and obtain the pose of the control device 310 after processing by the amplification circuit, the sampling detection unit, the processing unit, and the like.

Figure 13:
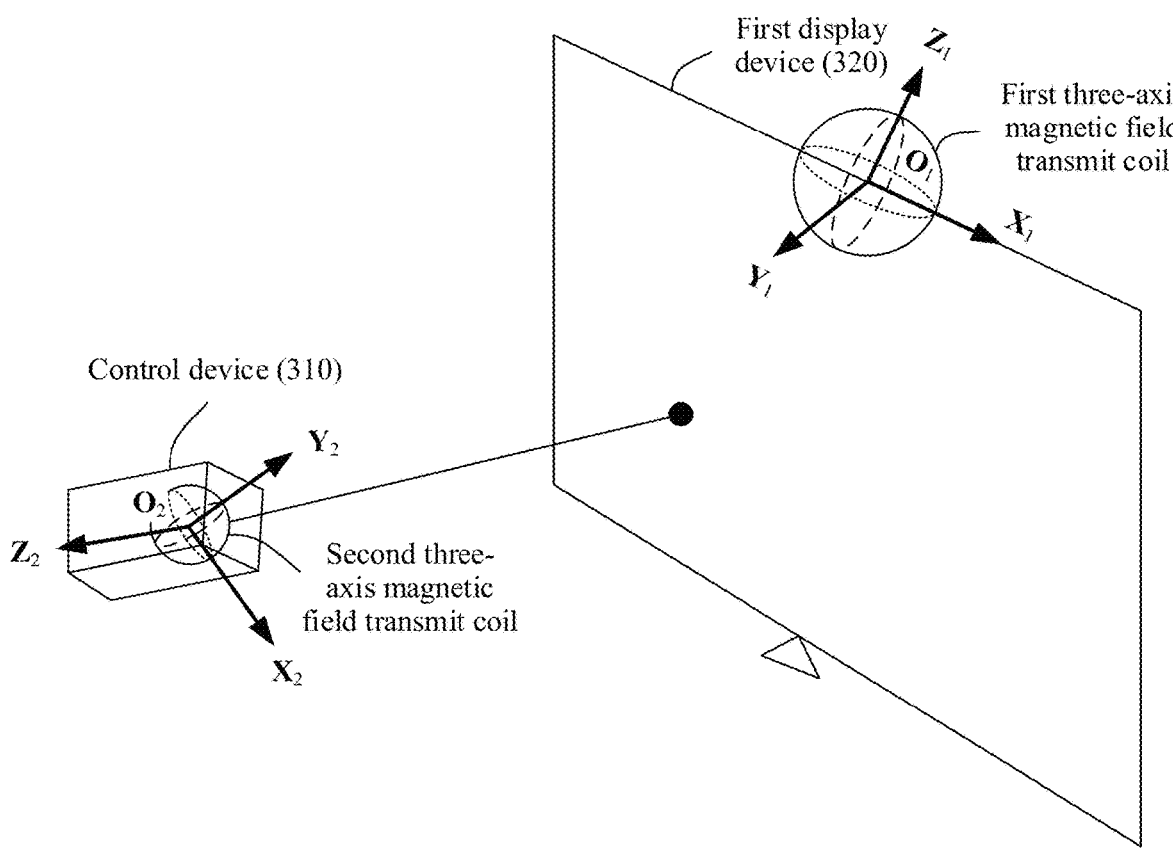
FIG. 13 is a schematic diagram of determining a pointing position of a control device based on a three-dimensional electromagnetic coil positioning method according to an embodiment of this application.

Refer to FIG. 13. FIG. 13 is a schematic diagram of a method for determining, based on a three-dimensional electromagnetic coil positioning method, a coordinate system in which a display is located according to an embodiment of this application, where an example in which the first display device 320 is an integrated display device is used.

As shown in FIG. 13, a first three-axis magnetic field transmit coil is disposed on the first display, and a second three-axis magnetic field transmit coil is disposed on the control device 310. The first display device 320 may transmit an electromagnetic signal by using the first three-axis magnetic field transmit coil. After the control device 310 senses the electromagnetic signal from the first three-axis magnetic field transmit coil by using the second three-axis magnetic field transmit coil, the pose of the control device 310 may be obtained through calculation based on this.

Figure 14:
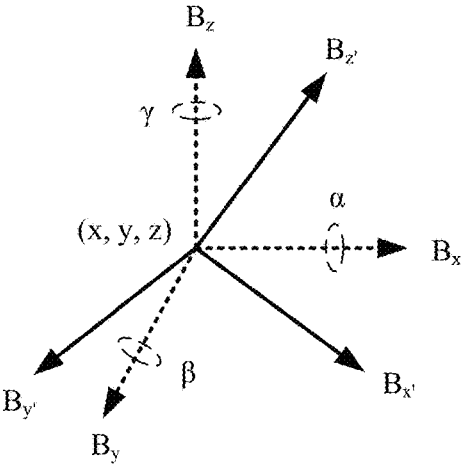
FIG. 14 is a schematic diagram of determining a pose of a control device based on a three-dimensional electromagnetic coil positioning method according to an embodiment of this application.

For example, the first display device 320 may establish a coordinate system O1-X1Y1Z1 shown in FIG. 13 by using the first three-axis magnetic field transmit coil as a reference, where a coordinate origin of the coordinate system O1-X1Y1Z1 may be a position of the first three-axis magnetic field transmit coil, an X1O1Z1 plane is the plane on which the first display is located, and a Z1 axis, an X1 axis, and a Y1 axis satisfy a left-hand spiral criterion. In the coordinate system O1-X1Y1Z1, magnetic induction intensity at the position of the first three-axis magnetic field transmit coil is Bx, By, and Bz shown in FIG. 14. The control device 310 may establish a coordinate system O2-X2Y2Z2 shown in FIG. 13 by using the second three-axis magnetic field transmit coil as a reference. It is assumed that the control device 310 detects, by using the second three-axis magnetic field transmit coil, that magnetic induction intensity in the coordinate system is Bx', By', and Bz' shown in FIG. 14. Rotation angles of the coordinate system O2-X2Y2Z2 relative to O1-X1Y1Z1 along three axial directions are respectively $\alpha$, $\beta$, and $\gamma$ shown in FIG. 14. Based on this, the following formula may be obtained:

$$R\begin{bmatrix} B_{x'} \\ B_{y'} \\ B_{z'} \end{bmatrix} = \begin{bmatrix} B_x \\ B_y \\ B_z \end{bmatrix}$$

In the foregoing formula, R is a rotation matrix, and a calculation formula of R is as follows:

$$R = \mathrm{Rot}(z,\ \gamma) * \mathrm{Rot}(y,\ \beta) * \mathrm{Rot}(x,\ \alpha) = \mathrm{Rot}(z,\ \gamma)\begin{bmatrix} \cos\gamma & -\sin\gamma & 0 \\ \sin\gamma & \sin\gamma & 0 \\ 0 & 0 & 1 \end{bmatrix} *$$

$$\mathrm{Rot}(y,\ \beta)\begin{bmatrix} \cos\beta & 0 & \sin\beta \\ 0 & 1 & 0 \\ -\sin\beta & 0 & \cos\beta \end{bmatrix} * \mathrm{Rot}(x,\ \alpha)\begin{bmatrix} 1 & 0 & 0 \\ 0 & \cos\alpha & -\sin\alpha \\ 0 & \sin\alpha & \cos\alpha \end{bmatrix}$$

Based on the foregoing formula, a pose (x, y, z, $\alpha$, $\beta$, $\gamma$) of the control device 310 may be obtained through calculation. After the pose of the control device 310 is obtained, the pointing direction of the control device 310 and coordinates of the intersection point of the pointing direction of the control device 310 and the first display (that is, the pointing position of the control device 310) may be calculated based on a trigonometric function relationship.

S706: If the first position is on the first display, the control device 310 sends second information to the first display device 320, where the second information includes coordinate information of the first position.

It may be understood that, if the size of the first display and the first coordinate system in which the first display is located are known, a first coordinate range of the first display in the first coordinate system may be obtained. Further, whether the first position is within the first coordinate range is determined, so that whether the first position is located on the first display may be determined.

When the first position is on the first display, the control device 310 may send the coordinate information of the first position to the first display device 320, so that the first display device 320 displays the cursor at the first position based on the second information. When the first position is not on the first display, the control device 310 may not perform processing. Therefore, the first display device 320 does not display the cursor.

S707: The first display device 320 displays the cursor at the first position based on the second information.

In some examples, in a process in which the first display device 320 displays a cursor based on a pointing direction of the control device 310, the control device 310 may send the pointing direction of the control device 310 to the first display device 320. The first display device 320 may determine a first coordinate system in which a display (that is, a first display) of the first display device 320 is located and a first pose of the first display relative to the control device 320, determine, based on the foregoing information, a position of an intersection point of the pointing direction of the control device 310 and a plane on which the first display is located (that is, a pointing position of the control device 310), and display the cursor at the pointing position of the control device 310 when the pointing position of the control device 310 is on the first display.

Figure 15:
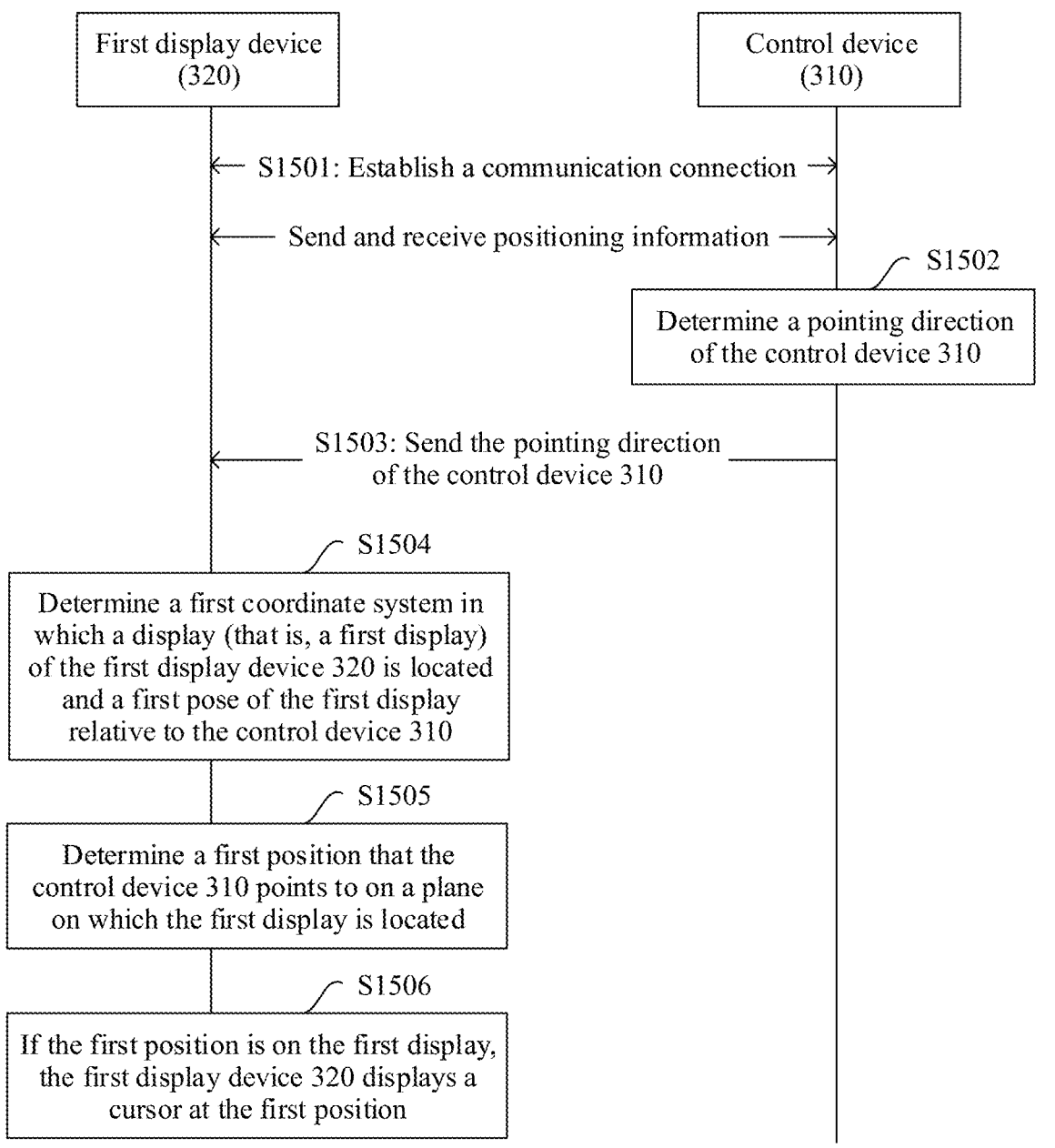
FIG. 15 is a flowchart 2 of a device display control method in a single-device scenario according to an embodiment of this application.

For example, refer to FIG. 15. FIG. 15 is a flowchart of another device display control method according to an embodiment of this application. As shown in FIG. 15, the device display control method provided in this embodiment of this application may include the following S1501 to S1506.

S1501: The control device 310 establishes a communication connection to the first display device 320.

For a specific description of S1501, refer to the foregoing description of S701. Details are not described herein again.

S1502: The control device 310 determines the pointing direction of the control device 310.

For a specific description of S1502, refer to the foregoing description of S704. Details are not described herein again.

S1503: The control device 310 sends the pointing direction of the control device 310 to the first display device 320.

S1504: The first display device 320 determines the first coordinate system in which the display (that is, the first display) of the first display device 320 is located and the first pose of the first display relative to the control device 310.

For a specific description that the first display device 320 determines the first coordinate system in which the display (that is, the first display) of the first display device 320 is located, refer to the foregoing description of S702. For a specific description that the first display device 320 determines the first pose of the first display relative to the control device 310, refer to the foregoing process in which the control device 310 determines the first pose of the first display relative to the control device 310 in step S704. Details are not described herein again.

S1505: The first display device 320 determines a first position that the control device 310 points to on the plane on which the first display is located.

For a specific description that the first display device 320 determines the first position that the control device 310 points to on the plane on which the first display is located, refer to the foregoing process in which the control device 310 determines the first position that the control device 310 points to on the plane on which the first display is located in step S705. Details are not described herein again.

S1506: If the first position is on the first display, the first display device 320 displays the cursor at the first position.

It may be understood that, in the device display control method provided in this embodiment of this application, whether the display displays the cursor, and a specific presentation position of the cursor existing when the cursor is displayed on the display are determined based on the position that the control device points to on the plane on which the display is located. Therefore, when the pointing position of the control device is not on the display of the display device, the display device does not display the cursor. The display device displays the cursor at the pointing position of the control device only when the pointing position of the control device enters an edge area of the display of the display device (as shown in FIG. 4). In this way, after the pointing position of the control device enters the edge area of the display, the display device may follow a movement track of the control device and display the cursor on the display. When the pointing position of the control device moves out of any edge area (for example, an upper edge area, a lower edge area, a left edge area, or a right edge area) of the display, the display device no longer displays the cursor on the display. Therefore, compared with a conventional technology, a problem of a deviation between a presentation position of the cursor and the pointing position of the control device can be resolved, and a problem that the cursor is stuck on a frame when moving out of an edge of the display can also be resolved.

Figure 16:
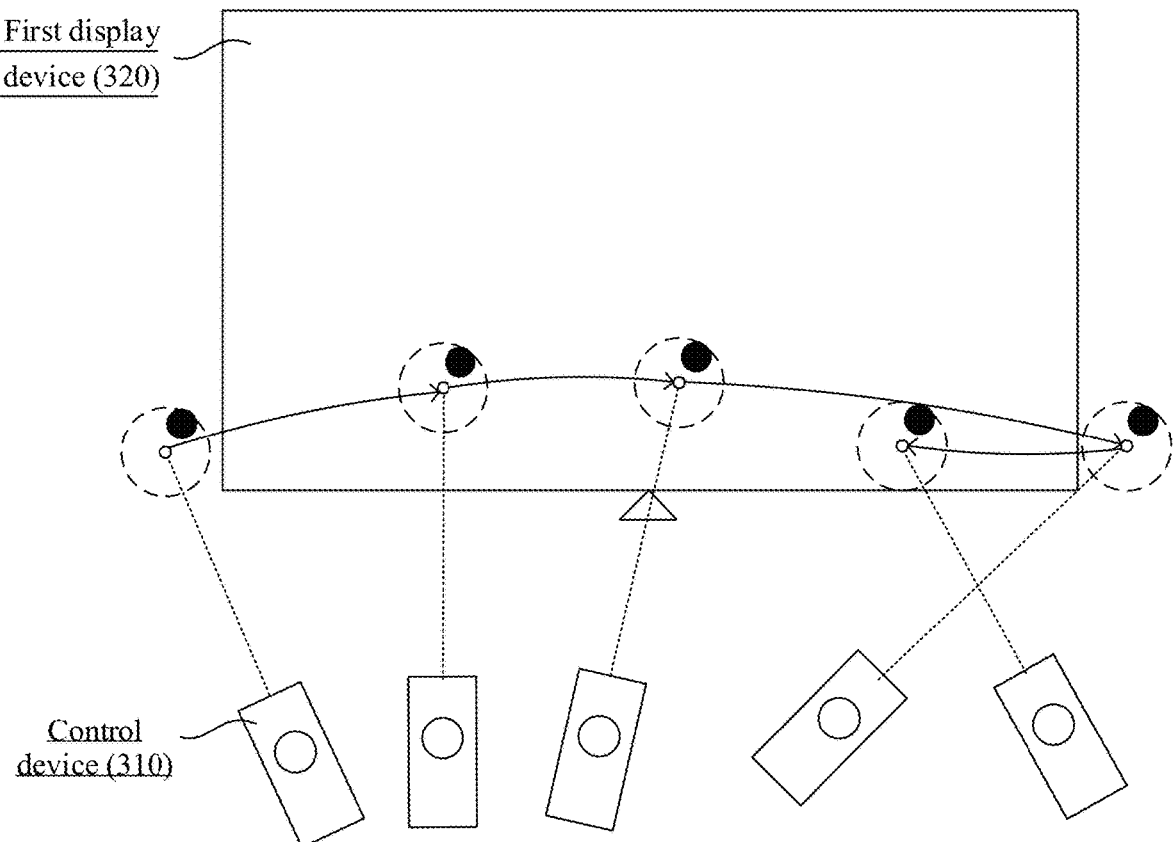
FIG. 16 is a schematic diagram of presentation effect of a cursor according to an embodiment of this application.

In addition, because the presentation position of the cursor is the pointing position of the control device, a deviation between the presentation position of the cursor and a pointing position of an axial direction of the control device 310 in a real pose is very small. For example, as shown in FIG. 16, the presentation position of the cursor is usually within a preset range S near the pointing position of the axial direction of the control device 310 in the real pose. The preset range is usually very small. For example, the deviation between the presentation position of the cursor and the pointing position of the axial direction of the control device 310 in the real pose may be caused due to impact of a measurement error and/or a calculation error of a wireless positioning unit 310-3 of the control device 310 and/or a measurement error and/or a calculation error of a wireless positioning unit 320-3 of the first display device 320. The deviation is usually within 10° (in some embodiments, the deviation may be within 3°, or even within 1°). Therefore, the device display control method provided in this embodiment of this application can bring more precise cursor control experience to a user.

In conclusion, the device display control method provided in this embodiment of this application can bring convenient, immersive, and precise device control experience to the user.

In some embodiments, to ensure continuous presentation of the cursor, after it is ensured that the cursor enters the edge area of the display, the presentation position of the cursor may be further determined based on a relative pose change of the control device. When the presentation position of the cursor determined based on the relative pose change of the control device deviates from the pointing direction of the control device beyond a preset range, or after a preset time period elapses, the presentation position of the cursor is calibrated based on the pointing position of the control device. The preset range of the pointing direction of the control device is, for example, an overlapping range of a cone that is deflected by an angle φ around the pointing direction of the control device and the display.

For example, in an initial stage, the control device 310 and the first display device 320 may perform related measurement and calculation by using the wireless positioning unit, to determine the first position that the control device 310 points to on the plane on which the first display is located. When the first position is not on the first display, a subsequent pointing position is determined based on a preset frequency. After the pointing position of the control device 310 enters the edge area of the first display, the control device 310 may measure a motion attitude of the control device 310 by using a motion measurement unit 310-5 (for example, an IMU), so that the first display device 310 may determine displacement of the cursor relative to a historical presentation position of the cursor based on the relative pose change of the control device 310, to further determine the presentation position of the cursor. In addition, in the process of determining the presentation position of the cursor based on the relative pose change of the control device 310, the presentation position of the cursor may be calibrated based on the pointing position of the control device at an interval of a preset time period, or the presentation position of the cursor may be calibrated based on the pointing position of the control device when the presentation position of the cursor deviates from the pointing direction of the control device beyond the preset range. In addition, after the cursor moves out of the edge area of the first display, the wireless positioning unit may be used to perform related measurement and calculation, to determine the pointing position of the control device 310.

Based on this, a display deviation of the cursor can always be kept within a small range, and precise presentation of the cursor can be ensured. Continuous presentation of the cursor on the display can also be ensured.

In some embodiments, in the process of determining the presentation position of the cursor based on the relative pose change of the control device 310, the displacement of the cursor relative to the historical presentation position of the cursor may be further dynamically adjusted in combination of a distance between the control device 310 and the first display device 320. For example, when the distance between the control device 310 and the first display device 320 is within a range of D1 to D2, a cursor displacement ratio is adjusted based on a result of the relative pose change of the control device 310\*the distance. When the distance between the control device 310 and the first display device 320 is less than D1, a cursor displacement ratio is adjusted based on a result of the relative pose change of the control device 310\*D1. When the distance between the control device 310 and the first display device 320 is greater than D2, a cursor displacement ratio is adjusted based on a result of the relative pose change of the control device 310\*D2. Based on this, it can be further ensured that when the control device 310 controls the cursor at different distances, a movement distance of the cursor corresponding to a same pose change may be dynamically adjusted, so that the user basically has same control experience when controlling the cursor at different distances.

It should be noted that, in the foregoing scenario 1, that the display device follows the movement track of the control device and displays the cursor on the display is merely used as an example, and during actual application, may be determined based on a specific application scenario, a function of a device, and the like. For example, interface effect displayed on the display may alternatively include but is not limited to displaying an icon, a component, a virtual image, an image, or the like at the pointing position of the control device, displaying corresponding view angle effect based on the pointing position of the control device, displaying preset special effect in a corresponding display area (such as a preset control hot area) based on the pointing position of the display control device, and the like.

For example, in a game scenario, the interface effect displayed on the display may alternatively be, for example, displaying a game hero image at a preset view angle at the pointing position of the control device, displaying game equipment at the pointing position of the control device, displaying game special effect (such as bubble special effect or firework special effect) at the pointing position of the control device, or displaying game special effect (such as targeting special effect or hit special effect) in a corresponding display area based on the pointing position of the display control device. For another example, in a handwriting tablet scenario, the interface effect displayed on the display may alternatively be, for example, displaying a stylus image and handwriting in the pointing position of the control device, or displaying handwriting in a corresponding display area (for example, a historical track that a stylus image passes through) based on the pointing position of the display control device. For another example, the display device may alternatively follow the movement track of the control device and display the cursor on the display, and also display a virtual image, special effect, and the like at a preset view angle. For example, when the pointing position of the control device is in the preset control hot area, the display device may display corresponding interface effect such as a virtual image and special effect at a preset view angle when displaying a displayed object.

In a case in which the display device follows the movement track of the control device and displays interface effect such as a component, a virtual image, view angle effect, or special effect on the display, when the pointing position of the control device moves out of the edge area of the display of the display device, the display device may no longer update the interface effect, or may no longer display any interface effect. This is not specifically limited in this embodiment of this application, and is determined based on an actual application scenario, a function of a device, and the like.

Scenario 2: A Multi-Display Device Scenario

The multi-display device scenario includes a control device 310, a first display device 320, and a second display device 330. The first display device 320 and the second display device 330 are configured to perform interface display, and the control device 310 is configured to perform display control, operation control, and/or the like on the first display device 320 or the second display device 330.

In some examples, in a process in which the first display device 320 or the second display device 330 displays a cursor based on a pointing direction of the control device 310, the first display device 320 may send and receive positioning information to and from the control device 310 to determine a first coordinate system in which a display (for example, a first display) of the first display device 320 is located, and send the first coordinate system in which the first display is located to the control device 310. The second display device 330 may send and receive positioning information to and from the control device 310 to determine a first coordinate system in which a display (for example, a second display) of the second display device 330 is located, and send the second coordinate system in which the second display is located to the control device 310. The control device 310 may send and receive the positioning information to and from the first display device 320 and the second display device 330 to determine the pointing direction of the control device 310 and a first pose of the first display and the second display relative to the control device 320, and determine a position of an intersection point of the pointing direction of the control device 310 and a plane on which the first display is located or a position of an intersection point of the pointing direction of the control device 310 and a plane on which the second display is located (that is, a pointing position of the control device 310), and when the pointing position of the control device 310 is on the first display, send the pointing position of the control device 310 to the first display device 320, so that the first display device 320 displays the cursor at the pointing position of the control device 310. Alternatively, when the pointing position of the control device 310 is on the second display, the control device 310 may send the pointing position of the control device 310 to the second display device 330, so that the second display device 330 displays the cursor at the pointing position of the control device 310. The positioning information may be sent and received between the first display device 320 and the control device 310, or between the second display device 330 and the control device 310 by using respective wireless positioning units.

Figure 17:
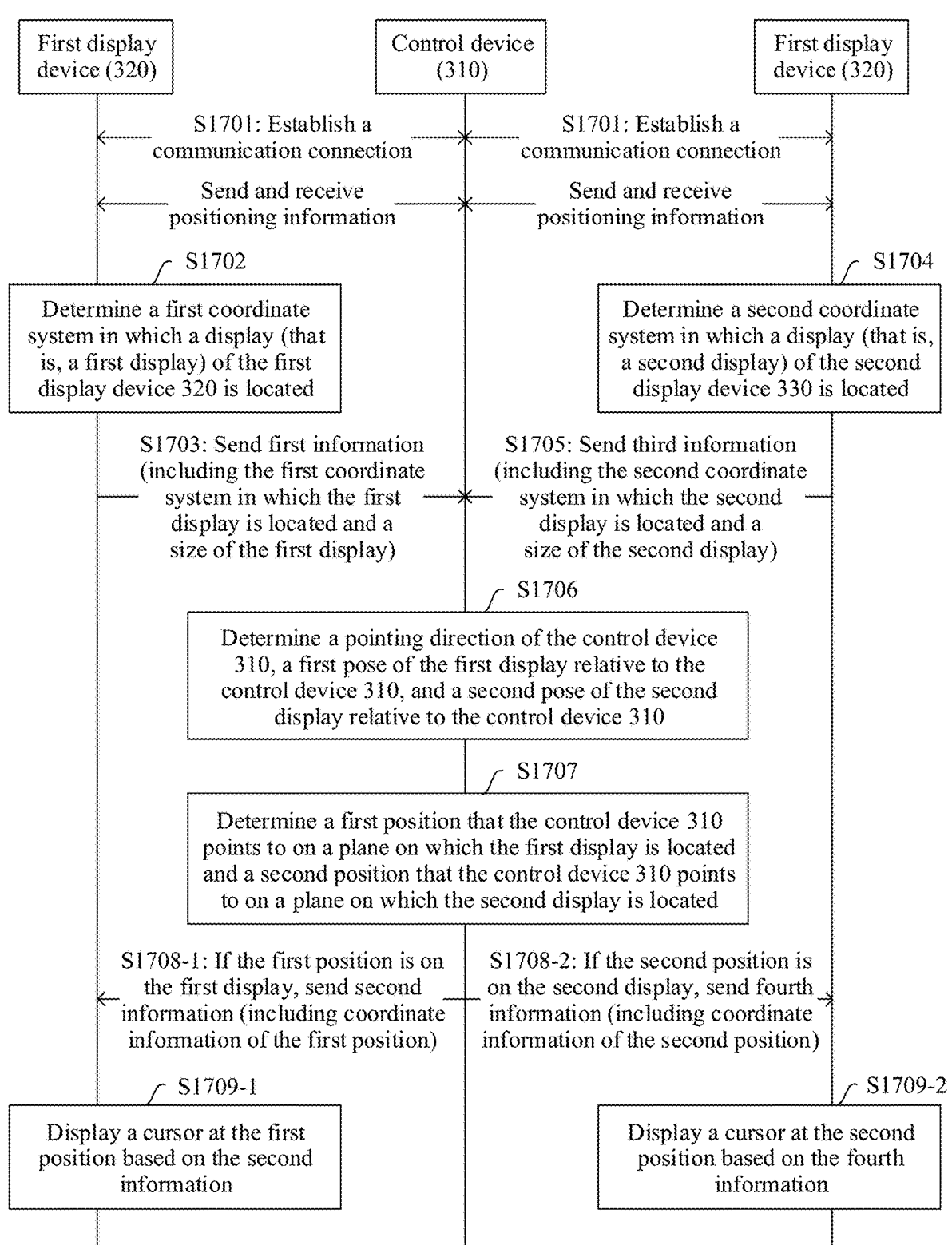
FIG. 17 is a flowchart of a device display control method in a multi-device scenario according to an embodiment of this application.

For example, refer to FIG. 17. FIG. 17 is a flowchart of a device display control method according to an embodiment of this application. As shown in FIG. 17, the device display control method provided in this embodiment of this application may include the following S1701 to S1707.

S1701: The control device 310 establishes communication connections to the first display device 320 and the second display device 330.

For a specific description that the control device 310 establishes the communication connections to the first display device 320 and the second display device 330, refer to the foregoing process in which the control device 310 establishes the communication connection to the first display device 320 in step S701. Details are not described herein again.

S1702: The first display device 320 determines the first coordinate system in which the display (that is, the first display) of the first display device 320 is located.

For a specific description of S1702, refer to the foregoing description of S702. Details are not described herein again.

S1703: The first display device 320 sends first information to the control device 310, where the first information includes the first coordinate system in which the first display is located and a size of the first display.

For a specific description of S1703, refer to the foregoing description of S703. Details are not described herein again.

S1704: The second display device 330 determines the second coordinate system in which the display (that is, the second display) of the second display device 330 is located.

For a specific description of S1704, refer to the foregoing process in which the first display device 320 determines the first coordinate system in which the first display is located in step S702. Details are not described herein again.

S1705: The second display device 330 sends third information to the control device 310, where the third information includes the second coordinate system in which the second display is located and a size of the second display.

For a specific description of S1705, refer to the foregoing process in which the first display device 320 sends the first information to the control device 310 in step S703. Details are not described herein again.

S1706: The control device 310 determines the pointing direction of the control device 310, the first pose of the first display relative to the control device 310, and a second pose of the second display relative to the control device 310.

For a specific description that the control device 310 determines the pointing direction of the control device 310 and the first pose of the first display relative to the control device 310, refer to the foregoing description of S704. For a specific description that the control device 310 determines the second pose of the second display relative to the control device 310, refer to the foregoing process in which the control device 310 determines the first pose of the first display relative to the control device 310 in step S704. Details are not described herein again.

S1707: The control device 310 determines a first position that the control device 310 points to on a plane on which the first display is located and a second position that the control device 310 points to on a plane on which the second display is located.

For a specific description that the control device 310 determines the first position that the control device 310 points to on the plane on which the first display is located, refer to the foregoing description of S705. For a specific description that the control device 310 determines the second position that the control device 310 points to on the plane on which the second display is located, refer to the foregoing process in which the control device 310 determines the first position that the control device 310 points to on the plane on which the first display is located in step S705. Details are not described herein again.

If the first position is on the first display, the first display device 320 performs S1709-1 after the control device 310 performs S1708-1. If the second position is on the second display, the second display device 330 performs S1709-2 after the control device 310 performs S1708-2.

S1708-1: The control device 310 sends second information to the first display device 320, where the second information includes coordinate information of the first position.

For a specific description of S1708-1, refer to the foregoing description of S706. Details are not described herein again.

S1709-1: The first display device 320 displays the cursor at the first position based on the second information.

For a specific description of S1709-1, refer to the foregoing description of S707. Details are not described herein again.

S1708-2: The control device 310 sends fourth information to the second display device 330, where the fourth information includes coordinate information of the second position.

For a specific description of S1708-2, refer to the foregoing process in which the control device 310 sends the second information to the first display device 320 in step S706. Details are not described herein again.

S1709-2: The second display device 330 displays the cursor at the second position based on the fourth information.

For a specific description of S1709-2, refer to the foregoing process in which the first display device 320 displays the cursor at the first position based on the second information in step S707. Details are not described herein again.

In some embodiments, the first position that the control device 310 points to on the plane on which the first display is located is on the first display, but the second position that the control device 310 points to on the plane on which the second display is located is not on the second display. In this case, the control device 310 does not perform S1708-2, and the second display device 330 does not perform S1709-2.

In some embodiments, the first position that the control device 310 points to on the plane on which the first display is located is not on the first display, but the second position that the control device 310 points to on the plane on which the second display is located is on the second display. In this case, the control device 310 does not perform S1708-1, and the first display device 320 does not perform S1709-1.

In some embodiments, the first position that the control device 310 points to on the plane on which the first display is located is on the first display, and the second position that the control device 310 points to on the plane on which the second display is located is on the second display. In this case, for example, the control device 310 performs both S1708-1 and S1708-2, so that the first display device 320 performs S1709-1, and the second display device 330 performs S1709-2. In another example, the control device 310 performs both S1708-1 and S1708-2. The first display device 320 and the second display device 330 negotiate to determine whether the first display or the second display displays the cursor. When it is determined that the first display displays the cursor, the first display device 320 performs S1708-1, or when it is determined that the second display displays the cursor, the second display device 330 performs S1708-2. Factors considered during negotiation between the first display device 320 and the second display device 330 may include but are not limited to one or more of the following: a distance between the display device and the control device, a function of the display device, whether an interface with content is displayed on the display device, a display device on which the cursor is most recently displayed, and the like. This is not specifically limited in this embodiment of this application. In another example, the control device 310 may determine, based on a preset rule, that the first display or the second display displays the cursor. When it is determined that the first display displays the cursor, the control device 310 performs S1708-1 and then the first display device 320 performs S1709-1, or when it is determined that the second display displays the cursor, the control device 310 performs S1708-2 and then the first display device 320 performs S1709-2. The preset rule such as one or more of the following:

proximity priority, continuity priority, and original display device priority is not specifically limited in this embodiment of this application.

It should be noted that, in the foregoing embodiment, that the first coordinate system constructed by the first display device 320 and the second coordinate system constructed by the second display device 320 may be constructed based on actual planes on which the respective displays of the first display device 320 and the second display device 320 are located, that is, the first coordinate system is different from the second coordinate system, is merely used as an example. In some embodiments, the first display device 320 and the second display device 320 may alternatively construct a unified coordinate system. In this case, the first display device 320 also sends coordinate information of the first display in the unified coordinate system to the control device 310, the second display device 330 also sends coordinate information of the second display in the unified coordinate system to the control device 310, so that the control device 310 performs subsequent confirmation of the first position and the second position based on this.

It may be understood that, in the device display control method provided in this embodiment of this application, whether the display displays the cursor and which display device displays the cursor at which position are determined based on the position that the control device points to on the plane on which the display is located. Therefore, regardless of an orientation relationship between a plurality of display devices, the orientation relationship between the plurality of display devices does not need to be preconfigured, the control device can calculate a specific position to which the control device points. When the pointing position of the control device is not on a display of any display device, the display device does not display the cursor. Only when the pointing position of the control device enters an edge area of a display of a display device, the display device displays the cursor at the pointing position of the control device 310. Therefore, in the multi-display device scenario, this solution can also bring convenient, immersive, and precise cursor control and device control experience to a user.

Figure 18A:
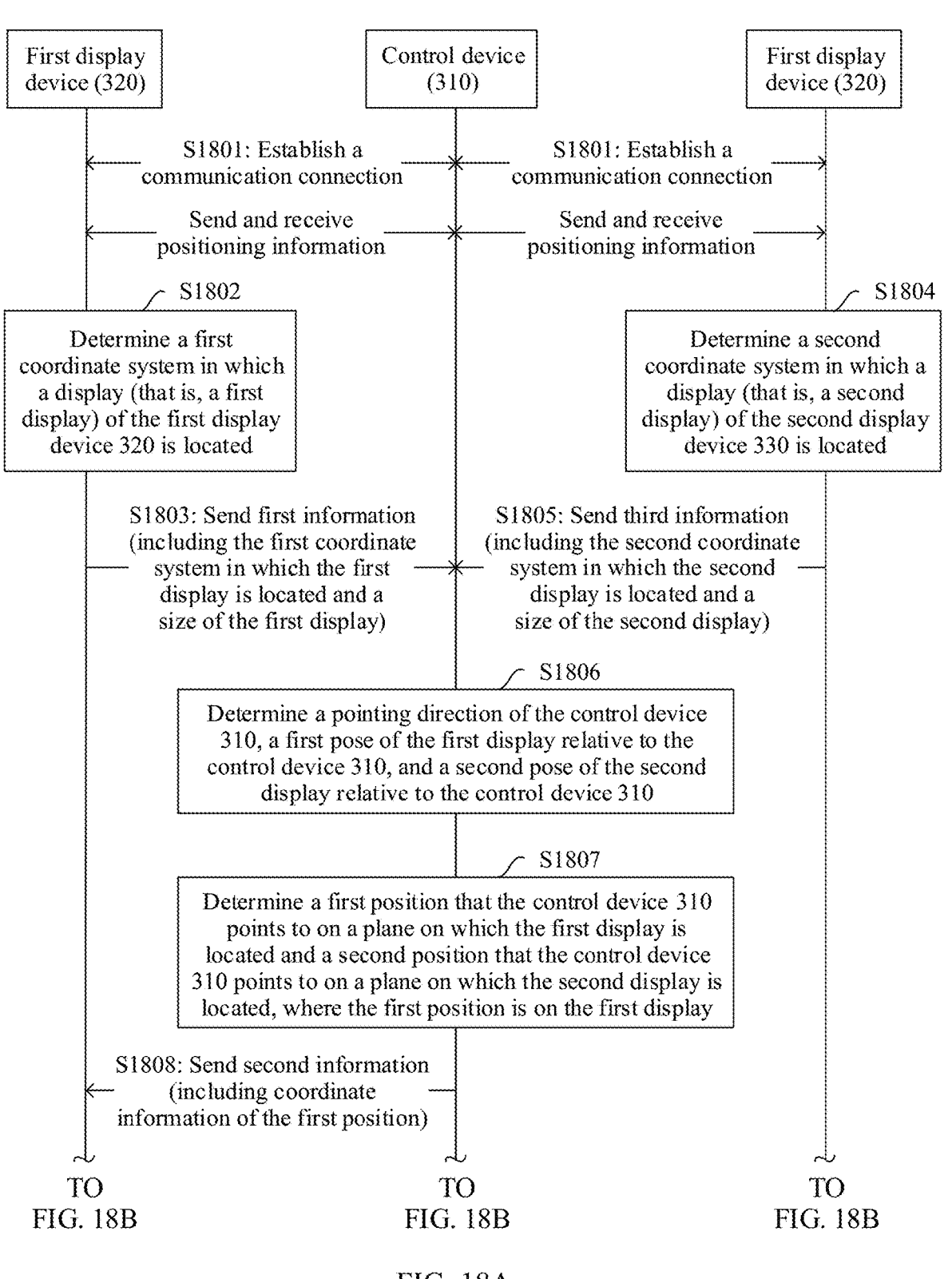

For example, a cursor changes from displaying on a first display to displaying on a second display, and a position of the first display is close to a position of the second display. Refer to FIG. 18A and FIG. 18B. FIG. 18A and FIG. 18B are a flowchart of a traversal process of a cursor according to an embodiment of this application. As shown in FIG. 18A and FIG. 18B, the traversal process of the cursor provided in this embodiment of this application may include S1801 to S1813

(S1801 to S1809 are a presentation stage of the first display, and S1810 to S1813 are a presentation stage of the second display).

S1801: The control device 310 establishes communication connections to the first display device 320 and the second display device 330.

S1802: The first display device 320 determines a first coordinate system in which the first display is located.

S1803: The first display device 320 sends first information to the control device 310, where the first information includes the first coordinate system in which the first display is located and a size of the first display.

S1804: The second display device 330 determines a second coordinate system in which the second display is located.

S1805: The second display device 330 sends third information to the control device 310, where the third information includes the second coordinate system in which the second display is located and a size of the second display.

S1806: The control device 310 determines a first pointing direction of the control device 310, a first pose of the first display relative to the control device 310, and a second pose of the second display relative to the control device 310.

S1807: The control device 310 determines a first position that the control device 310 points to on a plane on which the first display is located and a second position that the control device 310 points to on a plane on which the second display is located, where the first position is on the first display.

S1808: The control device 310 sends second information to the first display device 320, where the second information includes coordinate information of the first position.

S1809: The first display device 320 displays the cursor at the first position based on the second information.

S1810: The control device 310 determines a second pointing direction of the control device 310, a third pose of the first display relative to the control device 310, and a fourth pose of the second display relative to the control device 310.

S1811: The control device 310 determines a third position that the control device 310 points to on the plane on which the first display is located and a fourth position that the control device 310 points to on the plane on which the second display is located, where the fourth position is on the second display.

S1812: The control device 310 sends fifth information to the second display device 330, where the fifth information includes coordinate information of the fourth position.

S1813: The second display device 330 displays the cursor at the fourth position based on the fifth information.

Figure 19:
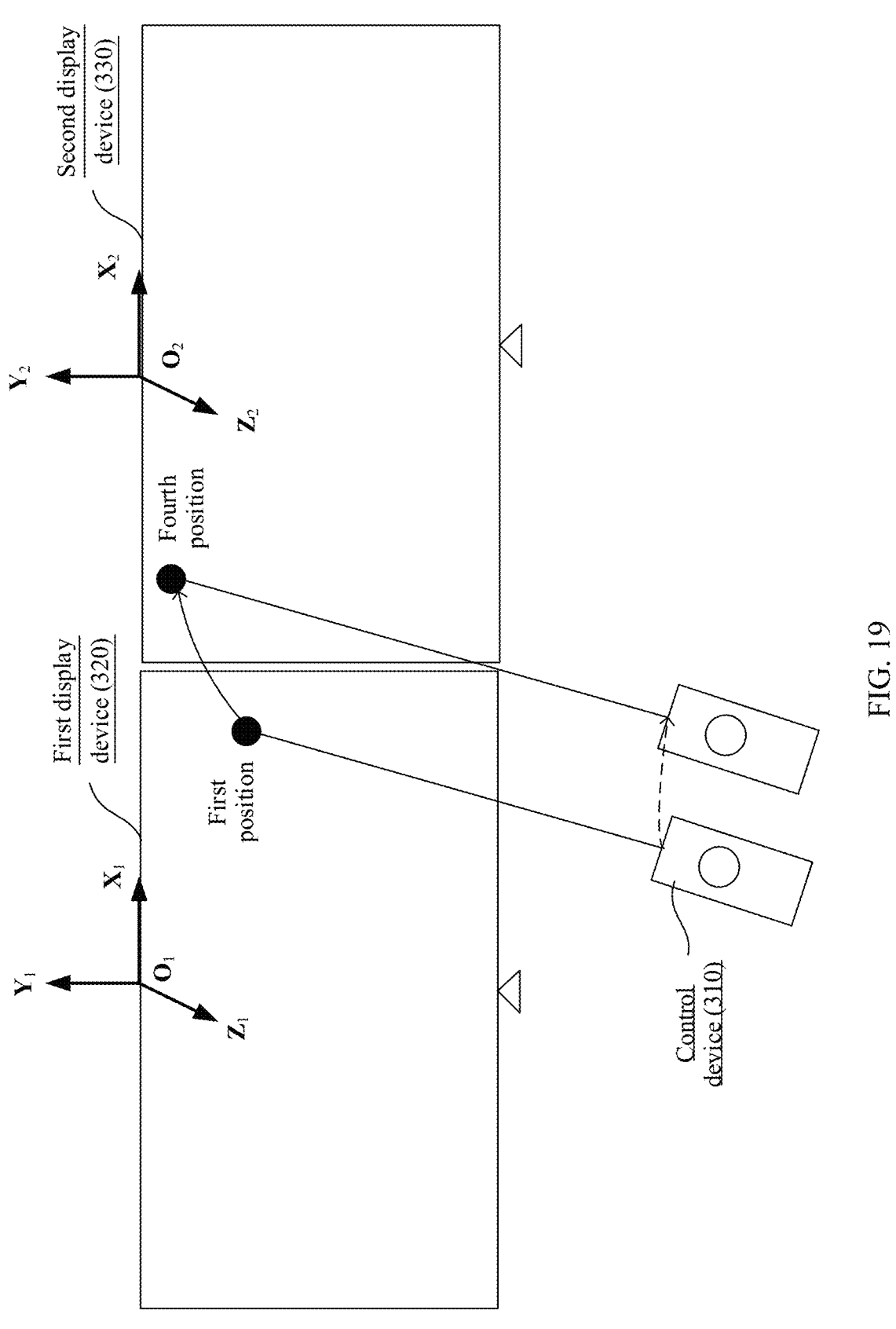
FIG. 19 is a schematic diagram 1 of a traversal process of a cursor according to an embodiment of this application.

For example, refer to FIG. 19. FIG. 19 shows that in a case in which the position of the first display is close to the position of the second display, based on the traversal process of the cursor shown in FIG. 18A and FIG. 18B, effect that the cursor shown in FIG. 19 traverses from the first display to the second display and is displayed may be implemented. An entire process is convenient for a user to operate, and can bring immersive and precise cursor control and device control experience to the user.

Figure 20A:
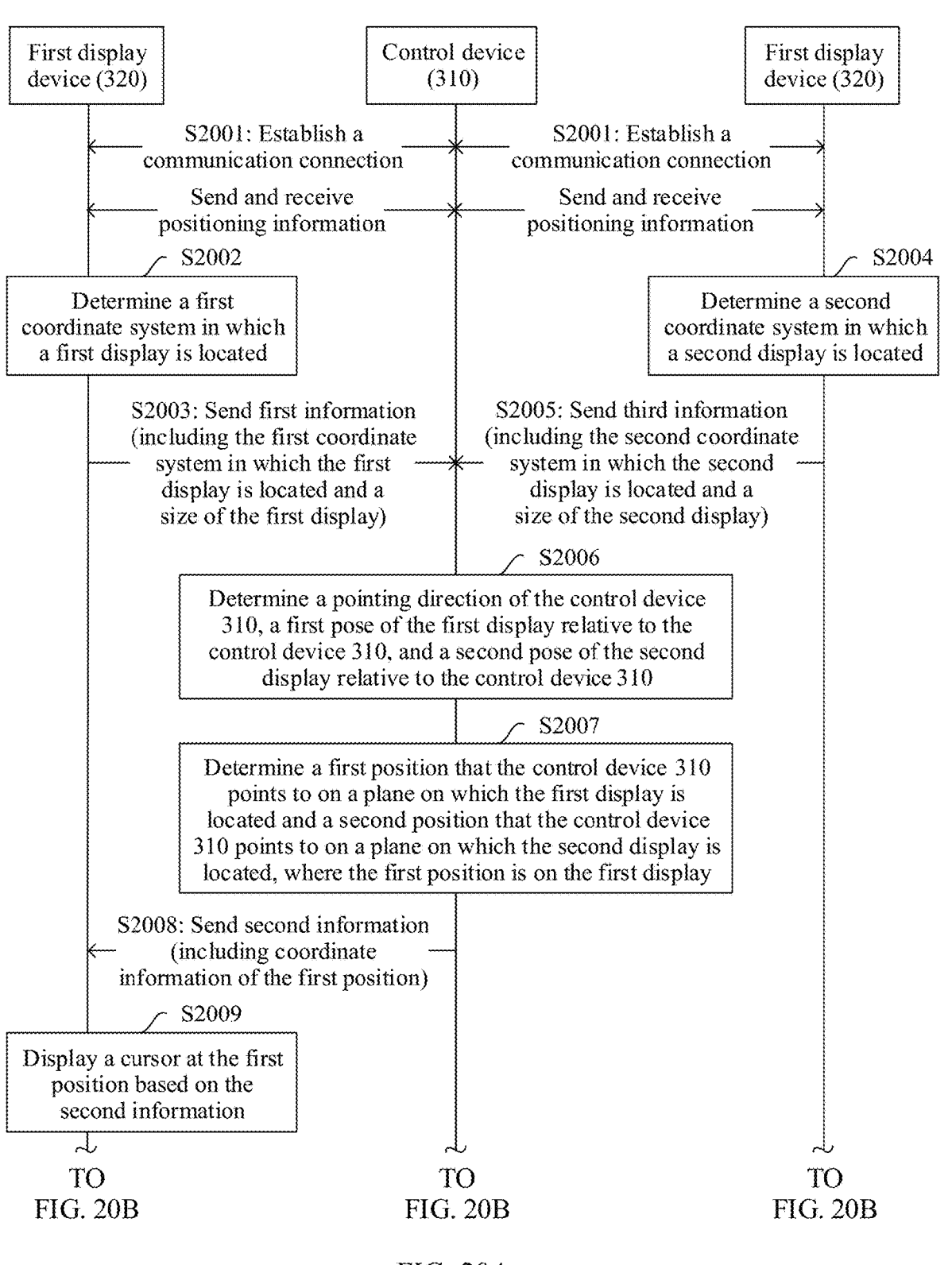

For another example, a cursor changes from displaying on a first display to displaying on a second display, and the first display is far away from the second display. Refer to FIG. 20A and FIG. 20B. FIG. 20A and FIG. 20B are a flowchart of another traversal process of a cursor according to an embodiment of this application. As shown in FIG. 20A and FIG. 20B, the traversal process of the cursor provided in this embodiment of this application may include S2001 to S2015 (S2001 to S2009 are a presentation stage of the first display, S2010 and S2011 are a cursor traversal stage, and S2012 to S2015 are a presentation stage of the second display).

S2001: The control device 310 establishes communication connections to the first display device 320 and the second display device 330.

S2002: The first display device 320 determines a first coordinate system in which the first display is located.

S2003: The first display device 320 sends first information to the control device 310, where the first information includes the first coordinate system in which the first display is located and a size of the first display.

S2004: The second display device 330 determines a second coordinate system in which the second display is located.

S2005: The second display device 330 sends third information to the control device 310, where the third information includes the second coordinate system in which the second display is located and a size of the second display.

S2006: The control device 310 determines a first pointing direction of the control device 310, a first pose of the first display relative to the control device 310, and a second pose of the second display relative to the control device 310.

S2007: The control device 310 determines a first position that the control device 310 points to on a plane on which the first display is located and a second position that the control device 310 points to on a plane on which the second display is located, where the first position is on the first display.

S2008: The control device 310 sends second information to the first display device 320, where the second information includes coordinate information of the first position.

S2009: The first display device 320 displays the cursor at the first position based on the second information.

S2010: The control device 310 determines a third pointing direction of the control device 310, a fifth pose of the first display relative to the control device 310, and a sixth pose of the second display relative to the control device 310.

S2011: The control device 310 determines a fifth position that the control device 310 points to on the plane on which the first display is located and a sixth position that the control device 310 points to on the plane on which the second display is located, where the fifth position is not on the first display and the sixth position is not on the second display.

S2012: The control device 310 determines a second pointing direction of the control device 310, a third pose of the first display relative to the control device 310, and a fourth pose of the second display relative to the control device 310.

S2013: The control device 310 determines a third position that the control device 310 points to on the plane on which the first display is located and a fourth position that the control device 310 points to on the plane on which the second display is located, where the fourth position is on the second display.

S2014: The control device 310 sends fifth information to the second display device 330, where the fifth information includes coordinate information of the fourth position.

S2015: The second display device 330 displays the cursor at the fourth position based on the fifth information.

Figure 21:
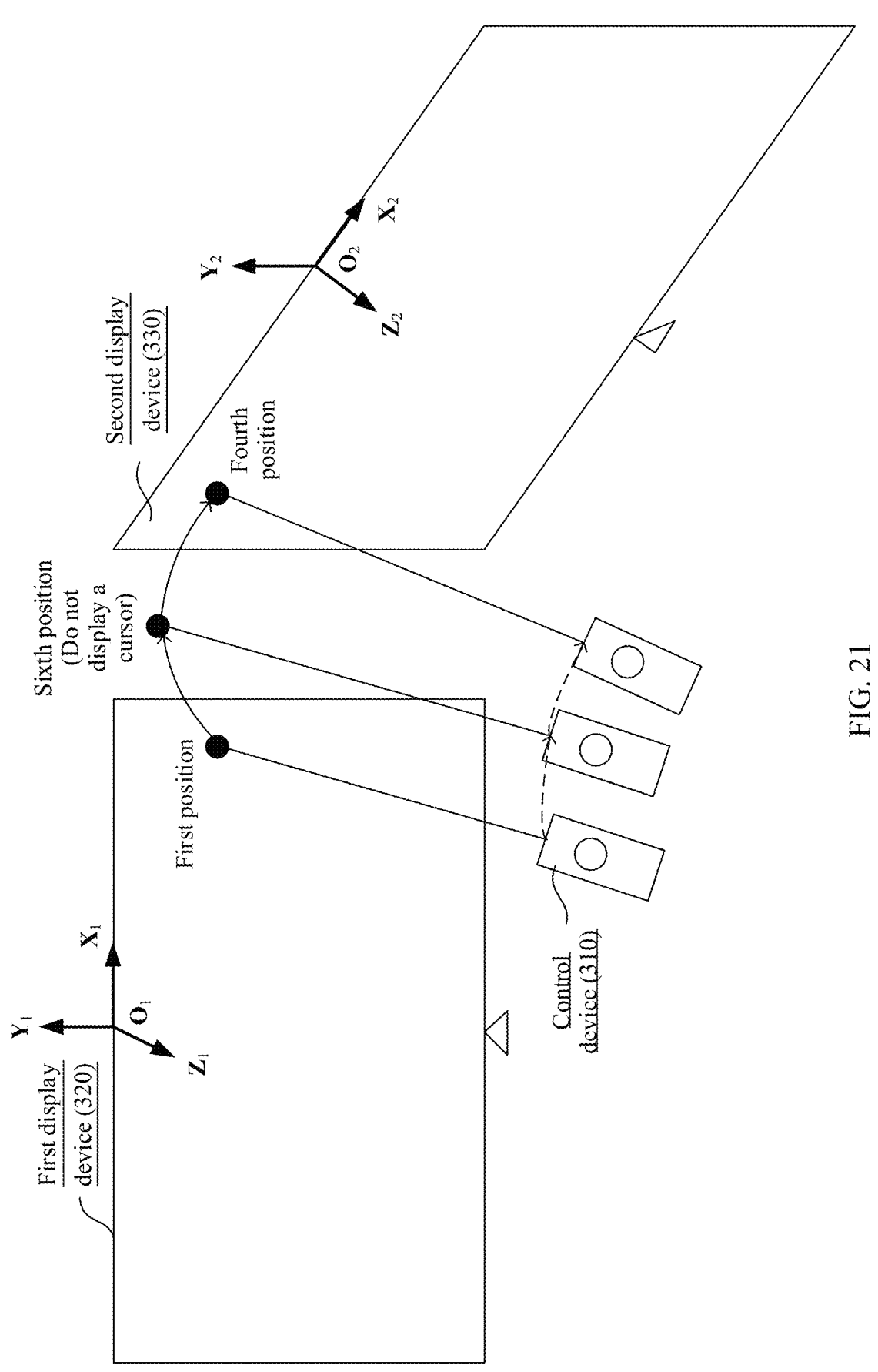
FIG. 21 is a schematic diagram 2 of a traversal process of a cursor according to an embodiment of this application.

For example, refer to FIG. 21. FIG. 21 shows that in a case in which the first display is far away from the second display, based on the traversal process of the cursor shown in FIG. 20A and FIG. 20B, effect that the cursor shown in FIG. 21 traverses from the first display to the second display and is displayed may be implemented. An entire process is convenient for a user to operate, and can bring immersive and precise cursor control and device control experience to the user. In addition, as shown in FIG. 19 and FIG. 21, it can be learned that, regardless of how long a distance between the displays of the first display device 320 and the second display device 330 is, accurate display of the cursor is not affected.

In addition, in the device display control method provided in this embodiment of this application, whether the display displays the cursor, and a specific presentation position of the cursor existing when the cursor is displayed on the display are determined based on the position that the control device points to on the plane on which the display is located. Therefore, when a pose of a display of any display device changes, accurate traversal of the cursor when the cursor continues is still not affected.

Figure 22A:
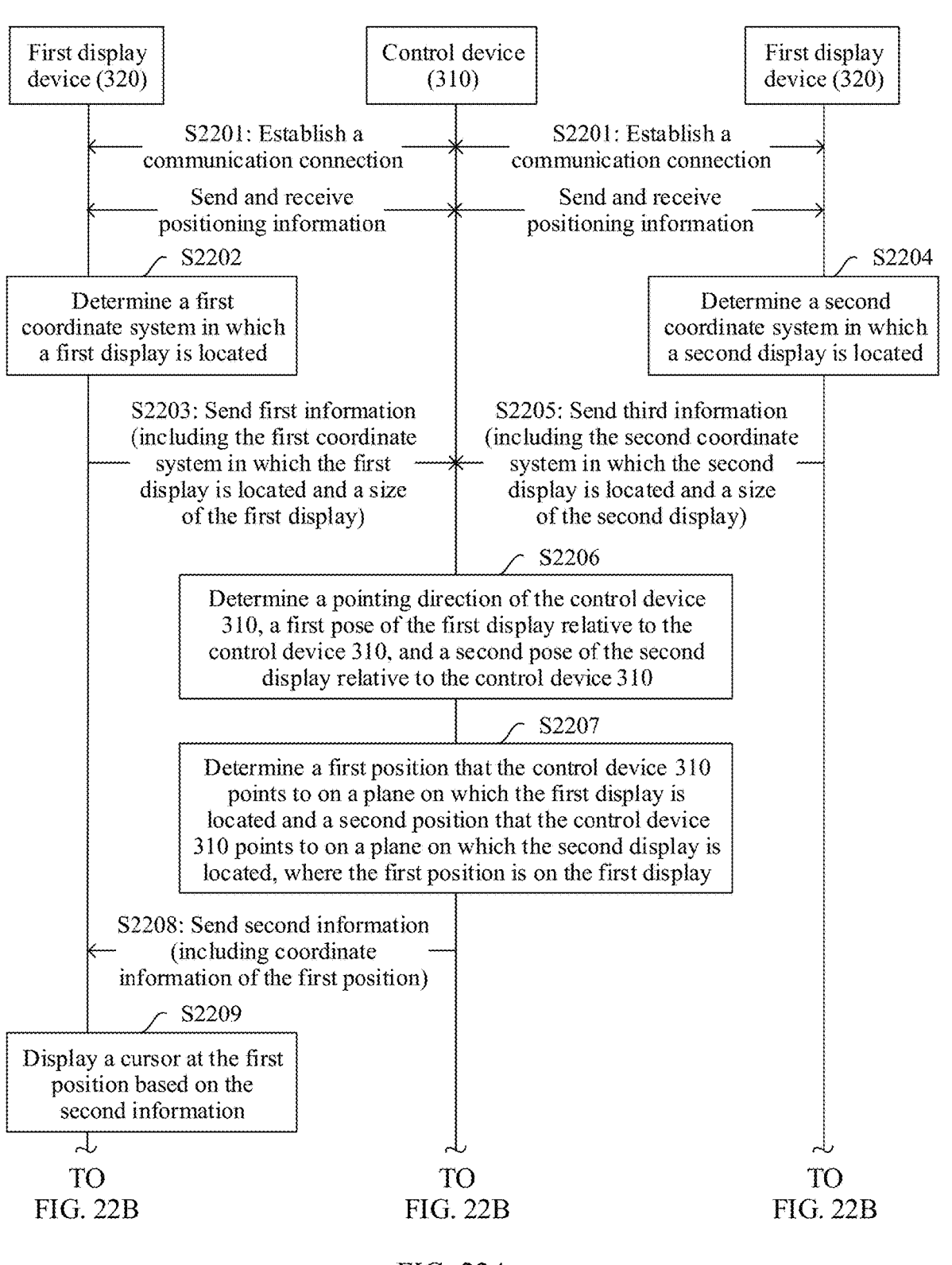
FIG. 22A and FIG. 22B are a flowchart 3 of a traversal process of a cursor in a multi-device scenario according to an embodiment of this application.
Figure 22B:
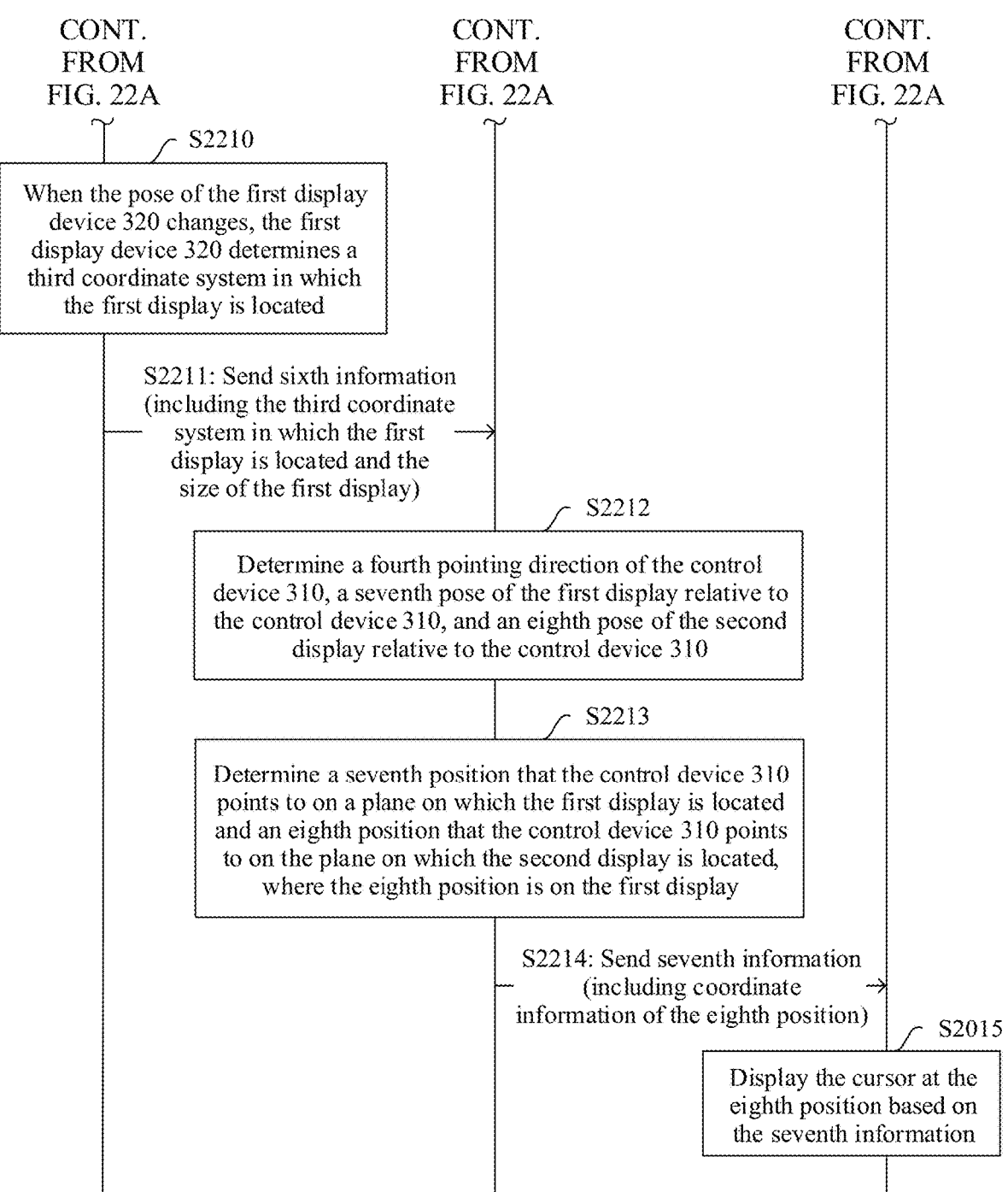

For example, a position of a display of the first display device 320 changes. Refer to FIG. 22A and FIG. 22B. FIG. 22A and FIG. 22B are a flowchart of another traversal process of a cursor according to an embodiment of this application. As shown in FIG. 22A and FIG. 22B, the traversal process of the cursor provided in this embodiment of this application may include S2201 to S2215 (S2201 to S2209 are a presentation stage of a first display, S2210 and S2211 are an information update stage, and S2212 to S2215 are a presentation stage of a second display).

S2201: The control device 310 establishes communication connections to the first display device 320 and the second display device 330.

S2202: The first display device 320 determines a first coordinate system in which the first display is located.

S2203: The first display device 320 sends first information to the control device 310, where the first information includes the first coordinate system in which the first display is located and a size of the first display.

S2204: The second display device 330 determines a second coordinate system in which the second display is located.

S2205: The second display device 330 sends third information to the control device 310, where the third information includes the second coordinate system in which the second display is located and a size of the second display.

S2206: The control device 310 determines a first pointing direction of the control device 310, a first pose of the first display relative to the control device 310, and a second pose of the second display relative to the control device 310.

S2207: The control device 310 determines a first position that the control device 310 points to on a plane on which the first display is located and a second position that the control device 310 points to on a plane on which the second display is located, where the first position is on the first display.

S2208: The control device 310 sends second information to the first display device 320, where the second information includes coordinate information of the first position.

S2209: The first display device 320 displays the cursor at the first position based on the second information.

S2210: When the pose of the first display device 320 changes, the first display device 320 determines a third coordinate system in which the first display is located.

S2211: The first display device 320 sends sixth information to the control device 310, where the sixth information includes the third coordinate system in which the first display is located and the size of the first display.

S2212: The control device 310 determines a fourth pointing direction of the control device 310, a seventh pose of the first display relative to the control device 310, and an eighth pose of the second display relative to the control device 310.

S2213: The control device 310 determines a seventh position that the control device 310 points to on a plane on which the first display is located and an eighth position that the control device 310 points to on the plane on which the second display is located, where the eighth position is on the first display.

S2214: The control device 310 sends seventh information to the second display device 330, where the seventh information includes coordinate information of the eighth position.

S2215: The second display device 330 displays the cursor at the eighth position based on the seventh information.

Figure 23:
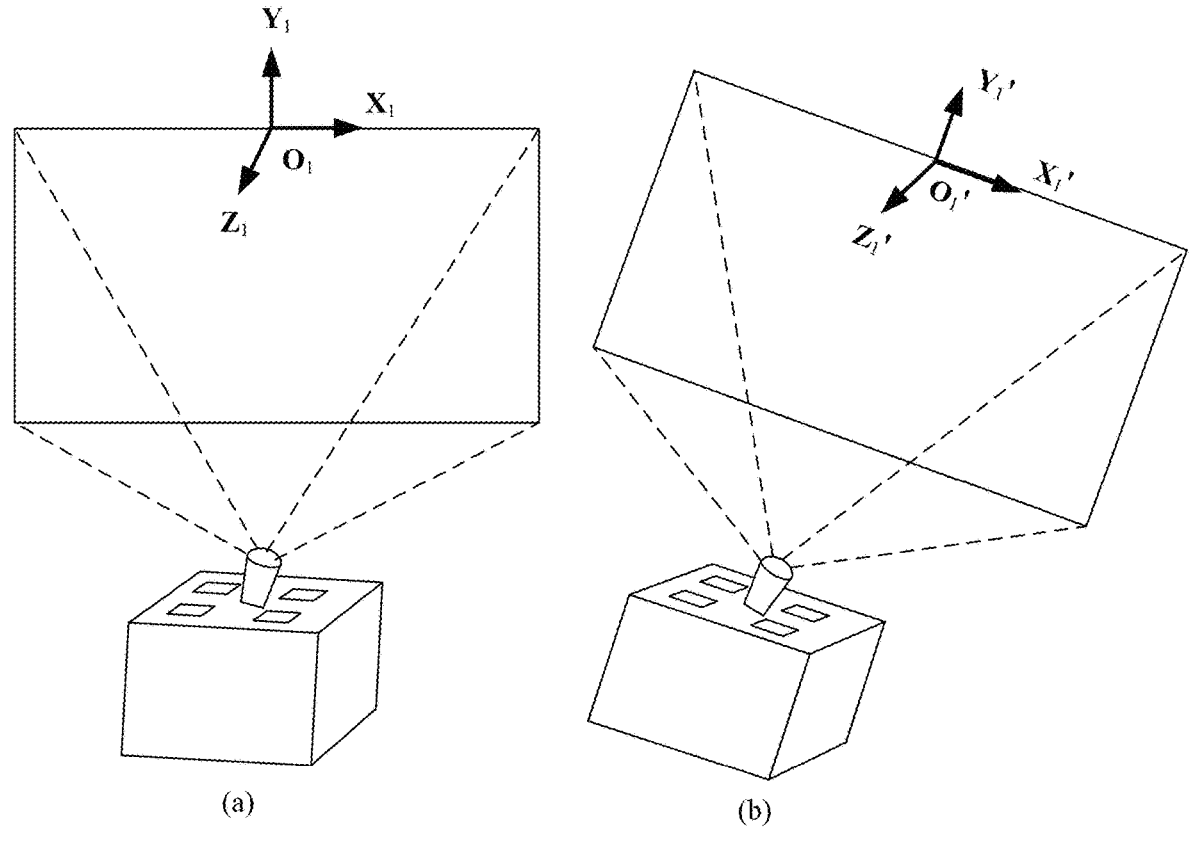
FIG. 23 is a schematic diagram of an update result of a coordinate system in which a display carrier is located when an orientation of a projector changes according to an embodiment of this application.

For example, the first display device 320 is a projector. When a position or an angle of the projector shifts, for example, when a pose shown in (a) in FIG. 23 changes to an orientation shown in (b) in FIG. 23, a pose of a display carrier of the projector changes. The projector updates, to the control device 310, a size of the display carrier of the projector and a coordinate system in which the display carrier is located (for example, a coordinate origin changes from O1 to O1', an X1 axis changes to an X1' axis, a Y1 axis changes to a Y1' axis, and a Z1 axis changes to a Z1' axis), and the control device 310 also obtains an attitude of the display carrier relative to the control device 310 in real time. Therefore, as shown in FIG. 23, after the pose of the projector changes, the control device 310 may still implement precise control on cursor presentation on a new projection interface.

Figure 24:
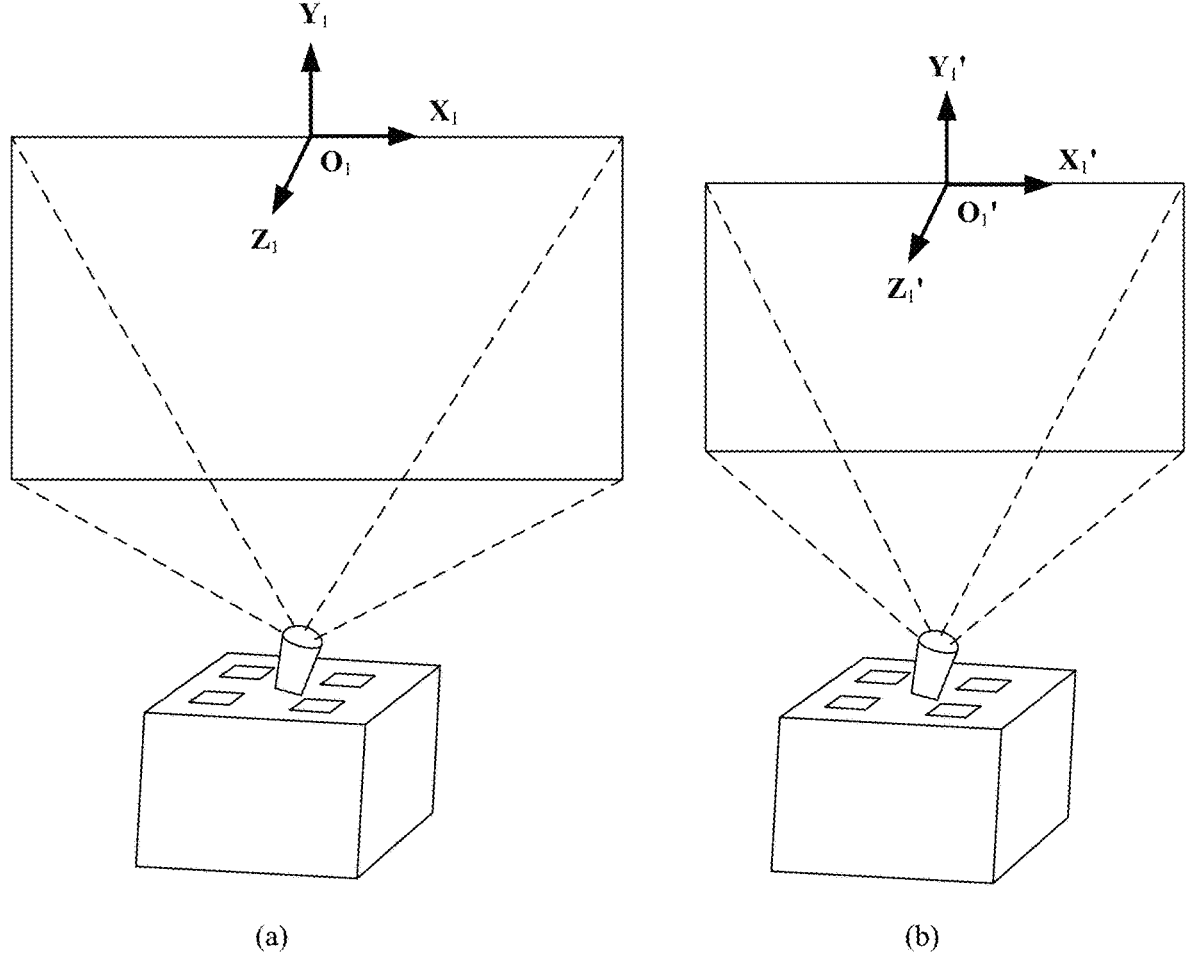
FIG. 24 is another schematic diagram of an update result of a coordinate system in which a display carrier is located when an orientation of a projector changes according to an embodiment of this application.

For another example, the first display device 320 is a projector. When a display size parameter of the projector changes, a size of a display carrier of the projector changes. For example, a size shown in (a) in FIG. 24 changes to a size shown in (b) in FIG. 24. The projector updates, to the control device 310, the size of the display carrier of the projector and a coordinate system in which the display carrier is located (for example, a coordinate origin changes from O1 to O1', an X1 axis changes to an X1' axis, a Y1 axis changes to a Y1' axis, and a Z1 axis changes to a Z1' axis), and the control device 310 also obtains an attitude of the display carrier relative to the control device 310 in real time. Therefore, as shown in FIG. 23, after the display size parameter of the projector changes, the control device 310 may still implement precise control on cursor presentation on a new projection interface.

In addition, based on the device display control method provided in this embodiment of this application, in a process in which the cursor traverses between the first display device 320 and the second display device 330, the first display device 320 and the third display device 330 separately display the cursor based on the pointing position of the control device 310 and specific attributes of the first display device 320 and the second display device 330, such as types, sizes of displays, and resolutions of displays. Therefore, even if one or more attributes of the following: types, sizes of displays, resolutions of displays, and the like of the first display device 320 and the second display device 330 are different, in a process in which the cursor traverses from the first display device 320 to the second display device 330, the cursor can still traverse continuously and smoothly. This improves control experience of a user.

Figure 25:
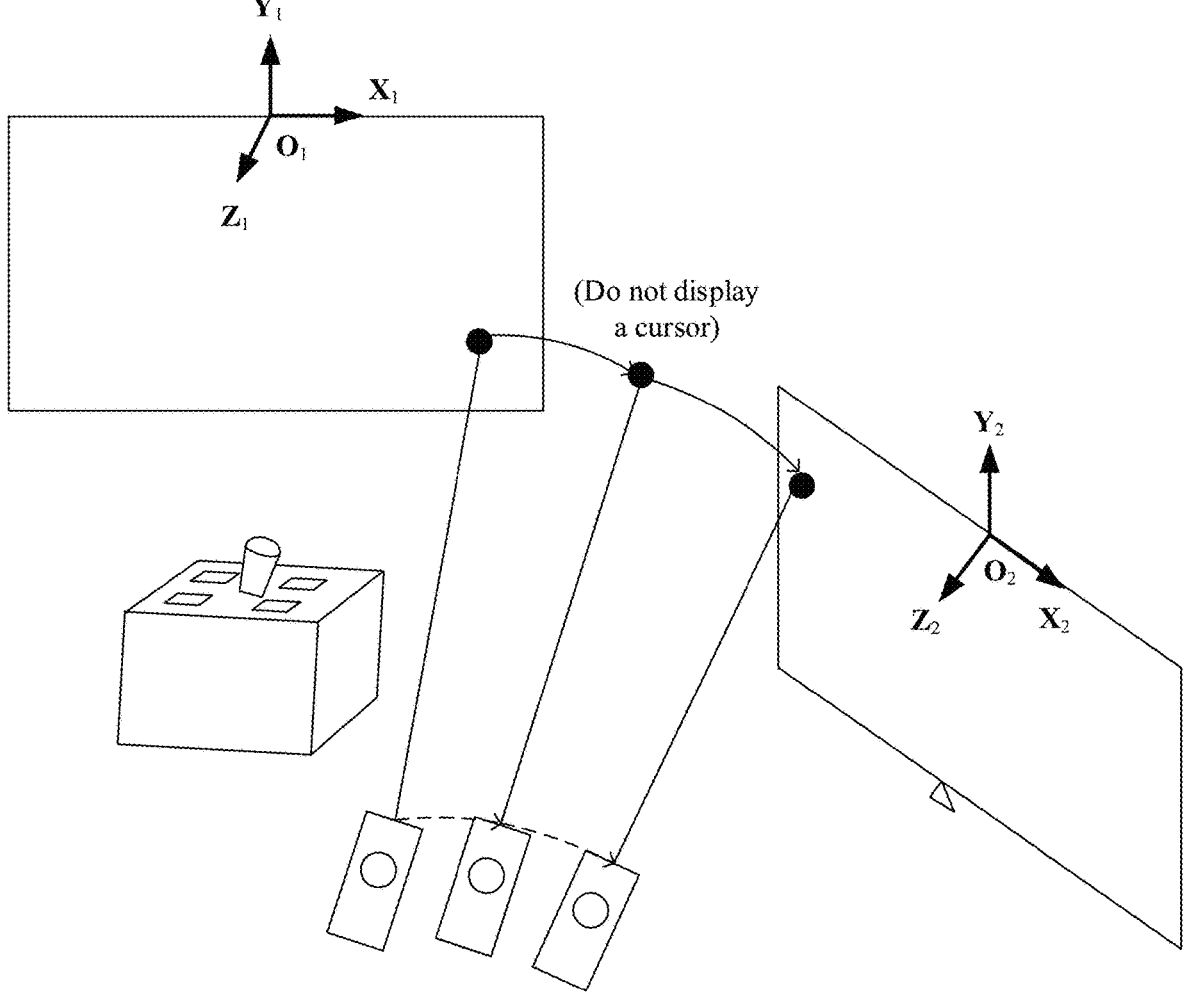
FIG. 25 is a schematic diagram of a process in which a cursor traverses between display devices with different attributes according to an embodiment of this application.

For example, refer to FIG. 25. FIG. 25 is a schematic diagram of a process in which a cursor traverses between display devices with different attributes according to an embodiment of this application, where an example in which the first display device 320 is a projector and the second display device 330 is a television is used. As shown in FIG. 25, even if one or more attributes of the following: types, sizes of displays, resolutions of displays, and the like of the projector and the television are different, before the cursor traverses from a display carrier of the projector to the television, the projector determines a pointing position of a control device based on a coordinate system in which the display carrier of the projector is located, a size of the display carrier of the projector, and a pose of the display carrier of the projector relative to the control device, and displays the cursor in combination of an actual attribute of the projector. In addition, after the cursor traverses from the display carrier of the projector to the television, the television determines the pointing position of the control device based on a coordinate system in which a display of the television is located, a size of the display of the television, and a pose of the display of the television relative to the control device, and displays the cursor in combination of an actual attribute of the television. Therefore, an entire traversal process of the cursor is not affected by different attributes of devices, and the cursor can traverse continuously and smoothly. This improves the control experience of the user.

It should be noted that, in the foregoing embodiment in the multi-display device scenario, that the display device sends the coordinate system in which the display of the display device is located to the control device 310, and the control device 310 determines the pointing direction of the control device 310, the pose of the display relative to the control device 320, and the position of the intersection point of the pointing direction of the control device 310 and the plane on which the display is located (that is, the pointing position of the control device 310) is merely used as an example. During actual application, an execution body for determining the pointing position of the control device 310 is not limited. For example, each display device may alternatively determine a position of an intersection point of the pointing direction of the control device 310 and a plane on which a display of the display device is located. For this implementation, refer to an implementation process of a related embodiment in the scenario 1. Details are not described herein again.

In addition, in the foregoing embodiment in the multi-display device scenario, that the cursor traverses from the first display device to the second display device is merely used as an example. During actual application, an actual traversal scenario of the cursor is not limited. For example, the cursor may alternatively traverse from the second display device to the first display device.

In addition, in the foregoing embodiment in the multi-display device scenario, the first display device and the second display device are merely used as an example. During actual application, a quantity of display devices is not limited. In a case in which the scenario further includes a third display device, reference may be made to the foregoing process in which the cursor traverses between the first display device and the second display device. Details are not described herein again.

It should be noted that, in the foregoing scenario 2, that the cursor follows the movement track of the control device and traverses between the first display and the second display is merely used as an example. During actual application, specific interface effect displayed may be determined based on a specific application scenario, a function of a device, and the like. For example, in the scenario 2, effect that a component, a virtual image, view angle effect, special effect or the like traverses between the first display and the second display may alternatively be implemented. For another example, in the scenario 2, effect that the interface effect changes after traversal may alternatively be implemented.

For example, when the first display and the second display are in a same game scenario, and the pointing position of the control device traverses from the first display to the second display, synchronously, a game hero image, game equipment, game special effect (for example, bubble special effect, firework special effect, targeting special effect, or hit special effect), or the like may also traverse from the first display to the second display.

For another example, when the first display is in a game scenario, the second display is in a handwriting tablet scenario, and the pointing position of the control device traverses from the first display to the second display, synchronously, the interface effect changes from a game hero image, game equipment, game special effect (for example, bubble special effect, firework special effect, targeting special effect, or hit special effect), or the like to a stylus image, handwriting, and/or the like.

For another example, when the first display is in a game scenario, and the second display is in a demonstration scenario, and the pointing position of the control device traverses from the first display to the second display, synchronously, the interface effect changes from a game hero image, game equipment, game special effect (for example, bubble special effect, firework special effect, targeting special effect, or hit special effect), or the like to a cursor.

Similarly, in a case in which the first display and the second display are in a same handwriting tablet scenario, a same demonstration scenario, or the like, the interface effect may not change after traversal. Alternatively, in a case in which the first display is in a handwriting tablet scenario and the second display is in a game scenario, or the first display is in a demonstration scenario and the second display is in a game scenario, or the first display is in a demonstration scenario and the second display is in a handwriting tablet scenario, or the first display is in a handwriting tablet scenario and the second display is in a demonstration scenario, or the like, the interface effect may change after traversal. Details are not described herein again.

In the foregoing scenario 2, the interface effect displayed on the first display or the second display may alternatively include but is not limited to displaying a displayed object (such as an icon, a component, a virtual image, or an image) at the pointing position of the control device, displaying corresponding view angle effect based on the pointing position of the control device, displaying preset special effect in a corresponding display area (such as a preset control hot area) based on the pointing position of the display control device, and the like. This is not specifically limited in this embodiment of this application, and is determined based on an actual application scenario, a function of a device, and the like.

In addition, in the foregoing scenario 2, when the pointing position of the control device moves out of an edge area of the first display and does not enter an edge area of the second display, the first display may no longer update the interface effect, or may no longer display any interface effect. This is not specifically limited in this embodiment of this application, and is determined based on an actual application scenario, a function of a device, and the like.

When a positioning process between the control device and the display device is described above, it is mentioned that positioning of the pointing position and cursor presentation may be implemented in a manner such as multi-antenna UWB or three-dimensional electromagnetic coil positioning. The following further specifically provides an implementation of a possible positioning system according to an embodiment of this application.

Figure 26:
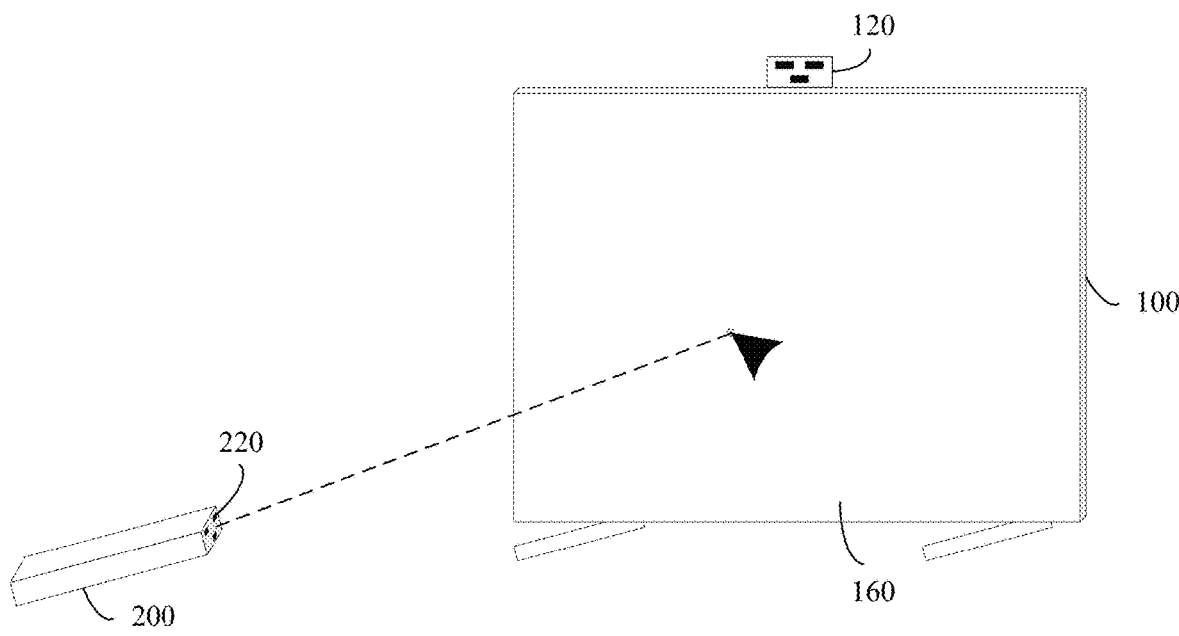
FIG. 26 is a diagram of an architecture of a positioning system according to an embodiment of this application.

FIG. 26 is a diagram of an architecture of a possible positioning system according to an embodiment of this application. Refer to FIG. 26. The system includes a first electronic device 100 and a second electronic device 200. A first antenna array 120 is disposed on the first electronic device 100, and a second antenna array 220 is disposed on the second electronic device 200. The first antenna array 120 can establish a three-dimensional coordinate system based on a relative position of the first antenna array 120 on the first electronic device 100. Positions of the first antenna array 120 and the second antenna array 220 relative to each other can be determined, so that coordinates of the second antenna array 220 are accurately displayed on a display interface of the first electronic device 100.

For example, the first electronic device 100 may be specifically a television, a computer, a projector, or another electronic device with a display interface, that is, the first display device 320 or the second display device 320 mentioned above, or the like. The second electronic device 200 may be specifically a remote control, a mobile phone, or another electronic device with a remote control function on the first electronic device 100, that is, the control device 310 mentioned above or the like. Specific forms of the first electronic device 100 and the second electronic device 200 are not limited in this application. In this embodiment, for ease of description, an example in which the first electronic device 100 is a large screen with a display function and the second electronic device 200 is a remote control is used for description. The remote control may be referred to as a pointing remote control. For example, after the remote control is paired with the television, positions of a first antenna array 120 in the television and a second antenna array 220 in the remote control relative to each other may be determined, so that coordinates of the remote control are displayed on a screen of the television. The coordinates may be displayed on the screen in a pattern such as a dot, an arrow, a star, a cross, or a hand shape.

Figure 27:
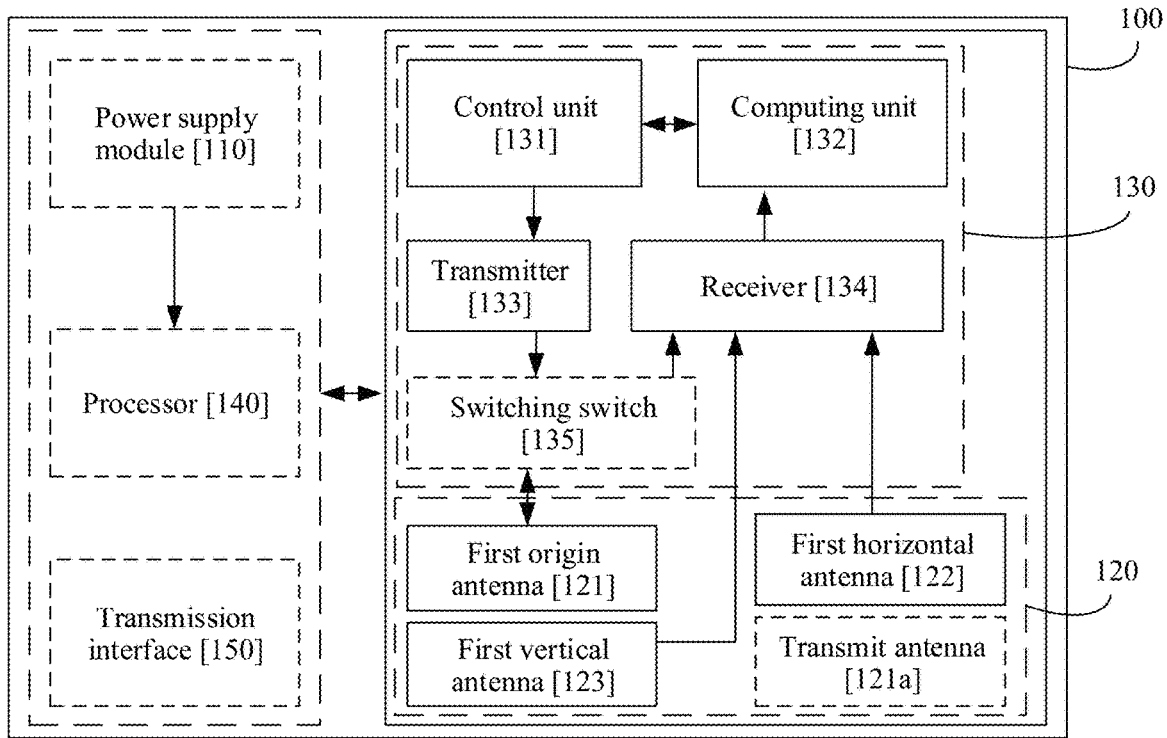
FIG. 27 is a schematic diagram of a structure of a first electronic device according to an embodiment of this application.

FIG. 27 is a schematic diagram of a structure of a first electronic device 100 according to an embodiment of this application. Refer to FIG. 27. The first electronic device 100 may include a processor 140, a transmission interface, a power supply module 110, the first antenna array 120, a first modular circuit 130, and the like.

It can be understood that the structure shown in this embodiment of the present disclosure does not constitute a specific limitation on the first electronic device 100. In some other embodiments of this application, the first electronic device 100 may include more or fewer components than those shown in the figure, or combine some components, or split some components, or have different component arrangements. The components shown in the figure may be implemented by hardware, software, or a combination of software and hardware. In addition, an interface connection relationship between modules that is shown in this embodiment of the present disclosure is merely an example for description, and does not constitute a limitation on the structure of the first electronic device 100. In some other embodiments of this application, the first electronic device 100 may alternatively use a different interface connection manner, or use a combination of a plurality of interface connection manners.

The processor 140 may include one or more processing units. Different processing units may be independent components, or may be integrated into one or more processors. For example, the processor 210 is a central processing unit (CPU), or may be an application-specific integrated circuit (ASIC), or is configured as one or more integrated circuits implementing embodiments of this application, for example, one or more microprocessors (digital signal processors, DSPs) or one or more field programmable gate arrays (FPGAs).

A transmission interface 150 may be a wired interface such as a universal serial bus (USB) port, or may be a standard wireless interface such as a service transaction event (Business Transaction Event, BTE) related interface. The transmission interface 150 may be configured to connect to a charger to charge the first electronic device 100, or may be configured to transmit data between the first electronic device 100 and a peripheral device, for example, transmit data between the first electronic device 100 and the second electronic device 200.

The power supply module 110 is configured to supply power to a component of the first electronic device 100, such as the processor 140.

Figure 28:
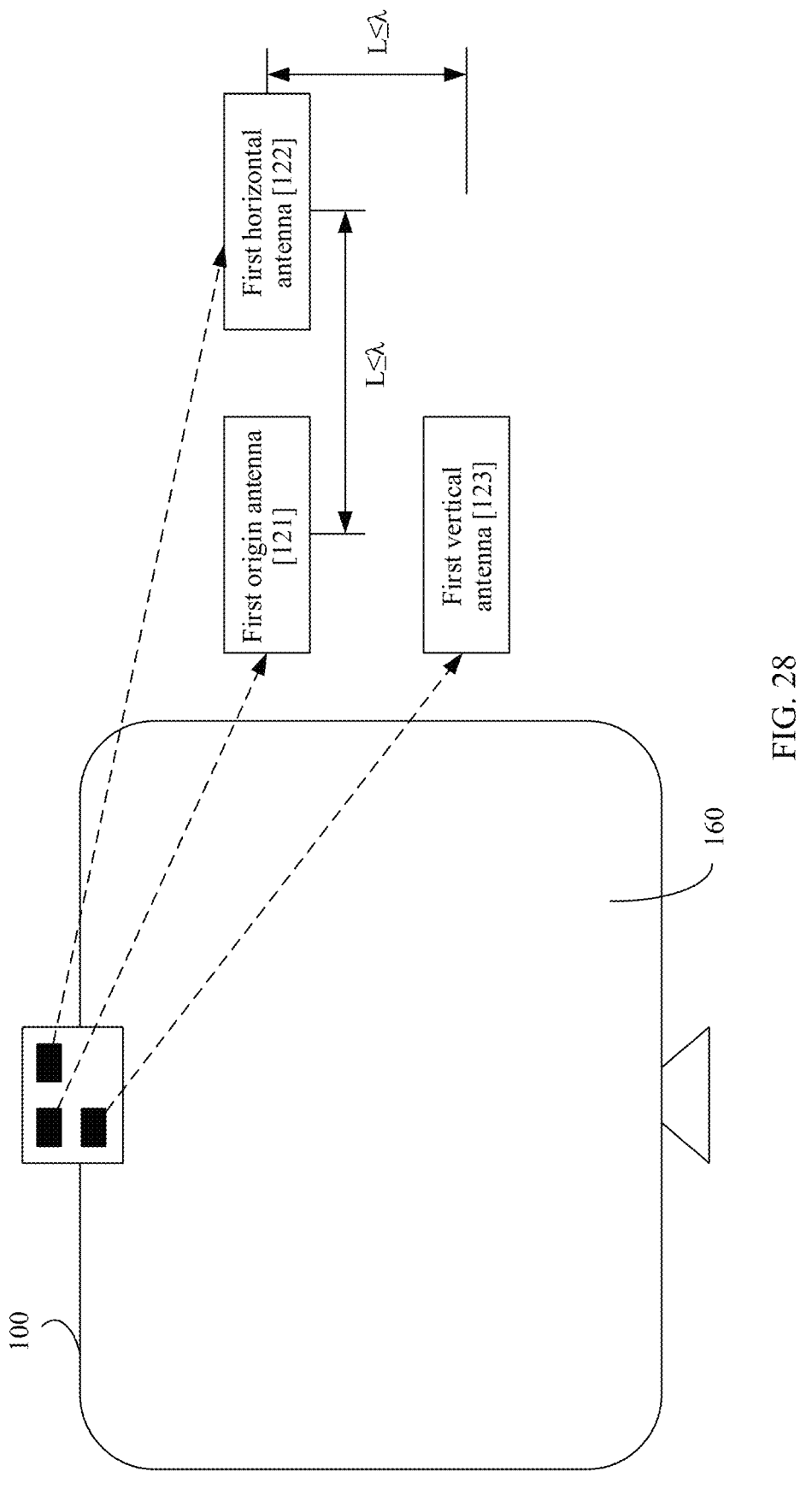
FIG. 28 is a diagram of an arrangement state of a first antenna array on a first electronic device according to an embodiment of this application.

FIG. 28 is a diagram of an arrangement state of a first antenna array 120 on a first electronic device 100 according to an embodiment of this application. Refer to FIG. 28. The first antenna array 120 may be disposed at any position on the first electronic device 100. For example, the first antenna array 120 may be disposed outside the first electronic device 100, for example, disposed on a frame of the first electronic device 100, or disposed on an object at a specific distance from the first electronic device 100. The "object" may be an independent apparatus, for example, a desk or a rack. The first electronic device 100 and the first antenna array 120 may be placed on different racks at a specific distance from each other. Certainly, the first antenna array 120 may alternatively be disposed inside the electronic device in a hidden or semi-hidden manner. This is not limited in this embodiment.

For example, if it is considered to use a remote control to control movement of a cursor on a display, it may be considered to dispose an acceleration sensor and a gyroscope sensor in the remote control, to sense a rotation state and a translation state of the remote control. Relative displacement of the remote control relative to the display is calculated based on values read by the sensors. The displacement may turn into the movement of the cursor on the display, thereby implementing interaction between the remote control and the display. However, in this design, only the relative displacement of the remote control relative to the display can be obtained, and the remote control cannot match a size of the display. As a result, absolute displacement of the remote control within a size range of the display cannot be obtained, and the movement of the cursor on the display does not correspond to an actual intention of the user when an actual pointing direction and displacement of the remote control are operated to change. For example, when the remote control points to a position beyond the display, the cursor is still displayed on the display. When the remote control moves, the cursor may further be controlled to move. As a result, in entire remote control identification, an accurate pointing direction and an accurate position cannot be sensed.

Therefore, in this embodiment of this application, another design is considered. To be specific, the first antenna array 120 is disposed on the first electronic device 100 side, and a second antenna array 220 is disposed on the second electronic device 200 side. Both the first antenna array 120 and the second antenna array 220 can send and receive signals, and positions of the antenna arrays relative to each other can be determined. In this way, absolute coordinates of the second antenna array 220 relative to the first electronic device 100 can be obtained. The second antenna array 220 can accurately point to a position specified by the first electronic device 100. Specifically, after the position of the first antenna array 120 on the first electronic device 100 is determined, the first antenna array 120 can establish the three-dimensional coordinate system based on the relative position of the first antenna array 120 on the first electronic device 100. A relative position of the first antenna array 120 relative to a display interface 160 of the first electronic device 100 is also included in the three-dimensional coordinate system. When the positions of the first antenna array 120 and the second antenna array 220 on the second electronic device 200 relative to each other are determined, if the detected coordinates of the second antenna array 220 do not exceed a range of the display interface 160, the coordinates of the second antenna array 220 can be accurately displayed within the range of the display interface 160; or if the coordinates of the second antenna array 220 exceed a range of the display interface 160, the coordinates of the second antenna array 220 are not displayed in the display interface 160, so that a problem of inaccurate pointing can be avoided.

Figure 29:
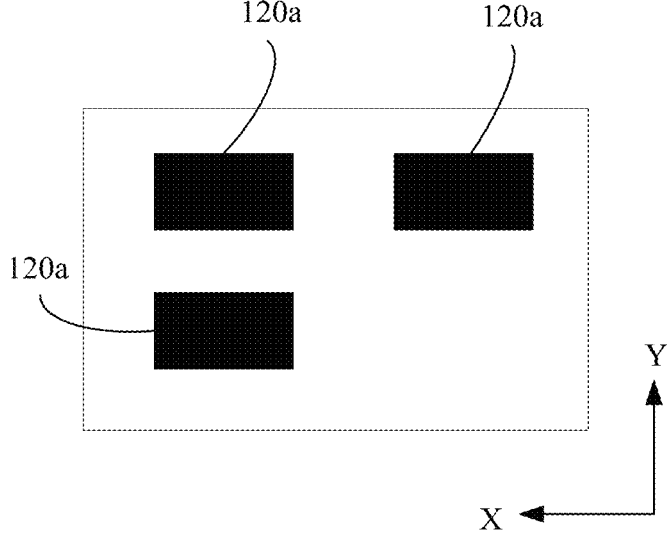
FIG. 29 is a schematic diagram of an arrangement of first antenna elements.
Figure 30:
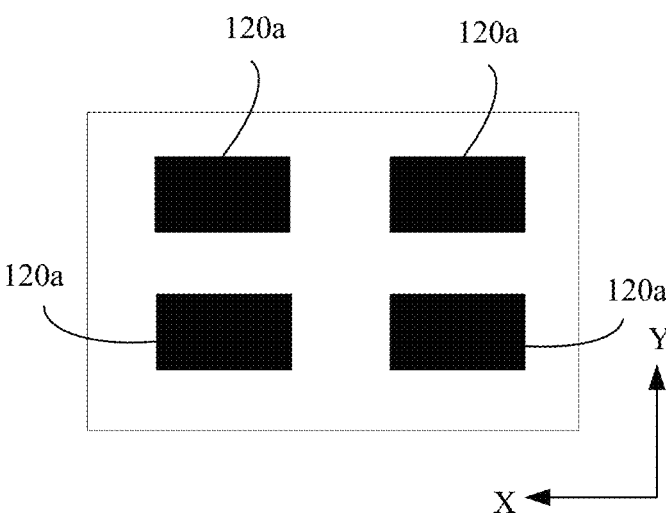
FIG. 30 is a schematic diagram of another arrangement of first antenna elements.
Figure 31:
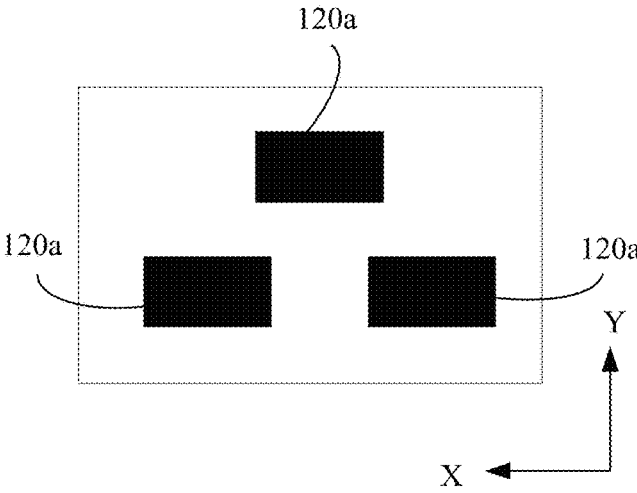
FIG. 31 is a schematic diagram of still another arrangement of first antenna elements.

The first antenna array 120 may specifically include a plurality of first antenna elements 120*a*, and the plurality of first antenna elements 120*a* are arranged based on a specified position relationship. For example, FIG. 29 is a schematic diagram of an arrangement of first antenna elements 120*a*. Refer to FIG. 29. There are three first antenna elements 120*a*, and the three first antenna elements 120*a* are arranged in an "L" shape. FIG. 30 is a schematic diagram of another arrangement of first antenna elements 120*a*. Refer to FIG. 30. There are four first antenna elements 120*a*, and the four first antenna elements 120*a* are arranged in a "rectangular" shape. FIG. 31 is a schematic diagram of still another arrangement of first antenna elements 120*a*. Refer to FIG. 31. There are three first antenna elements 120*a*, and the three first antenna elements 120*a* are arranged in an "isosceles triangular" shape. In each of the arrangement forms of at least three first antenna elements 120*a*, at least two antennas are respectively distributed in a first direction X and a second direction Y, and the first direction X is perpendicular to the second direction Y. The first direction X may be used as a horizontal axis of the three-dimensional coordinate system, and the second direction Y may be used as a vertical axis of the three-dimensional coordinate system. There may be a specified geometric relationship between a plane, including the first direction X and the second direction Y, and the display interface of the first electronic device 100. This can facilitate calculation of the coordinates of the second antenna array 220.

The second antenna array 220 can send a first signal, and the first antenna array 120 can receive the first signal. Correspondingly, the first antenna array 120 can send a second signal, and the second antenna array 220 can receive the second signal. The first antenna array 120 and the second antenna array 220 may work at a super high frequency (SHF). SHF covers 3 GHz to 30 GHz. For example, an operating frequency that may be used is 5.8 GHz, 7.9 GHz, 24 GHz, or the like. An ultra-wideband (UWB) frequency band may cover 7.9 GHz.

Refer to FIG. 27. The first modular circuit 130 may include a control unit 131, a transmitter 133, a receiver 134, a computing unit 132, and the like. The control unit 131 may control the transmitter 133 and the computing unit 132 to work. The transmitter 133 is configured to control the first antenna array 120 to send the second signal. The receiver 134 is configured to control the first antenna array 120 to receive the first signal from the second antenna array 220. The computing unit 132 may calculate a phase parameter in the received first signal, and feed back a calculation result to the control unit 131. The control unit 131 may further calculate first coordinates of the second antenna array 220 based on the result fed back by the computing unit 132.

Figure 32:
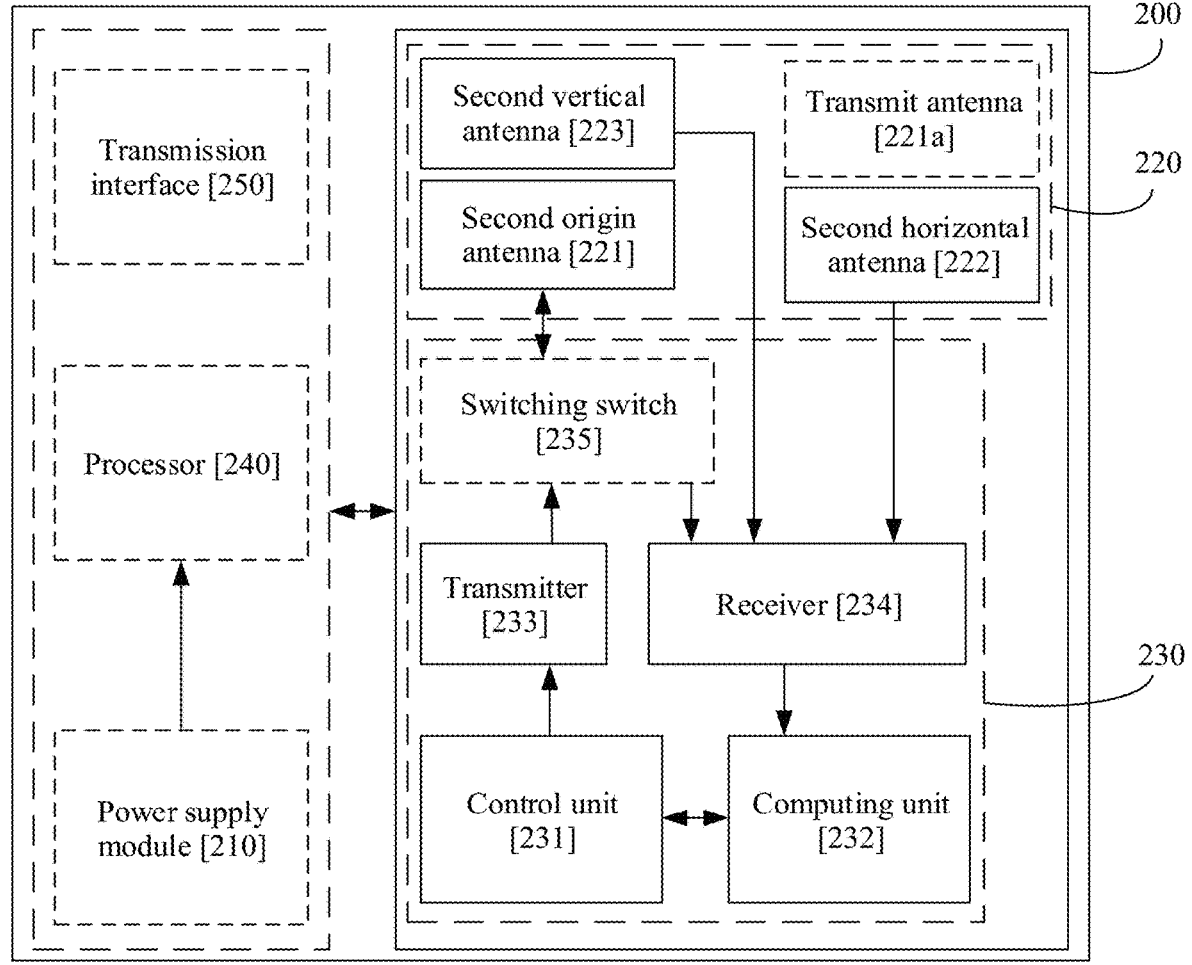
FIG. 32 is a schematic diagram of a structure of a second electronic device according to an embodiment of this application.

In addition, FIG. 32 is a schematic diagram of a structure of a second electronic device 200 according to an embodiment of this application. Refer to FIG. 32. The second electronic device 200 may also have the foregoing components of the first electronic device 100. Specifically, the second electronic device 200 may include a processor 240, a transmission interface 250, a power supply module 210, the second antenna array 220, a second modular circuit 230, and the like. The processor 240, the transmission interface 250, and the power supply module 210 in the second electronic device 200 have same functions as the processor 140, the transmission interface 150, and the power supply module 110 in the first electronic device 100. Details are not described herein again.

The second antenna array 220 is configured to send the first signal and receive the second signal. The second modular circuit 230 is electrically connected to the second antenna array 220, and is configured to measure deflection angles of the second antenna array 220 relative to the first direction and the second direction based on the second signal.

As described above, in this embodiment, positions of the first antenna array 120 and the second antenna array 220 relative to each other need to be determined, to obtain the absolute coordinates of the second antenna array 220 within a size range of the first electronic device 100. Specifically, relative coordinates, that is, the first coordinates, of the second antenna array 220 relative to the first antenna array 120 need to be obtained by the first antenna array 120 based on the first signal sent by the second antenna array 220. The first coordinates may be used to determine a spatial position of the second antenna array 220.

In addition, the second antenna array 220 is disposed on the second electronic device 200. When the second electronic device 200 is operated, the second electronic device 200 may freely rotate at a position indicated by the first coordinates, to drive the second antenna array 220 to rotate. Such rotation affects a phase of a signal received by the second antenna array 220, and values of the first coordinates in the first direction and the second direction are changed. As a result, an actual pointing position of the second antenna array 220 does not correspond to the position indicated by the first coordinates. Therefore, in this embodiment, rotation of the second electronic device 200 is considered. After the first antenna array 120 obtains, through positioning, the first coordinates of the second antenna array 220 based on the first signal sent by the second antenna array 220, the second antenna array 220 may obtain, through positioning, the deflection angles of the second antenna array 220 relative to the first direction X and the second direction Y based on the second signal sent by the first antenna array 120. The final second coordinates may be further obtained based on first coordinates and the deflection angles.

In some embodiments, if a radiating surface of the first antenna array 120 is parallel to the display interface 160 of the first electronic device 100, the second coordinates are a position of a cursor that is capable of being displayed on the first electronic device 100 through an operation on the second electronic device 200. In some other embodiments, if a radiating surface of the first antenna array 120 is not parallel to the display interface 160 of the first electronic device, the second coordinates need to be further converted based on a physical position relationship between the first antenna array 120 and the display interface 160, to obtain, after the conversion, a position of a cursor displayed on the display interface 160.

Refer to FIG. 32. The second modular circuit 230 may also include a control unit 231, a transmitter 233, a receiver 234, a computing unit 232, and the like. The control unit 231 may control the transmitter 233 and the computing unit 232 to work. The transmitter 233 is configured to control the second antenna array 220 to send the first signal. The receiver 234 is configured to control the second antenna array 220 to receive the second signal from the first antenna array 120. The computing unit 232 may calculate a phase parameter in the received second signal, and feed back a calculation result to the control unit 231. The control unit 231 may further calculate the deflection angles of the second antenna array 220 based on the result fed back by the computing unit 232.

The first modular circuit 130 or the second modular circuit 230 may be configured to calculate the second coordinates based on the first coordinates and the deflection angles. In an embodiment, after obtaining the deflection angles, the second antenna array 220 may transmit the deflection angles to the first modular circuit 130 through the transmission interface. The first modular circuit 130 may calculate the second coordinates based on the first coordinates and the deflection angles. In another embodiment, after obtaining the deflection angles, the second antenna array 220 may obtain the second coordinates through calculation by using the second modular circuit 230, and then may transmit the second coordinates to the first modular circuit 130 through the transmission interface. If the second coordinates are within a size range of the display interface of the first electronic device 100, the second coordinates may be displayed on the first electronic device 100.

Therefore, according to the system provided in this embodiment of this application, the first antenna array 120 is disposed on the first electronic device 100, and the second antenna array 220 is disposed on the second electronic device 200, so that long-distance interaction between the first electronic device 100 and the second electronic device 200 can be implemented, with no need to rely on a moving plane. In addition, the positions of the first antenna array 120 and the second antenna array 220 relative to each other may be determined, to obtain the absolute coordinates of the second antenna array 220 within the size range of the first electronic device 100. Positioning of the second antenna array 220 is more precise, and operation experience in a spatial pointing operation is improved.

Optionally, refer to FIG. 3. At least three first antenna elements 120a are disposed, and at least two second antenna elements are disposed. A distance L between any two first antenna elements 120a that are in the at least three first antenna elements 120a and that have signal receiving functions is less than or equal to a wavelength λ of the first signal. The first antenna array 120 and the second antenna array 220 may have a same arrangement form. For example, the first antenna array 120 includes three first antenna elements 120a, the second antenna array 220 includes three second antenna elements, and the three first antenna elements 120a and the three second antenna elements have a same arrangement form. Certainly, in some other embodiments, the first antenna array 120 and the second antenna array 220 may alternatively have different arrangement forms. For example, the first antenna array 120 includes three first antenna elements 120a, the second antenna array 220 includes two second antenna elements, and the three first antenna elements 120a and the two second antenna elements have different arrangement forms.

In this embodiment, an arrangement form of the first antenna array 120 is used as an example for description.

It may be understood that a wavelength may be obtained through calculation based on a wave velocity and a frequency. In this embodiment, the first antenna array 120 needs to receive the first signal sent by the second antenna array 220. The wavelength of the first signal may be obtained through calculation based on a frequency of the first signal and a wave velocity of an electromagnetic wave. A distance between any two first antenna elements 120a is limited based on the wavelength. Because a shape of an antenna is not an absolutely regular shape, an equivalent center of the antenna may be used as a start point or an end point of a calculated distance, that is, a distance between any two first antenna elements 120a is a distance between equivalent centers of antennas. The distance between any two first antenna elements 120a having the signal receiving functions is ensured to be less than or equal to the wavelength of the first signal, so that the first antenna elements 120a that are configured to receive signals can receive the first signal almost simultaneously, and each first antenna element 120a can obtain a phase parameter based on the first signal, and may further obtain the first coordinates through calculation based on the phase parameter.

Figure 33:
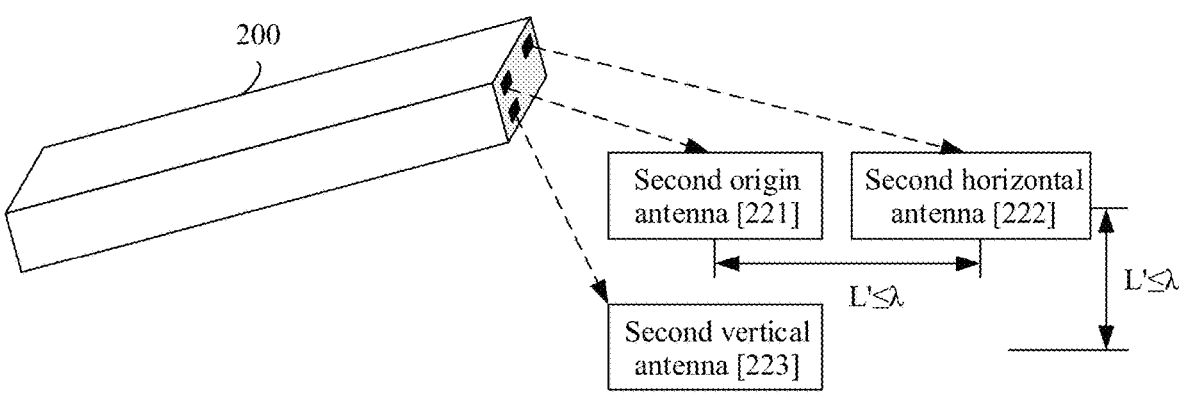
FIG. 33 is a diagram of an arrangement state of a second antenna array on a second electronic device according to an embodiment of this application.

Correspondingly, FIG. 33 is a diagram of an arrangement state of a second antenna array 220 on a second electronic device 200 according to an embodiment of this application. Refer to FIG. 33. Second antenna elements in the second antenna array 220 may be configured to receive the second signal sent by the first antenna array 120. A distance L' between any two second antenna elements is ensured to be less than or equal to a wavelength λ of the second signal, so that the second antenna elements that are configured to receive signals can receive the second signal almost simultaneously, and each second antenna element can obtain a phase parameter based on the second signal, and may obtain the deflection angles based on the phase parameter.

That is, in this embodiment, both the distance between any two first antenna elements 120a and the distance between any two second antenna elements are ensured to be less than a wavelength of a corresponding received signal, so that the first coordinates and the deflection angles can be obtained based on a phase parameter of the received signal. In this way, positioning of the second antenna array 220 in three-dimensional space can be implemented, and the absolute coordinates of the second antenna array 220 within the size range of the first electronic device 100 can be obtained. This improves positioning precision and improves experience of operating the second electronic device 200.

The first modular circuit 130 includes one or more receivers 134. For example, if there is one receiver 134, the receiver 134 may be separately electrically connected to a second antenna 122, a third antenna 123, and a first antenna 121 by using a high-speed switch, so that the signal receiving functions of three first antenna elements 120a may be implemented by using one receiver 134. The three antennas receive a signal almost simultaneously, and the first coordinates can be calculated based on a phase difference between the first antenna elements 120a. In addition, if there are a plurality of receivers 134, each receiver 134 is correspondingly connected to one first antenna element 120a. Synchronization may be performed between the receivers 134 by using a synchronization signal, to obtain a phase difference between the first antenna elements 120a.

Correspondingly, the second modular circuit 230 also includes one or more receivers 234, and an arrangement form of the receiver 234 and the second antenna elements in the second modular circuit 230 may be the same as an arrangement form of the receiver 134 and the first antenna elements in the first modular circuit 130. For example, if there is one receiver 234, one receiver 234 is electrically connected to each second antenna element, and one receiver 234 may implement the signal receiving functions of three second antenna elements. If there are a plurality of receivers 234, each receiver 234 is correspondingly connected to one second antenna element. Synchronization may be performed between the receivers 234 by using a synchronization signal, so that the three second antenna elements may receive a signal almost simultaneously, and the deflection angles can be calculated based on a phase difference between the second antenna elements.

Optionally, if there are a plurality of receivers 134 or 234, one of the receivers may be electrically connected to a plurality of antennas.

Optionally, refer to FIG. 27 and FIG. 28. The at least three first antenna elements 120a may be the first antenna 121, the second antenna 122, and the third antenna 123. The second antenna 122 is located on a side that is of the first antenna 121 and that is in the first direction X. The third antenna 123 is located on a side that is of the first antenna 121 and that is in the second direction Y.

The first antenna 121 may implement signal sending or receiving, and an origin of the three-dimensional coordinate system may be defined based on the first antenna 121.

For example, the first antenna 121 may be one independent antenna integrated with sending and receiving. The first modular circuit 130 includes the transmitter 133 and a switching switch 135. The transmitter 133 is connected to the first antenna 121 through the switching switch 135, and switching between a signal sending function and a signal receiving function may be implemented by using the switching switch 135. In this embodiment, a position of the first antenna 121 is the origin of the three-dimensional coordinate system. This can facilitate coordinate calculation.

In addition, in another embodiment, the first antenna 121 may alternatively include one transmit antenna 121a and one receive antenna. The transmit antenna 121a is connected to the transmitter 133 and is configured to send a signal. The receive antenna is connected to the receiver 134 and is configured to receive a signal. In this embodiment, the transmit antenna in the first antenna 121 is the origin of the three-dimensional coordinate system. This can facilitate coordinate calculation.

In addition, in some other embodiments, the origin of the three-dimensional coordinate system may alternatively be defined based on a position other than the first antenna 121. This is not limited in this embodiment.

For ease of description, the following is described by using an example in which the first antenna 121 is the independent antenna integrated with sending and receiving.

In an embodiment, the first antenna 121 is used as the origin of the three-dimensional coordinate system, the first direction is an x-axis direction of the three-dimensional coordinate system, and the second direction is a y-axis direction of the three-dimensional coordinate system. The second antenna 122 is located on an x-axis, and the third antenna 123 is located on a y-axis. In this way, the first antenna 121, the second antenna 122, and the third antenna 123 are arranged in an "L" shape. Both a distance between the second antenna 122 and the first antenna 121, and a distance between the third antenna 123 and the first antenna 121 are less than or equal to the wavelength of the first signal.

Based on a structure of the first antenna array 120 provided in this embodiment, the following describes in detail a positioning method with reference to the accompanying drawings.

When the second electronic device 200 is operated, a distance is usually maintained between the second electronic device 200 and the first electronic device 100, that is, a distance is maintained between the first antenna array 120 and the second antenna array 220, so that a triangle is formed among the second antenna array 220, the first antenna 121, and the second antenna 122, and a triangle is also formed among the second antenna array 220, the first antenna 121, and the third antenna 123. Therefore, values of first coordinates (x, y, z) may be obtained through calculation according to related principles of a triangle and an electromagnetic wave.

Figure 34:
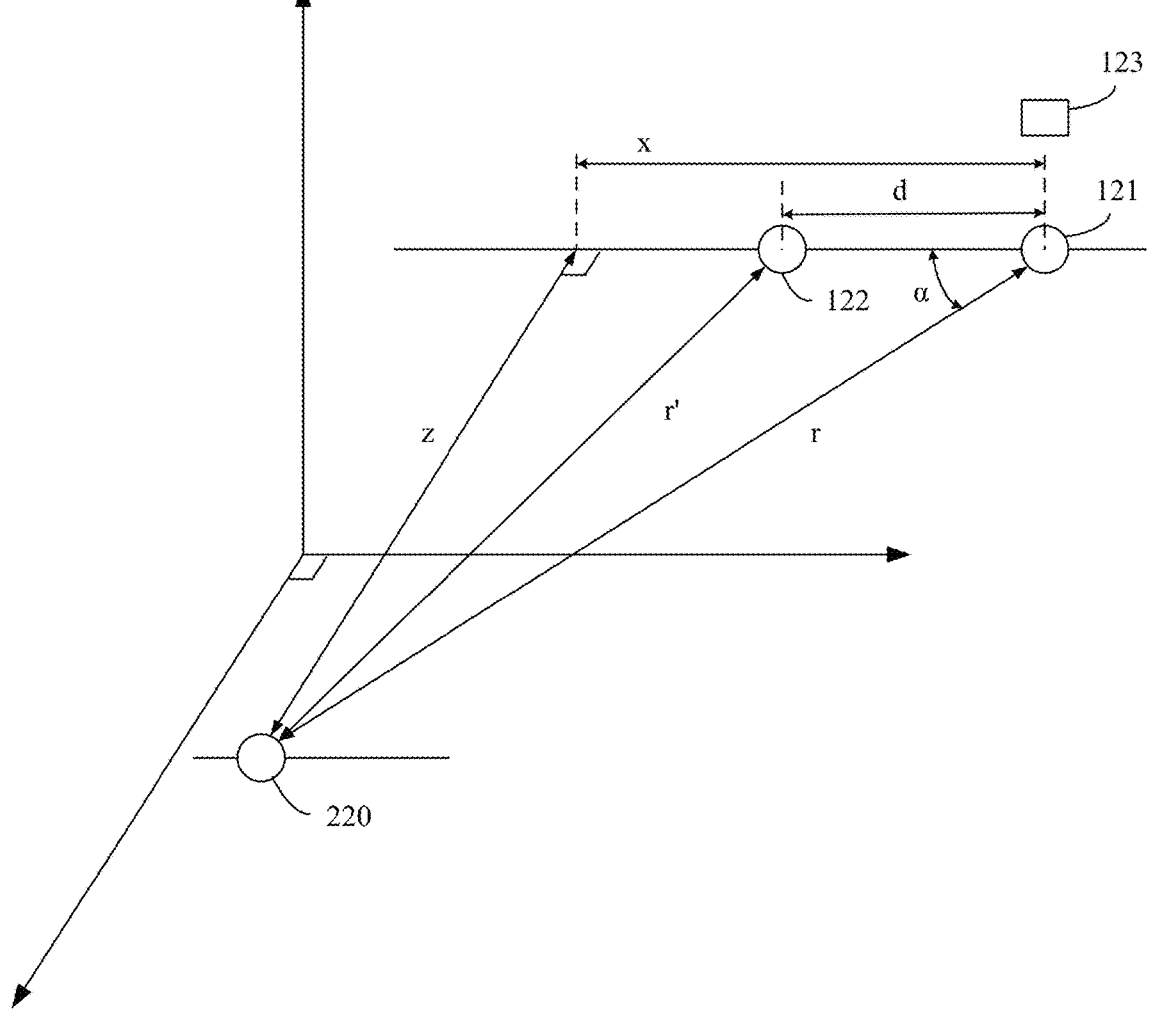
FIG. 34 is a diagram of a model for calculating first coordinates according to an embodiment of this application.

Specifically, FIG. 34 is a diagram of a model for calculating first coordinates according to an embodiment of this application. Refer to FIG. 34. In the triangle including the second antenna array 220, the first antenna 121, and the second antenna 122, for ease of description, a distance between the second antenna array 220 and the first antenna 121 may be defined as a first distance r, a second distance between the second antenna array 220 and the second antenna 122 is r', and a third distance between the second antenna 122 and the first antenna 121 is d.

Figure 35:
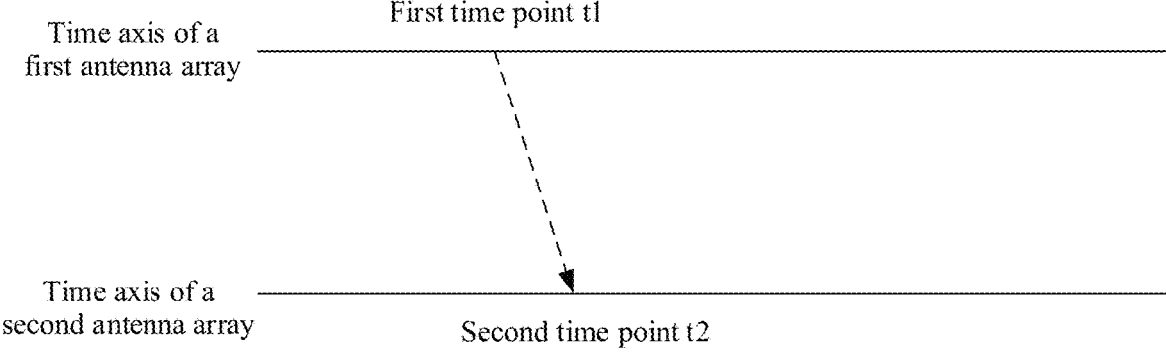
FIG. 35 is a schematic diagram of a unidirectional ranging method according to an embodiment of this application.

FIG. 35 is a schematic diagram of a unidirectional ranging method according to an embodiment of this application. Refer to FIG. 35. For calculation of the first distance r, if a clock of the second antenna array 220 is accurately synchronized with a clock of the first antenna 121, the unidirectional ranging method may be used. The following steps are specifically included.

Step a1: Detect a first time point t1 at which the second antenna array 220 sends the first signal.

Step a2: Detect a second time point t2 at which the first antenna 121 receives the first signal.

Step a3: Obtain the first distance d based on the first time point, the second time point, and a speed of light.

t2–t1 is duration for an electromagnetic wave to propagate between the second antenna array 220 and the first antenna 121. A propagation speed of the electromagnetic wave is a speed c of light. The first distance r may be obtained by multiplying the duration by the speed c of light, which may be specifically reflected in the following formula:

$$r = (t2 - t1) \times c$$

Figure 36:
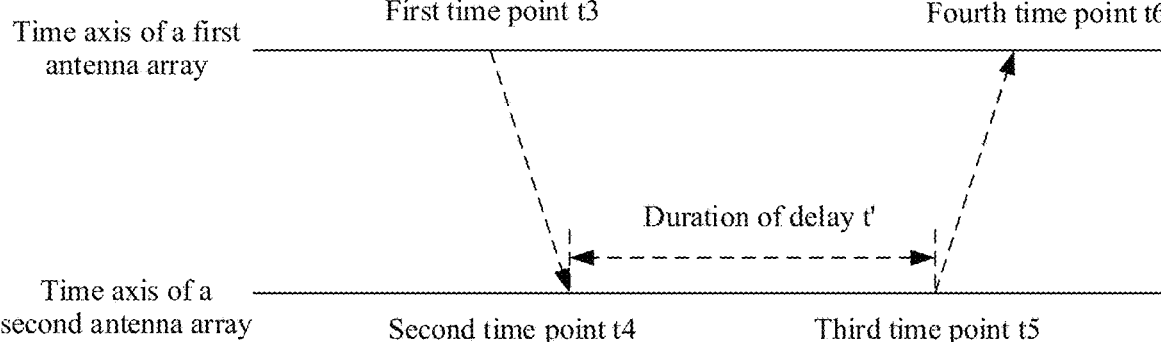
FIG. 36 is a schematic diagram of a bidirectional ranging method according to an embodiment of this application.

In addition, FIG. 36 is a schematic diagram of a bidirectional ranging method according to an embodiment of this application. Refer to FIG. 36. For calculation of the first distance r, if a clock of the second antenna array 220 is not synchronized with a clock of the first antenna 121, the bidirectional ranging method may be used. The following steps are specifically included.

Step b1: Detect a first time point t3 at which the second antenna array 220 sends the first signal.

Step b2: Detect a second time point t4 at which the first antenna 121 receives the first signal.

Step b3: Detect duration of delay t' for the first antenna 121 to process the first signal.

Step b4: Detect a third time point t5 at which the first antenna 121 sends the second signal.

Step b5: Detect a fourth time point t6 at which the second antenna array 220 receives the second signal.

Step b6: Obtain a straight-line distance based on the first time point, the second time point, the duration of delay, the third time point, the fourth time point, and a speed of light.

Because the clock of the second antenna array 220 is not synchronous with the clock of the first antenna 121, the duration of signal delay t' needs to be considered between receiving and sending a signal by the first antenna 121, and t'=t5–t4. t4–t3 is duration for an electromagnetic wave to propagate from the second antenna array 220 to the first antenna 121. t6–t5 is duration for an electromagnetic wave to propagate from the first antenna 121 to the second antenna array 220. The duration t4–t3 and the duration t6–t5 are equal. The first distance r may be specifically calculated by using the following formula:

$$r = \frac{(t6 - t3) - t'}{2}$$

For calculation of the second distance r', there is the third distance d between the second antenna 122 and the first antenna 121, so that there is a phase difference p' between signals received by the second antenna 122 and the first antenna 121. The phase difference p' may be a positive value or a negative value in the coordinate system. A distance difference p between the first distance r and the second distance r' may be calculated based on the phase difference p', a frequency f of the first signal, and the speed c of light. The distance difference p' may be calculated according to the following formula:

$$p = \frac{p'}{360} \times \frac{1}{f} \times c$$

When the second antenna array 220 sends the first signal, the first antenna 121 and the second antenna 122 may separately receive the first signal, and can separately obtain a phase parameter, so that the phase difference p' between the first antenna 121 and the second antenna 122 can be obtained. After the distance difference p is obtained, the second distance r' may be obtained through calculation, that is, r'=r-p.

Refer to FIG. 34. The third distance d may be directly learned when the second antenna 122 and the first antenna 121 are arranged. Therefore, lengths of three sides of the triangle including the first antenna 121, the second antenna 122, and the second antenna array 220 may be learned. An included angle between a connection line between the second antenna array 220 and the first antenna 121 and a connection line between the second antenna 122 and the first antenna 121 may be defined as a, and the first coordinates of the second antenna array 220 in the three-dimensional coordinate system is (x, y, z). This can be learned according to the following formulas:

$$\cos(\alpha) = \frac{r^2 + d^2 - (r-p)^2}{2\,rd} \tag{1}$$

-continued $$\cos(\alpha) = \frac{x}{r} \qquad (2)$$

$$r^2 = x^2 + z^2 \qquad (3)$$

x in Formulas (2) and (3) is a coordinate value that is of the second antenna array 220 and that is corresponding to the x-axis in the three-dimensional coordinate system. z is a coordinate value that is of the second antenna array 220 and that is corresponding to a z-axis in the three-dimensional coordinate system. A value of x in the first coordinates may be obtained according to Formulas (1) and (2), and a value of z in the first coordinates may be obtained through calculation according to Formulas (1) to (3).

Correspondingly, a value of y in the first coordinates may be obtained through calculation according to the foregoing principle of calculating the value of x and the value of z in the first coordinates. Details are not described herein again.

Therefore, all values of the first coordinates (x, y, z) may be obtained by using the foregoing method.

Figure 37:
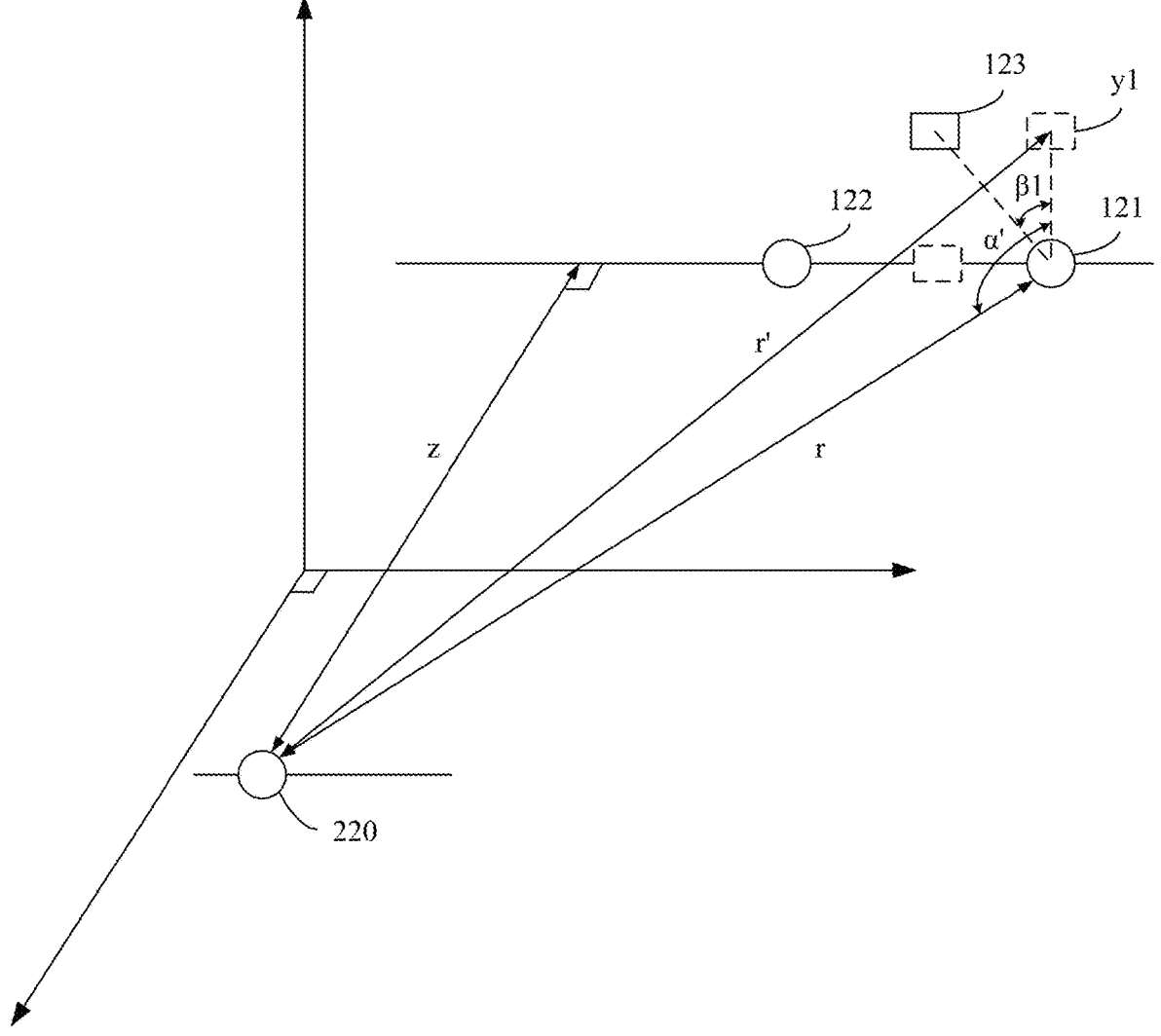
FIG. 37 is a diagram of another model for calculating first coordinates according to an embodiment of this application.

In another embodiment, FIG. 37 is a diagram of another model for calculating first coordinates according to an embodiment of this application. Refer to FIG. 37 FIG. 37. The second antenna 122 is on the x-axis of the three-dimensional coordinate system, and the third antenna 123 is located on a side that is of the first antenna 121 and that is in the y-axis direction, but is not located on the y-axis, so that positions of the first antenna 121, the third antenna 123, and the second antenna 122 are distributed in an "isosceles triangular" shape, an acute triangle, an obtuse triangle, or the like.

In this embodiment, for the triangle including the first antenna 121, the second antenna 122, and the second antenna array 220, because the second antenna 122 is located on the x-axis, a value of x and a value of z in the first coordinates in this embodiment may still be calculated through the foregoing method.

Refer to FIG. 37 FIG. 37. Because the third antenna 123 is not located on the y-axis, calculation cannot be performed directly based on the triangle including the first antenna 121, the third antenna 123, and the second antenna array 220. Instead, a projection point y1 that is of the third antenna 123 and that is on the y-axis needs to be determined, a triangle is determined by using the projection point y1, the first antenna 121, and the second antenna array 220, and a value of y in the first coordinates is calculated based on the triangle. There is an included angle β1 between a connection line between the third antenna 123 and the first antenna 121 and the y-axis. For a phase difference between the third antenna 123 and the first antenna 121, a component of the phase difference on the y-axis may be obtained through conversion based on the included angle β1. A distance from the projection point y1 that is of the third antenna 123 and that is on the y-axis to the second antenna array 220 may be obtained through calculation based on the component of the phase difference on the y-axis. A distance from the projection point y1 to the first antenna 121 may be obtained through conversion based on a distance between the third antenna 123 and the first antenna 121 and the included angle β1. A distance between the second antenna array 220 and the first antenna 121 may still be obtained through calculation based on the foregoing unidirectional ranging method or bidirectional ranging method. Therefore, a side length of each side of the triangle determined by the projection point y1, the first antenna 121, and the second antenna array 220 may be obtained. The value of y in the first coordinates can be obtained through calculation based on the foregoing method.

Figures 38, 39:
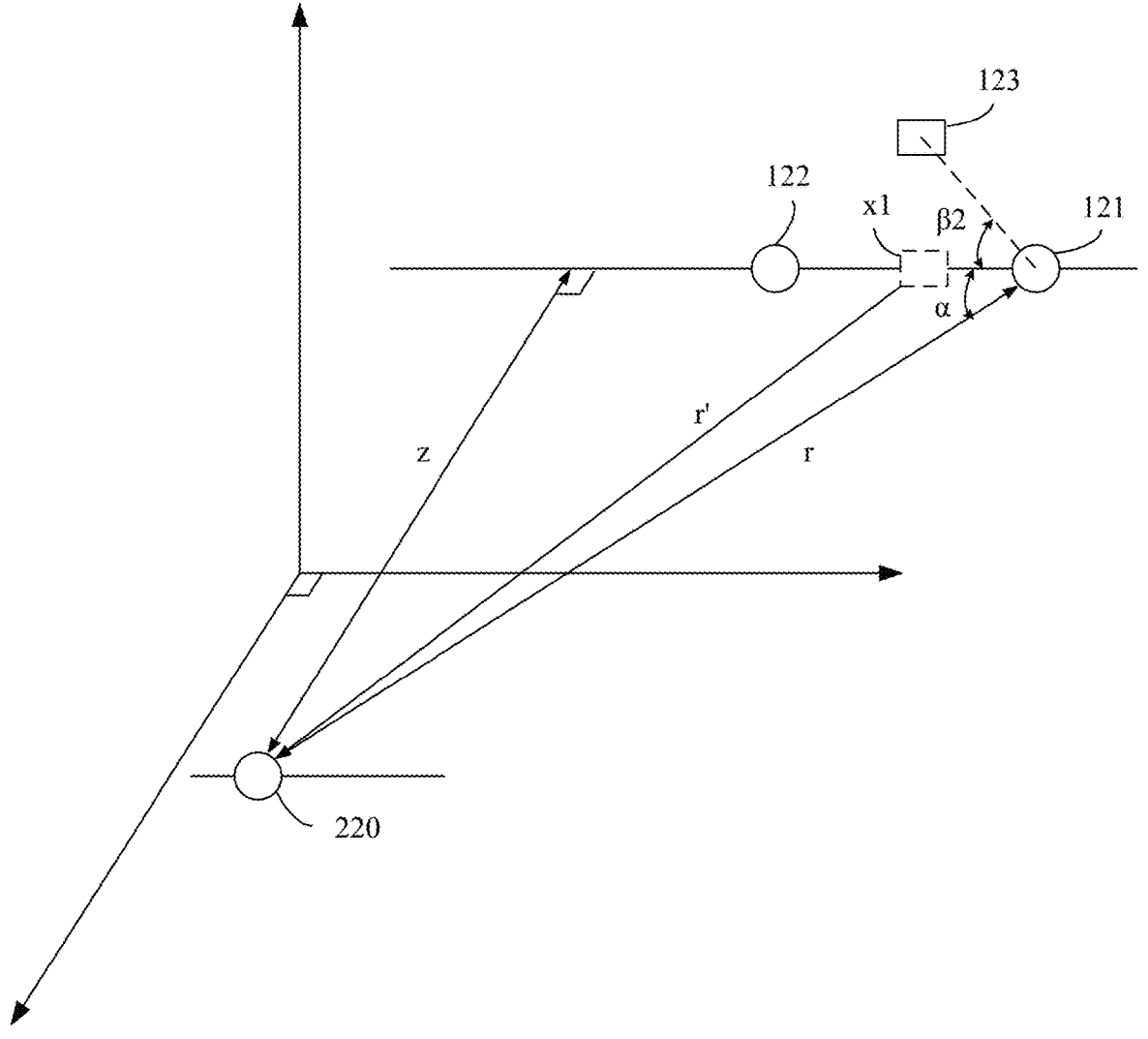
FIG. 38 is a diagram of still another model for calculating first coordinates according to an embodiment of this application.
FIG. 39 is a flowchart of a positioning method according to an embodiment of this application.

In addition, in some other embodiments, FIG. 38 is a diagram of still another model for calculating first coordinates according to an embodiment of this application. Refer to FIG. 38. For a value of x and a value of z, a triangle may also be determined by using a projection point that is of the third antenna 123 and that is on the x-axis, the first antenna 121, and the second antenna array 220. In this way, the value of x and the value of z in the first coordinates are calculated based on the foregoing method.

Specifically, refer to FIG. 38. There is an included angle β2 between a connection line between the third antenna 123 and the first antenna 121 and the x-axis. For a phase difference between the third antenna 123 and the first antenna 121, a component of the phase difference on the x-axis may be obtained through conversion based on the included angle β2. A distance from the projection point x1 that is of the third antenna 123 and that is on the x-axis to the second antenna array 220 may be obtained through calculation based on the component of the phase difference on the x-axis. A distance from the projection point x1 to the first antenna 121 may be obtained through conversion based on a distance between the third antenna 123 and the first antenna 121 and the included angle β2. A distance between the second antenna array 220 and the first antenna 121 may still be obtained through calculation based on the foregoing unidirectional ranging method or bidirectional ranging method. Therefore, a side length of each side of the triangle determined by the projection point x1, the first antenna 121, and the second antenna array 220 may be obtained. The value of x and the value of z in the first coordinates can be obtained through calculation based on the foregoing method.

Optionally, the second antenna array 220 includes at least two second antenna elements. If there are two second antenna elements, one acceleration sensor needs to work together. The acceleration sensor and one of the second antenna elements are respectively distributed in a third direction and a fourth direction, and the third direction and the fourth direction are perpendicular to each other. The other second antenna element may be located at an intersection point of the third direction and the fourth direction, and is used as an origin of a coordinate system including the third direction and the fourth direction. For example, the second antenna element located on the side that is of the origin and that is in the third direction may be configured to obtain a horizontal signal. The acceleration sensor located on a side that is of the origin and that is in the fourth direction is configured to: obtain a vertical signal, and further obtain the deflection angles of the second antenna array based on the horizontal signal and the vertical signal.

If there are more than three second antenna elements, at least two of at least three second antenna elements are respectively distributed in a third direction and a fourth direction.

Both the third direction and the fourth direction use the second electronic device 200 as a reference system, to be specific, the third direction and the fourth direction are separately not associated with the first direction X, the second direction Y, and a world coordinate system. The second antenna array 220 may be disposed at any position of the second electronic device 200. To implement better signal receiving and sending performance, the second antenna array 220 is disposed at an end portion of the second electronic device 200, and the end portion is an end that is of the second electronic device 200 in use and that faces the first electronic device 100.

The third direction and the fourth direction are two mutually perpendicular directions relative to the end portion of the second electronic device 200. The second antenna elements are disposed in the two mutually perpendicular directions, so that the deflection angles of the second antenna array 220 relative to the first direction X and the second direction Y may be obtained based on a phase difference between the antennas. In this way, the second coordinates, namely, the absolute coordinates of the second column of antennas within the size range of the first electronic device 100, may be obtained based on the first coordinates and the deflection angles.

The second antenna array 220 and the first antenna array 120 may have a same antenna arrangement form, and antennas in the second antenna array 220 and in the first antenna array 120 each may be arranged in an "L" shape, an "isosceles triangular" shape, a rectangular array, or the like. This facilitates calculation of parameters such as a phase difference and a deflection angle of antennas, thereby implementing precise positioning. Certainly, in some other embodiments, as described above, the second antenna array 220 and the first antenna array 120 may alternatively have different arrangement forms. Details are not described herein again.

Optionally, refer to FIG. 32 and FIG. 33. The second antenna array 220 includes at least three second antenna elements. The at least three second antenna elements may be a fourth antenna 221, a fifth antenna 222, and a sixth antenna 223. The fifth antenna 222 is located on a side that is of the fourth antenna 221 and that is in the third direction, and the sixth antenna 223 is located on a side that is of the fourth antenna 221 and that is in the fourth direction, so that the fourth antenna 221, the fifth antenna 222, and the sixth antenna 223 form an "L"-shaped structure. The fourth antenna 221 is an antenna integrated with sending and receiving, and both the fifth antenna 222 and the sixth antenna 223 are receive antennas. A distance between any two of the fourth antenna 221, the fifth antenna 222, and the sixth antenna 223 is less than or equal to the wavelength of the second signal. Refer to FIG. 32. The fourth antenna 221 may be one independent antenna. The independent fourth antenna 221 may be connected to the transmitter through a switching switch 235, and switching between a signal sending function and a signal receiving function may be implemented by using the switching switch 235. Certainly, in some other embodiments, the fourth antenna 221 may alternatively include one transmit antenna 221*a* and one receive antenna. The transmit antenna 221*a* is connected to the transmitter 233 and is configured to send a signal. The receive antenna is connected to the receiver 234 and is configured to receive a signal.

When the first antenna array 120 sends the second signal, the fourth antenna 221, the fifth antenna 222, and the sixth antenna 223 can all receive the second signal, and a phase difference between the fifth antenna 222 and the fourth antenna 221 and a phase difference between the sixth antenna 223 and the fourth antenna 221 can be obtained based on the phase parameter in the second signal. Because the distance between any two of the fourth antenna 221, the fifth antenna 222, and the sixth antenna 223 is less than or equal to the wavelength of the second signal, a first deflection angle θ1 of the second antenna array 220 relative to the first direction and a second deflection angle θ2 of the second antenna array 220 relative to the second direction may be correspondingly obtained based on the phase differences, and final two-dimensional coordinates $(x+z\times\tan\theta_1, y+z\times\tan\theta_2)$ of the second antenna array 220 projected onto the display interface 160 of the first electronic device 100 may be obtained in combination of the first coordinates (x, y, z).

Optionally, the plane including the first direction X and the second direction Y is parallel to the display interface of the first electronic device 100. An equivalent center of each first antenna element 120*a* in the first antenna array 120 may be located on the plane including the first direction X and the second direction Y. This can facilitate geometric calculation of each coordinate point value in the first coordinates, and accuracy of the first coordinates can be improved.

Certainly, in some other embodiments, an equivalent center of each first antenna element 120*a* in the first antenna array 120 may not be located on the display interface 160 of the first electronic device 100, provided that a geometric relationship between each first antenna element 120*a* and the display interface 160 of the first electronic device 100 can be determined.

An embodiment of this application further provides a positioning method. The following describes in detail the positioning method provided in embodiments of this application with reference to the accompanying drawings and specific embodiments.

The positioning method may be applied to a system including a first electronic device 100 and a second electronic device 200. A first antenna array 120 is disposed on the first electronic device 100, the first antenna array 120 includes a plurality of first antenna elements 120*a*, at least two of the plurality of first antenna elements 120*a* are respectively distributed in a first direction and a second direction, and the first direction is perpendicular to the second direction. A second antenna array 220 is disposed on the second electronic device 200, and the second antenna array 220 includes a plurality of second antenna elements.

FIG. 39 is a flowchart of a positioning method according to an embodiment of this application. Refer to FIG. 39. The method includes the following steps.

Step S1: Determine, based on a first signal sent by the second antenna array 220 and a second signal sent by the first antenna array 120, a position of a first cursor displayed on the first electronic device 100.

In this application, positions of the first antenna array 120 and the second antenna array 220 relative to each other may be determined, to specifically obtain absolute coordinates of the second antenna array 220 relative to the first electronic device 100. The second antenna array can accurately point to a position specified by the first electronic device 100. Specifically, after a position of the first antenna array 120 on the first electronic device 100 is determined, the first antenna array 120 can establish a three-dimensional coordinate system based on a relative position of the first antenna array 120 on the first electronic device 100. A relative position of the first antenna array 120 relative to a display interface 160 of the first electronic device 100 is also included in the three-dimensional coordinate system. When the positions of the first antenna array 120 and the second antenna array 220 on the second electronic device 200 relative to each other are determined, if the detected coordinates of the second antenna array 220 do not exceed a range of the display interface 160, the coordinates of the second antenna array 220 can be accurately displayed within the range of the display interface 160 in a form of the first cursor. In this way, positioning of the second antenna array 220 is more precise, and operation experience in a spatial pointing operation is improved.

In addition, if the coordinates of the second antenna array 220 exceed a size range of the first electronic device 100, the coordinates determined in this case may be defined as a position of a second cursor, and the position of the second cursor is not displayed in the display interface 160, so that a problem of inaccurate pointing can be avoided.

Figure 40:
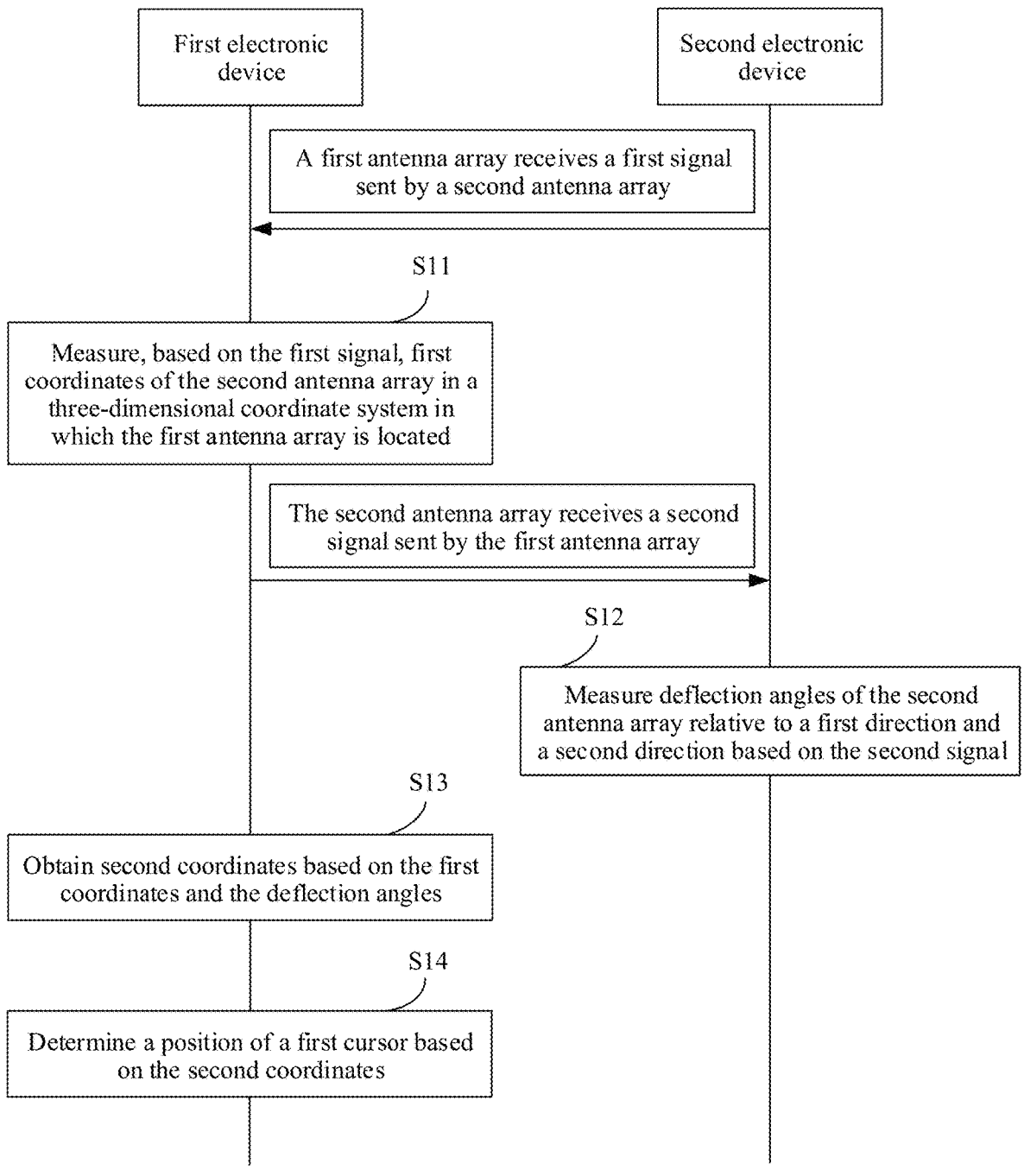
FIG. 40 is a flowchart of a positioning method according to another embodiment of this application.

Specifically, FIG. 40 is a flowchart of a positioning method according to another embodiment of this application. Refer to FIG. 40. Step S1 specifically includes the following steps.

Step S11: Measure, based on the first signal, first coordinates of the second antenna array in the three-dimensional coordinate system in which the first antenna array is located. The first coordinates may be obtained through calculation by the first electronic device 100 side. Certainly, the first coordinates may alternatively be obtained through calculation by the second electronic device 200 side, and a calculation result is sent to the first electronic device 100 side.

Step S12: Measure deflection angles of the second antenna array relative to the first direction and the second direction based on the second signal. The deflection angles may be obtained through calculation by the second electronic device 200 side, and certainly may alternatively be obtained through calculation by the first electronic device 100 side. This is not limited in this embodiment.

Step S13: Obtain second coordinates based on the first coordinates and the deflection angles.

Step S14: Determine the position of the first cursor based on the second coordinates. As described above, based on different position relationships between a radiating surface of the first antenna array 120 and the display interface 160 of the first electronic device 100, the second coordinates may be the position of the first cursor, or may be the position that is of the first cursor and that is obtained through conversion based on the second coordinates. Details are not described herein again.

In use, the second electronic device 200 may freely rotate at a position indicated by the first coordinates, to drive the second antenna array 220 to rotate. Such rotation affects a phase of a signal received by the second antenna array 220, and values of the first coordinates in the first direction and the second direction are changed. As a result, an actual pointing position of the second antenna array 220 does not correspond to the position indicated by the first coordinates. Therefore, in this embodiment, rotation of the second electronic device 200 is considered. After the first antenna array 120 obtains, through positioning, the first coordinates of the second antenna array 220 based on the first signal sent by the second antenna array 220, the second antenna array 220 may obtain, through positioning, the deflection angles of the second antenna array 220 relative to the first direction and the second direction based on the second signal sent by the first antenna array 120. The final second coordinates may be further obtained based on the first coordinates and the deflection angles.

According to the positioning method provided in this embodiment of this application, the first antenna array 120 is disposed on the first electronic device 100, and the second antenna array 220 is disposed on the second electronic device 200, so that long-distance interaction between the first electronic device 100 and the second electronic device 200 can be implemented, with no need to rely on a moving plane. In addition, the positions of the first antenna array 120 and the second antenna array 220 relative to each other may be determined, the rotation of the second electronic device 200 in use is considered, and a manner of calculating the deflection angles of the second antenna array 220 relative to the first antenna array 120 in the first direction and the second direction is used. Therefore, the absolute coordinates of the second antenna array 220 within the size range of the first electronic device 100 can be obtained. Positioning of the second antenna array 220 is more precise, and operation experience in a spatial pointing operation is improved.

In a specific implementation, the first antenna elements 120a are a first antenna 121, a second antenna 122, and a third antenna 123. The second antenna 122 is located on a side that is of the first antenna 121 and that is in the first direction. The third antenna 123 is located on a side that is of the first antenna and that is in the second direction. The first signal includes a time parameter and a first phase parameter. Specifically, step S11 specifically includes the following steps.

Step S111: Obtain a first distance between the first antenna 121 and the second antenna array 220 based on the time parameter. The time parameter is duration for a signal to fly between receiving and sending time points, and may further include duration consumed for signal processing. The first distance may be calculated based on the foregoing duration.

Refer to FIG. 35 and FIG. 36. A first distance r is a straight-line distance between the second antenna array 220 and the first antenna 121. As described above, the first distance r may be calculated by using a unidirectional ranging method or a bidirectional ranging method. In the two calculation manners, the first distance r may be calculated based on a time point at which a signal is sent or received, or in combination of duration of delay for processing a signal. Details are not described herein again.

Step S112: Obtain, based on the first phase parameter, a first phase difference between the second antenna 122 and the first antenna 121 and a second phase difference between the third antenna 123 and the first antenna 121. The first antenna array 220 may analyze and obtain a phase parameter from the received first signal, and a phase difference can be further obtained based on the phase parameter.

Step S113: Obtain an x-axis coordinate value and a z-axis coordinate value in the first coordinates based on the first distance r, a distance between the second antenna 122 and the first antenna 121, and the first phase difference; and obtain a y-axis coordinate value in the first coordinates based on the first distance r, a distance between the third antenna 123 and the first antenna 121, and the second phase difference.

Refer to FIG. 34. As described above, a distance between the second antenna 122 and the second antenna array 220 may be obtained through calculation based on the first phase difference, and a value of x and a value of z in the first coordinates may be further obtained through calculation. Refer to FIG. 37 FIG. 37. A distance between the third antenna 123 and the second antenna array 220 may be obtained through calculation based on the second phase difference, and a value of y in the first coordinates may be further obtained through calculation, so that all values in the first coordinates (x, y, z) may be obtained.

In a specific implementation, the second antenna array 220 includes a fourth antenna 221, a fifth antenna 222, and a sixth antenna 223. The fifth antenna 222 is located on a side that is of the fourth antenna 221 and that is in a third direction. The sixth antenna 223 is located on a side that is of an origin antenna and that is in a fourth direction. The second signal includes a second phase parameter. Specifically, step S12 specifically includes the following steps.

Step S121: Obtain, based on the second phase parameter, a third phase difference between the fifth antenna 222 and the fourth antenna 221 and a fourth phase difference between the sixth antenna 223 and the fourth antenna 221.

Step S122: Obtain, based on the third phase difference, a first deflection angle θ1 that is of the second antenna array 220 and that is in the first direction, and obtain, based on the fourth phase difference, a second deflection angle θ2 that is of the second antenna array 220 and that is in the second direction.

Because a distance between any two of the fourth antenna 221, the fifth antenna 222, and the sixth antenna 223 is less than or equal to a wavelength of the second signal, the first deflection angle θ1 of the second antenna array 220 relative to the first direction and the second deflection angle θ2 of the second antenna array 220 relative to the second direction may be correspondingly obtained based on the phase difference, and final two-dimensional coordinates $(x+z \times \tan \theta_1, y+z \times \tan \theta_2)$ of the second antenna array 220 projected onto the display interface of the first electronic device 100 may be obtained in combination of the first coordinates (x, y, z). In a case in which the fourth antenna 221, the fifth antenna 222, and the sixth antenna 223 form a triangle or an "isosceles triangular" shape, a distance between any two receive antennas is less than or equal to the wavelength of the second signal, and components of a part of the antennas in a horizontal direction may be used to assist in determining a unique deflection angle. In addition, in a case in which the fourth antenna 221, the fifth antenna 222, and the sixth antenna 223 form a rectangular array or a "rectangular" shape, a distance between any two receive antennas is less than or equal to a half of the wavelength of the second signal, so that a unique deflection angle can be directly determined.

Therefore, for impact of rotation of the second electronic device 200 on coordinate accuracy, it is considered in this embodiment to calculate the first deflection angle θ1 and the second deflection angle θ2 to implement correction. On the basis of obtaining the first coordinates of the second antenna array 220, it is generally considered to dispose a gyroscope in the second electronic device 200. However, the gyroscope can only detect a rotation status of the second electronic device 200, and cannot synchronize with a size of the display interface of the first electronic device 100. For example, if the coordinates of the second electronic device 200 exceed a size range of the display interface of the first electronic device 100, the gyroscope still detects the rotation of the second electronic device 200, and transmits a rotation signal to the first electronic device 100. Consequently, a cursor on the display interface of the first electronic device 100 moves randomly, and an accurate pointing direction cannot be obtained. In this embodiment, a manner of calculating a deflection angle is used, to be specific, the first deflection angle θ1 and the second deflection angle θ2 can be calculated, to implement correction of an angle that is of the second antenna array 220 and that is in a three-dimensional coordinate system. The three-dimensional coordinate system is associated with a size of the first electronic device 100, so that the absolute coordinates of the second antenna array 220 within the size range of the display interface of the first electronic device 100 can be accurately obtained. If the coordinates of the second antenna array 220 exceed a size range of the display interface of the first electronic device 100, the coordinates of the second antenna array 220 are not displayed on the display interface of the first electronic device 100. This improves operation experience.

In addition, in some other embodiments, the second antenna array includes a fourth antenna, a fifth antenna, and an acceleration sensor, the fifth antenna is located on a side that is of the fourth antenna and that is in a third direction, the acceleration sensor is located on a side that is of the fourth antenna and that is in a fourth direction, and the third direction is perpendicular to the fourth direction; and the second signal includes a second phase parameter.

Step S12 specifically includes the following steps.

Step S123: Obtain a third phase difference between the fifth antenna and the fourth antenna based on the second phase parameter.

Step S124: Obtain, based on the third phase difference, a first deflection angle that is of the second antenna array and that is in the first direction, and obtain, by the acceleration sensor based on the second phase parameter, a second deflection angle that is of the second antenna array and that is in the second direction.

The acceleration sensor may replace the sixth antenna in the foregoing embodiment, and the acceleration sensor can obtain the second deflection angle, to obtain the second coordinates in combination of the first deflection angle and the first coordinates. Details are not described herein again.

It should be understood that solutions in embodiments of this application may be properly combined and used, and explanations or descriptions of terms in embodiments may be cross-referenced or explained in embodiments.

It should be further understood that sequence numbers of the processes do not mean execution sequences in various embodiments of this application. The execution sequences of the processes should be determined based on functions and internal logic of the processes, and should not be construed as any limitation on the implementation processes of embodiments of this application.

It may be understood that, to implement functions in any one of the foregoing embodiments, an electronic device (for example, the control device or the display device) includes a corresponding hardware structure and/or software module for performing each function. A person skilled in the art should easily be aware that, based on units and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the electronic device (for example, the control device or the display device) may be divided into functional modules. For example, each functional module corresponding to each function may be obtained through division, or two or more functions may be integrated into one processing module. The integrated module may be implemented in a form of hardware, or may be implemented in a form of a software functional module. It should be noted that, in embodiments of this application, module division is an example, and is merely logical function division. In an actual implementation, another division manner may be used.

It should be further understood that the modules in the electronic device (for example, the control device or the display device) may be implemented in a form of software and/or hardware. This is not specifically limited. In other words, the electronic device is displayed in a form of functional modules. The "module" herein may be an application-specific integrated circuit ASIC, a circuit, a processor that executes one or more software or firmware programs and a memory, an integrated logic circuit, and/or another component capable of providing the foregoing functions.

In an optional manner, when data transmission is implemented by using software, the data transmission may be completely or partially implemented in a form of a computer program product. The computer program product includes one or more computer instructions. When the computer program instructions are loaded and executed on a computer, the procedures or functions according to embodiments of this application are completely or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

Method or algorithm steps described in combination with embodiments of this application may be implemented by hardware, or may be implemented by a processor by executing software instructions. The software instructions may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well known in the art. For example, a storage medium is coupled to a processor, so that the processor can read information from the storage medium and write information to the storage medium. Certainly, the storage medium may alternatively be a component of the processor. The processor and the storage medium may be located in an application-specific integrated circuit (ASIC). In addition, the ASIC may be located in the electronic device (for example, the control device or the display device). Certainly, the processor and the storage medium may alternatively exist as discrete components.

Based on the foregoing descriptions of the implementations, a person skilled in the art may clearly understand that for the purpose of convenient and brief descriptions, division of the foregoing functional modules is merely used as an example for description. During actual application, the foregoing functions can be allocated to different functional modules for implementation according to a requirement, that is, an inner structure of an apparatus is divided into different functional modules to implement all or some of the functions described above. The foregoing descriptions are merely example embodiments of this application, and are not intended to limit this application. For a person skilled in the art, this application may have various modifications and variations. Any modification, equivalent replacement, improvement, or the like made without departing from the spirit and principle of this application shall fall within the protection scope of this application.

What is claimed is:

1. A device display control method, wherein the method is applied to at least one display device, the at least one display device comprises a first display device, the first display device comprises a first positioning unit and a first display, the first positioning unit comprises a first antenna array, the first antenna array comprises at least three first antenna elements, wherein the first positioning unit is mounted on the first display device, and the method comprises:

receiving, by the first antenna array of the first positioning unit, a first signal from a second antenna array of a control device, wherein at least two of the first antenna elements of the first antenna array are distributed in a first direction, and at least two of the first antenna elements of the first antenna array are distributed in a second direction, wherein a distance between any two of the first antenna elements among the at least three first antenna elements that have functions of receiving the first signal is less than or equal to a wavelength of the first signal; and sending, by the first antenna array of the first positioning unit, a second signal to the second antenna array of the control device, wherein the first signal and the second signal are used to determine a position of a first cursor corresponding to a first pointing position of the control device, and the first cursor is displayed on the first display device.

2. The method according to claim 1, wherein the method further comprises:

based on a second pointing position of the control device moving out of a first edge area of the first display, no longer displaying the first cursor on the first display; and based on a third pointing position of the control device moving into the first edge area, displaying the first cursor on the first display.

3. The method according to claim 1, further comprising:

following a movement track of the control device, and displaying, on the first display, a display track of the first cursor that matches the movement track.

4. The method according to claim 1, wherein the method further comprises:

based on a fourth pointing position of the control device being in a preset control hot area, displaying a corresponding interface effect when the first cursor is displayed.

5. The method according to claim 1, wherein the at least one display device further comprises a second display device, an orientation relationship between the second display device and the first display device is a first relationship, the second display device comprises a second positioning unit and a second display, and the method further comprises:

based on a fifth pointing position of the control device moving out of a first edge area of the first display, skipping displaying the first cursor on the first display; and based on a sixth pointing position of the control device moving into a second edge area of the second display, following a movement track of the control device, and displaying the first cursor on the second display.

6. The method according to claim 1, wherein each of the first signal and the second signal comprises one or more of the following: an ultra-wideband (UWB) radio signal, or a millimeter-wave radar signal.

7. The method according to claim 1, wherein the first direction is perpendicular to the second direction.

8. The method according to claim 1, wherein the second antenna array comprises at least two second antenna elements.

9. The method according to claim 1, wherein the plurality of first antenna elements are a first antenna, a second antenna, and a third antenna, the first antenna is located at an intersection point of the first direction and the second direction, the second antenna is located on a side that is of the first antenna and that is in the first direction, and the third antenna is located on a side that is of the first antenna and that is in the second direction.

10. The method according to claim 8,
wherein a distance between any two second antenna elements that are in the at least two second antenna elements and that have functions of receiving a second signal is less than or equal to a wavelength of the second signal.

11. The method according to claim 1, wherein a first antenna element of the plurality of first antenna elements is an antenna integrated with sending and receiving, or the first antenna element comprises a receive antenna and a transmit antenna.

12. The method according to claim 1, wherein the plurality of first antenna elements are distributed in an L shape, a triangle, or a rectangular array.

13. The method according to claim 1, wherein a plane comprising the first direction and the second direction is parallel to a display interface of the first display device.

14. The method according to claim 1, wherein the first antenna array is located on an upper side of the at least one display device.

15. A display device, wherein the display device comprises a positioning unit and a display, and the positioning unit and the display are configured to support the display device in implementing the method according to claim 1.

16. A display system, comprising:
a display device; and
a control device;
wherein the display device comprises a first positioning unit and a display, wherein the first positioning unit is configured to receive a first signal from the control device and send a second signal to the control device, and the first positioning unit and the display are configured to support the display device in implementing the method according to claim 1; and
wherein the control device comprises a second positioning unit, wherein the second positioning unit is configured to send the first signal to the first positioning unit of the display device and receive the second signal.

17. The method according to claim 1, wherein at least one of the first antenna array or the second antenna array operates in an ultra-high frequency (UHF) band.

18. The method according to claim 1, wherein the position of the first cursor corresponding to the first pointing position of the control device is further determined using the first signal, the second signal, and a size of the first display.

19. The display device according to claim 15, wherein each of the first signal and the second signal comprises one or more of the following: an ultra-wideband (UWB) radio signal, or a millimeter-wave radar signal.

20. The display device according to claim 15, wherein the plurality of first antenna elements are a first antenna, a second antenna, and a third antenna, the first antenna is located at an intersection point of the first direction and the second direction, the second antenna is located on a side that is of the first antenna and that is in the first direction, and the third antenna is located on a side that is of the first antenna and that is in the second direction.

21. The display device according to claim 15, wherein a plane comprising the first direction and the second direction is parallel to a display interface of the first display device.

22. The display device according to claim 15, wherein the first antenna array is located on an upper side of the display device.

23. The display system according to claim 16, wherein at least one of the first antenna array or the second antenna array operates in an ultra-high frequency (UHF) band.

24. The display system according to claim 16, wherein the position of the first cursor corresponding to the first pointing position of the control device is further determined using the first signal, the second signal, and a size of the first display.

25. The display system according to claim 16, wherein each of the first signal and the second signal comprises one or more of the following: an ultra-wideband (UWB) radio signal, or a millimeter-wave radar signal.

26. The display system according to claim 16, wherein the plurality of first antenna elements are a first antenna, a second antenna, and a third antenna, the first antenna is located at an intersection point of the first direction and the second direction, the second antenna is located on a side that is of the first antenna and that is in the first direction, and the third antenna is located on a side that is of the first antenna and that is in the second direction.

27. The display system according to claim 16, wherein a plane comprising the first direction and the second direction is parallel to a display interface of the first display device.

28. The display system according to claim 16, wherein the first antenna array is located on an upper side of the display device.

29. The display system according to claim 16, wherein the second antenna array comprises at least two second antenna elements.

30. The display system according to claim 29, wherein a distance between any two second antenna elements that are in the at least two second antenna elements and that have functions of receiving a second signal is less than or equal to a wavelength of the second signal.

* * * * *